(12) United States Patent
McDonald et al.

(10) Patent No.: US 11,522,431 B2
(45) Date of Patent: Dec. 6, 2022

(54) VARIABLE TORQUE LINEAR MOTOR/GENERATOR/TRANSMISSION

(71) Applicant: Falcon Power, LLC, Titusville, FL (US)

(72) Inventors: Harley C. McDonald, Merritt Island, FL (US); James L. Bailey, Titusville, FL (US); Matthew C. McDonald, Merritt Island, FL (US)

(73) Assignee: Falcon Power, LLC, Titusville, FL (US)

( * ) Notice: Subject to any disclaimer, the term of this patent is extended or adjusted under 35 U.S.C. 154(b) by 0 days.

(21) Appl. No.: 16/956,843

(22) PCT Filed: Dec. 21, 2018

(86) PCT No.: PCT/US2018/067254
§ 371 (c)(1),
(2) Date: Jun. 22, 2020

(87) PCT Pub. No.: WO2019/126727
PCT Pub. Date: Jun. 27, 2019

(65) Prior Publication Data
US 2021/0376707 A1 Dec. 2, 2021

Related U.S. Application Data

(60) Provisional application No. 62/609,873, filed on Dec. 22, 2017.

(51) Int. Cl.
*H02K 41/02* (2006.01)
*B60L 50/61* (2019.01)
(Continued)

(52) U.S. Cl.
CPC ............. *H02K 41/02* (2013.01); *B60L 50/61* (2019.02); *B65G 23/23* (2013.01); *B65G 54/02* (2013.01);
(Continued)

(58) Field of Classification Search
CPC ........ H02K 41/02; H02K 41/031; H02K 1/16; H02K 3/12; H02K 2213/09; B65G 23/23;
(Continued)

(56) References Cited

U.S. PATENT DOCUMENTS

| | | | | |
|---|---|---|---|---|
| 4,633,108 A | * | 12/1986 | von der Heide | ..... H02K 41/031 318/254.1 |
| 2009/0146507 A1 | * | 6/2009 | Teramachi | ............. H02K 49/10 310/12.24 |
| 2016/0036308 A1 | * | 2/2016 | Bailey | ...................... B60K 6/48 310/91 |

FOREIGN PATENT DOCUMENTS

| CN | 101278467 B | 9/2010 |
|---|---|---|
| CN | 106612060 A | 5/2017 |

(Continued)

OTHER PUBLICATIONS

Machine translation of EP-0300124-A1. (Year: 1989).*
(Continued)

*Primary Examiner* — Michael Andrews
(74) *Attorney, Agent, or Firm* — Kevin E. West; Advent, LLP

(57) ABSTRACT

A linear motor/generator/transmission system includes a guideway with rails and a plurality of stator cores and coils evenly disposed along the length and in the center of the guideway. The system also includes a carriage configured to travel along the guideway having at least two magnet bars with alternating pole magnets, each successive magnet of each magnet bar mounted in front of the other in a direction of travel of the carriage. In embodiments, the magnet bars
(Continued)

are mounted parallel to and on either side of a longitudinal centerline of the carriage such that, when adjacent to the center line and each other, the at least two magnet bars are positioned over the stator coils and are configured to be slidably translated away from the center line of the carriage to a position where the at least two magnet bars are not over the stator coils.

20 Claims, 58 Drawing Sheets

(51) Int. Cl.
    *B65G 23/23*     (2006.01)
    *B65G 54/02*     (2006.01)
    *H02K 1/16*     (2006.01)
    *H02K 3/12*     (2006.01)

(52) U.S. Cl.
    CPC ................ *H02K 1/16* (2013.01); *H02K 3/12* (2013.01); *B60L 2220/42* (2013.01); *B60L 2220/50* (2013.01); *B65G 2203/0266* (2013.01)

(58) Field of Classification Search
    CPC . B65G 54/02; B65G 2203/0266; B60L 50/61; B60L 2220/42; B60L 2220/50

USPC ................................ 310/12.09, 12.24, 12.31
See application file for complete search history.

(56) References Cited

FOREIGN PATENT DOCUMENTS

| | | | |
|---|---|---|---|
| EP | 0300124 A1 * | 1/1989 | ............ H02K 41/02 |
| EP | 0532371 A2 | 3/1993 | |
| FR | 2044502 A5 | 2/1971 | |
| JP | H02168845 A | 6/1990 | |
| JP | 2003111380 A | 4/2003 | |
| JP | 2012065451 A | 3/2012 | |
| KR | 20030054753 A | 7/2003 | |
| TW | 201707346 A | 2/2017 | |

OTHER PUBLICATIONS

Extended European Search Report for European Application No. 18893021.8 dated Nov. 25, 2021.
International Search Report and the Written Opinion for Application No. PCT/US2018/067254, dated Apr. 25, 2019, 10 pages.
Office Action in Taiwan for Application No. 107146668, dated Oct. 17, 2022.

* cited by examiner

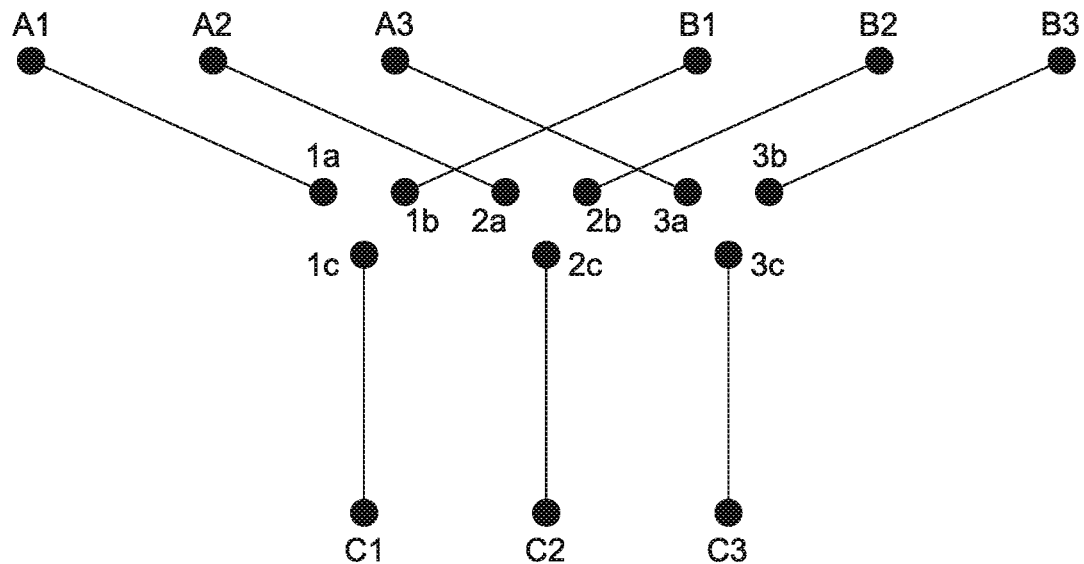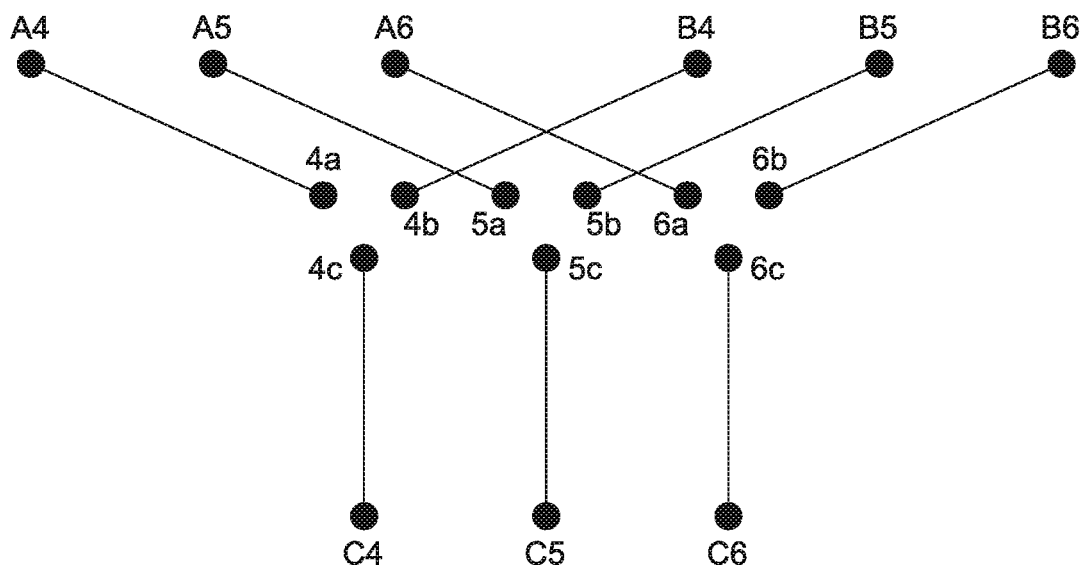
FIG. 10

VARIABLE TORQUE LINEAR MOTOR/GENERATOR/TRANSMISSION

CROSS-REFERENCE TO RELATED APPLICATIONS

U.S. Provisional Application No. 62/032,468, filed Aug. 1, 2014; U.S. Provisional Application No. 62/146,694, filed Apr. 13, 2015; U.S. Provisional Application No. 62/146,725, filed Apr. 13, 2015; U.S. Provisional Application No. 62/322,052, filed Apr. 13, 2016; U.S. Provisional Application No. 62/353,413, filed Jun. 22, 2016; U.S. Provisional Application No. 62/399,907, filed Sep. 26, 2016; U.S. non-provisional patent application Ser. No. 14/815,733 (U.S. Pat. No. 9,479,037), filed Jul. 31, 2015; U.S. non-provisional patent application Ser. No. 15/332,824, filed Oct. 24, 2016; and U.S. non-provisional patent application Ser. No. 15/486,727, filed Apr. 13, 2017 are incorporated herein by reference in their entireties.

BACKGROUND

Electric motors and generators can operate in the 90 to 98% efficiency range near their rated revolutions per minute (RPM) and torque specifications. Likewise, linear electric motors can operate at this same efficiency when operating at their rated linear speed and pounds pull. While this narrow band of high efficiency rating in electric radial motors and generators and linear motors is high, when these same motors and generators are operating outside the specified RPM, torque, linear speed and pull rating the efficiencies dramatically decrease sometimes to as low as 30 to 60%.

In the transportation sector, the moving of goods and people from one point to another requires significant starting, stopping and speed variations. Linear motors are most often used for moving goods and or people from one point to another. Permanent magnets are attractive for linear motors in that external power only needs to be supplied to the stationary or stator side of the linear motor simplifying the construction and greatly increasing the range of efficiency in speed and pull. But permanent magnet linear motors are still limited in their efficiency range. They also have a problem with back EMF and extreme drag while in the coast mode due to the permanent magnet passing continuously by the iron core of the stator.

DRAWINGS

The Detailed Description is described with reference to the accompanying figures. The use of the same reference numbers in different instances in the description and the figures may indicate similar or identical items.

FIG. 10 is a diagrammatic illustration of a six-wire separated stator winding assembly, in accordance with an example embodiment of the present disclosure;

DETAILED DESCRIPTION

Overview

Figure 1:
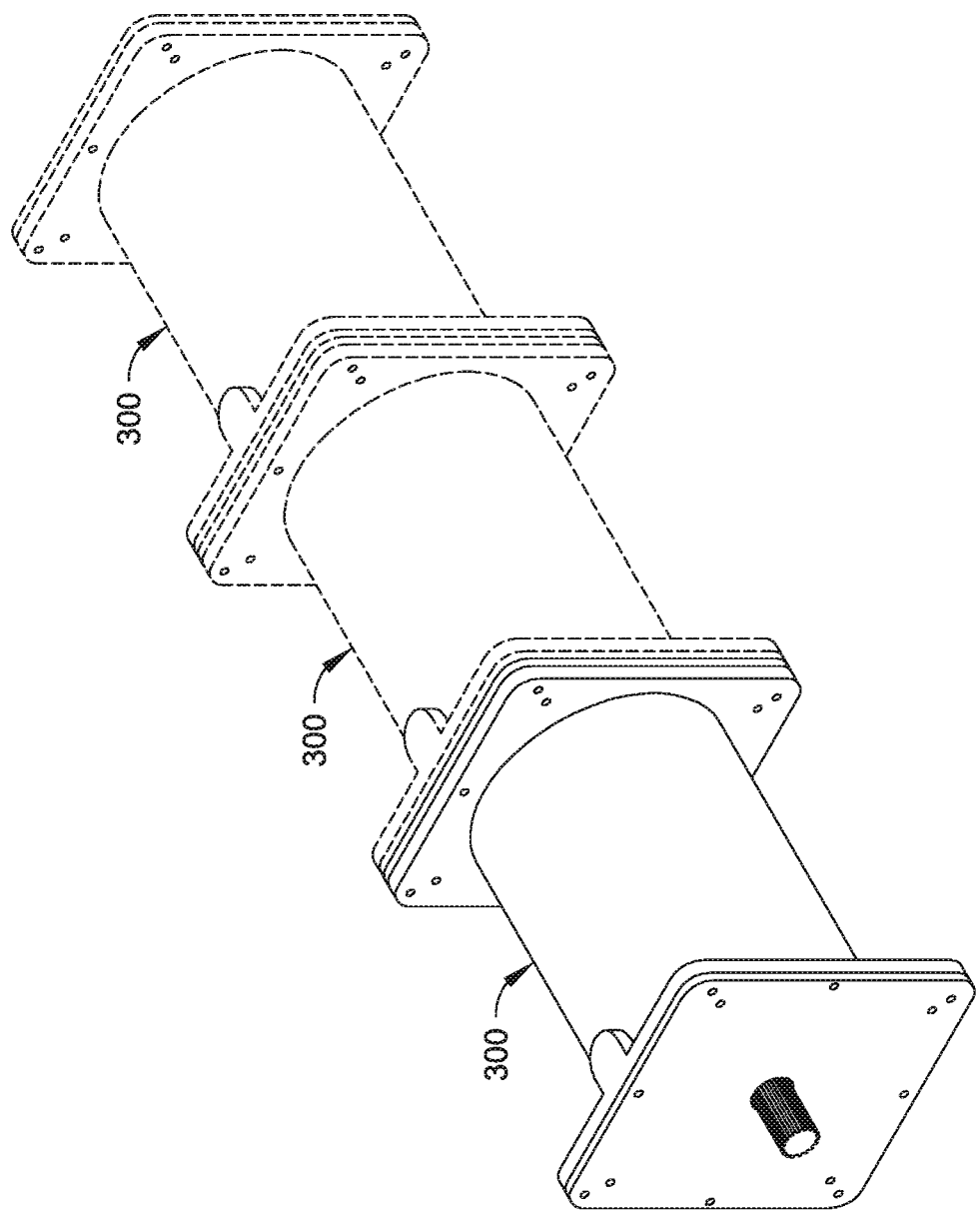
FIG. 1 is a perspective view illustrating a motor/generator/transmission (MGT) unit, which may be connected to one or more additional MGT units, in accordance with an example embodiment of the present disclosure.
Figure 2:
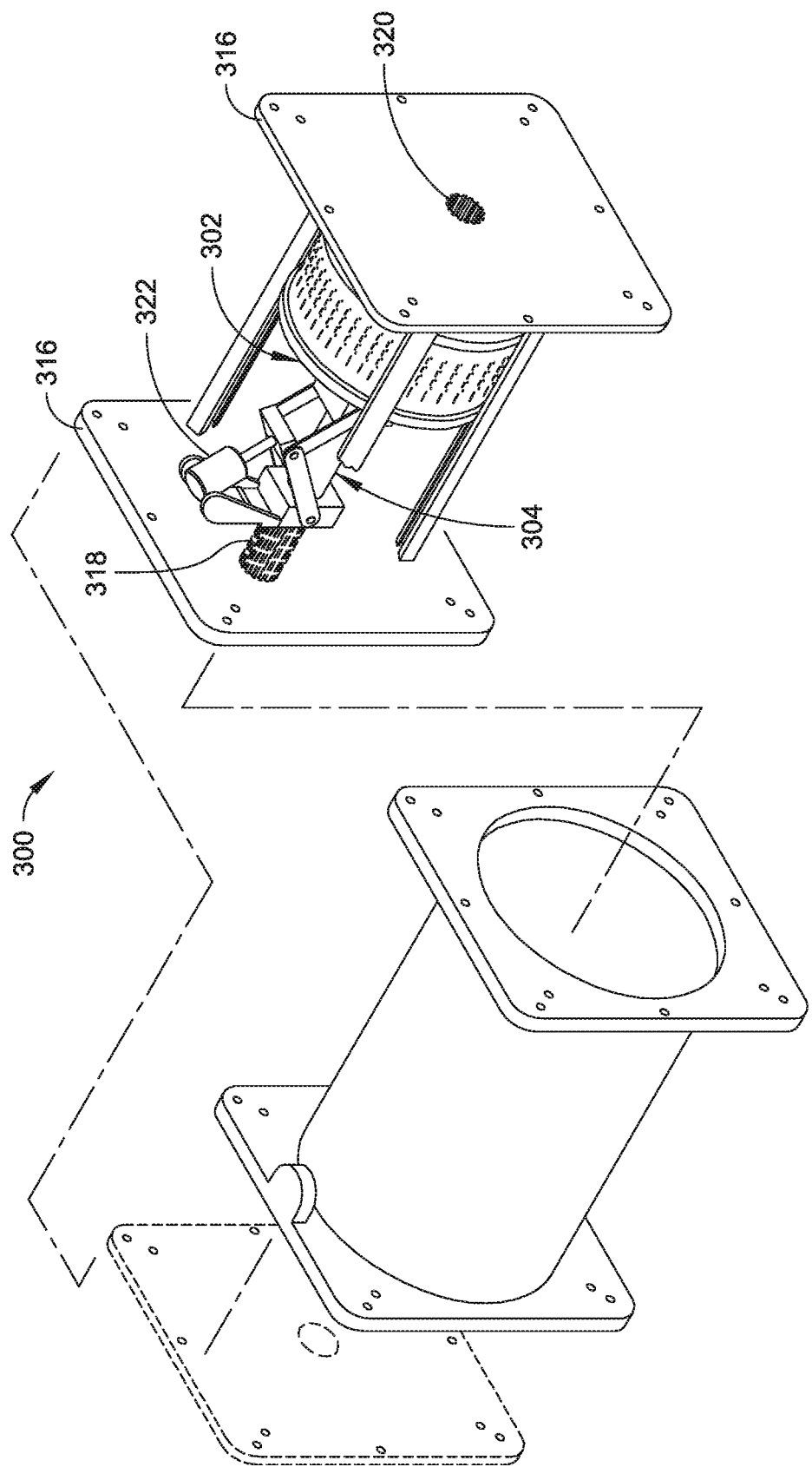
FIG. 2 is an exploded perspective view of a MGT unit, such as the MGT unit illustrated in FIG. 1, in accordance with an example embodiment of the present disclosure.
Figure 3:
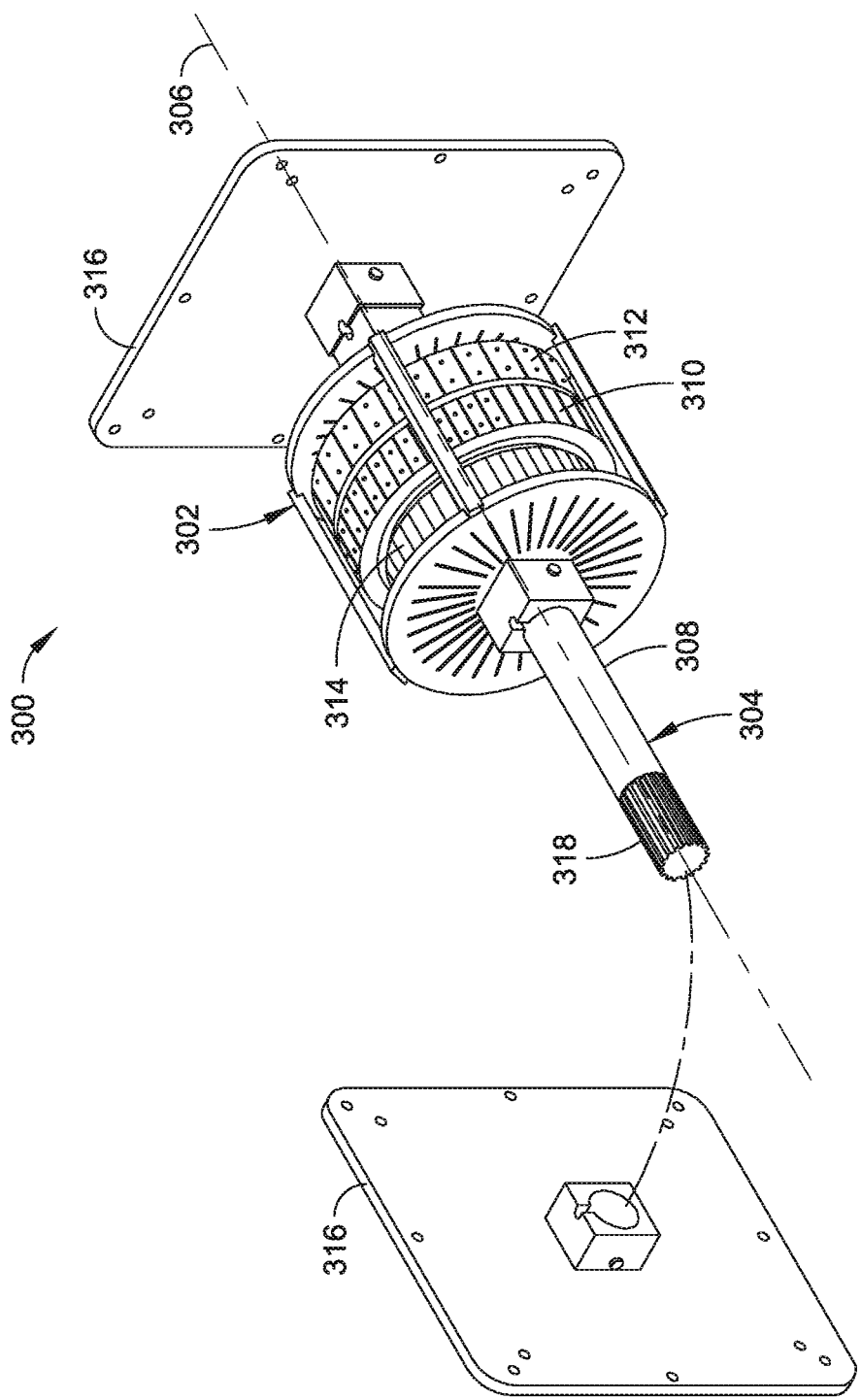
FIG. 3 is a partial exploded perspective view of a MGT unit, such as the MGT unit illustrated in FIG. 1, in accordance with an example embodiment of the present disclosure.
Figure 4:
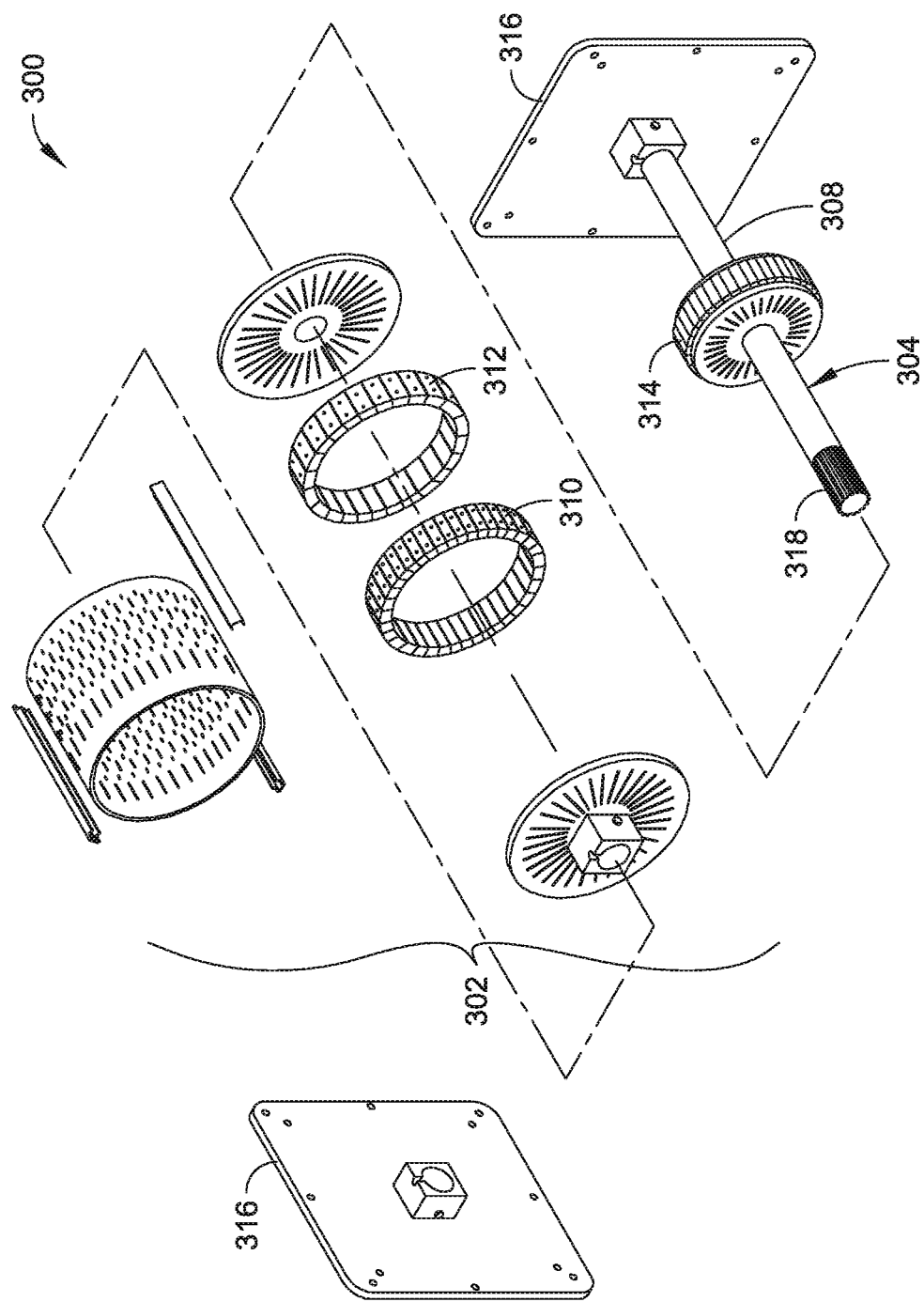
FIG. 4 is a partial exploded perspective view of a MGT unit, such as the MGT unit illustrated in FIG. 1, in accordance with an example embodiment of the present disclosure.
Figure 5:
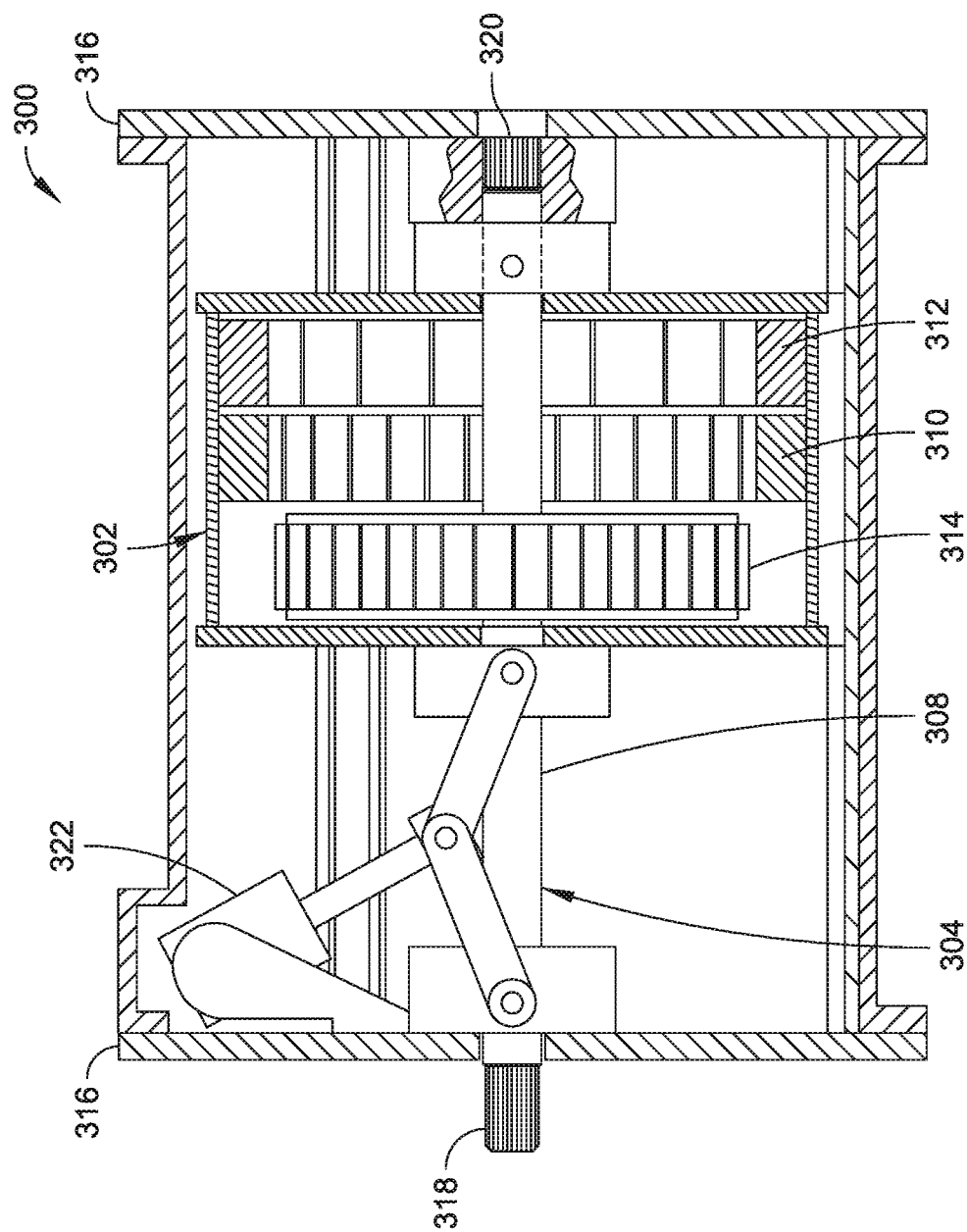
FIG. 5 is a cross-sectional side elevation view of a MGT unit, such as the MGT unit illustrated in FIG. 1, in accordance with an example embodiment of the present disclosure, where a rotor includes a set of magnets, shown in a neutral position.
Figure 6:
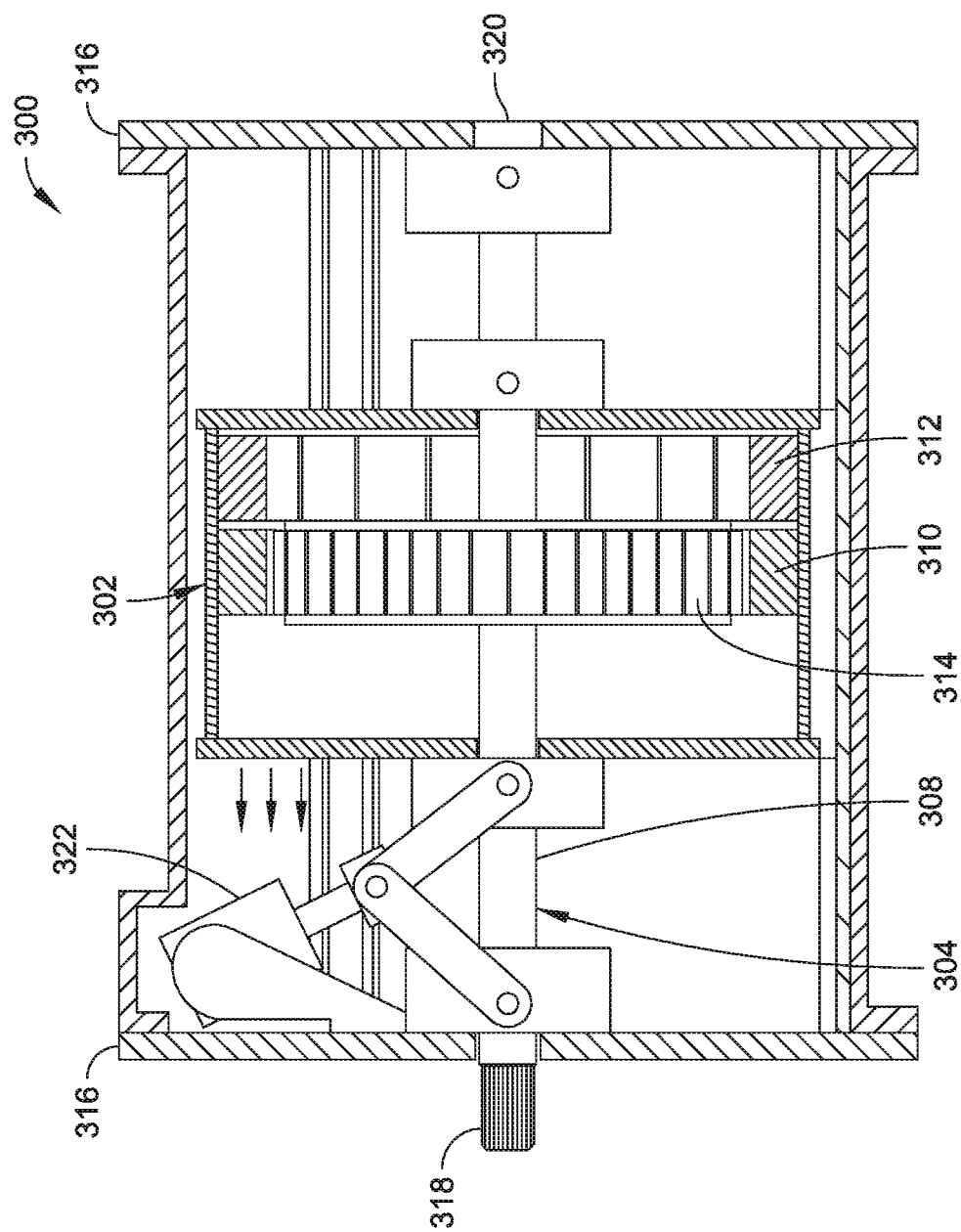
FIG. 6 is cross-sectional side elevation view of the MGT unit illustrated in FIG. 5, where the set of magnets is moved from the neutral position to engage the first stator with the rotor.

The state of the art in permanent magnet electric motors and generators is that the magnetic field of the rotor is not adjustable, but is instead fixed. As a result most motors and generators are designed for a specific speed and torque with a very narrow range of optimum efficiency. High torque requirements in a motor or generator require more powerful permanent magnets which in turn create a large back EMF that is in turn overcome with high voltage and amperage. When motor speed and torque are constant, the motor or generator can be designed for optimum efficiency at its design speed and torque. Many times this efficiency is above 90%. Thus in the manufacture of these motors the stator core, core windings and permanent magnets are all selected to act together in the most efficient manner possible to produce the selected design torque, rpm and volt, amp ratios at an optimum or threshold efficiency. Once these key components are selected and placed in the motor or generator they, under the present state of the art, cannot be changed. Only the power and speed of the driving force in a generator and the volts and amperage of the electricity into the motor can be changed. But when this same motor or generator is put in service where the speed and torque vary widely such as in land vehicles and/or wind or water powered generators, the back EMF of the fixed magnets must still be overcome when the speed and torque requirements are less than the maximum designed for and the stator wiring sufficient and appropriately sized when the speed and torque are greater than the maximum designed for. When they are not, the overall efficiency of the motor or generator dramatically drops in many cases to as low as 20% for say rapid transit vehicles, automobiles, or wind/water powered generators, and the like.

The present disclosure is directed to an electric generator and/or motor transmission system that is capable of operating with high efficiency wide volt and amperage operating range and extremely variable torque and RPM conditions. This disclosure utilizes the variability of renewable resources such as inconsistent wind speed, untimely ocean wave movement or braking energy in a hybrid vehicle and more efficiently increases the generating potential that conventional generators cannot do. On the motor side, the disclosure produces a variable range of torque/RPM possibility to more efficiently meet the requirements of hybrid vehicles. The system can dynamically change the output "size" of the motor/generator, e.g., by varying the magnetic field induced in the stator by switching multiple non-twisted parallel coil wires in the stator between being connected in all series, all parallel or combinations thereof and correspondingly varying, adjusting or focusing the magnetic field of the permanent magnets acting on the stator and modularly engaging and disengaging rotor/stator sets as power demands increase or decrease. And as torque/RPM or amperage/voltage requirements change, the system can activate one stator or another (in multiple MGT units connected to a common computer processor) within the rotor/stator sets and change from parallel to series winding or the reverse through sets of 2, 4, 6 or more parallel, three-phase, non-twisted coil windings to meet the torque/RPM or amperage/voltage requirements to improve (e.g., optimize or nearly optimize) efficiency.

As previously discussed herein, the state of the art in permanent magnet electric motors and generators is that the magnetic field of a rotor is not adjustable but fixed. While it is true that the magnetic field of a permanent magnet is fixed, it is the alternating flow of magnetic flux between the permanent magnets of the rotor and the cores of the stator and the alternating flow of electricity in the wires of the stator core that determine how a permanent magnet motor or generator will operate. Where there is a small amount of magnetic flux flowing between the rotor magnets and the stator core, it is as if the rotor of the motor/generator was fitted with small or lower strength permanent magnets. If the amount of flux flowing between the rotor magnets and the stator core is large, the reverse is true. When small permanent magnets are used in the rotor of a motor, the wires in the stator core coils are appropriately sized with the requisite number of turns to produce a magnetic field in the stator teeth (or cores) that will efficiently react with the magnetic field of the rotor magnets to produce the optimum (or nearly optimum) flux flow or interaction between them and optimum (or nearly optimum) torque or rpm. In the case of a generator, the wires are sized with the requisite number of turns to efficiently accommodate the electricity generated by the alternating flux induced in the stator cores by the permanent magnets on the rotating rotor and will in many cases be different from the wires of the motor even when the permanent magnets are the same size. When large permanent magnets are used in the rotor, the same is true in that the wires of the stator core in both the motor and generator are appropriately sized with the requisite number of turns. The wires and number of amp turns, however, in the large permanent magnet motor is different from the wires and number of turns in the small permanent magnet motor/generator, and the output size of the two motor/generators is dynamically different.

A motor/generator/transmission (MGT) system is disclosed that has an output that can be dynamically changed with more efficient performance over a predefined range than previously possible under the current state of the art. The alternating flux of the permanent magnets flowing from the rotor magnets to the stator cores or interacting with the stator cores can be varied or adjusted with several different techniques, for example: (1) by varying the alignment of the rotor magnets with the stator cores where the radial flux from the rotor magnets is partially, in varying degrees, engaged with the stator cores; (2) utilizing two rotors, one on either side of the center plane of the stator, where the alternating north and south magnetic poles circumscribing the rotors are in the same radial position relative to one another, the distance from the center plane of the stator to the center planes of the rotors can be varied, the polar magnetic fields from the magnets on the two rotors oppose one another, where the combined polar magnetic field between the two rotors is deflected, twisted or focused in the radial direction creating a greater flux field or flow in the radial direction into the stator cores than would be available from the sum of the fields of the two rotors and their respective magnets acting alone—this field is adjusted by moving the rotors closer to each other and to the center plane of the stator, or by moving the rotors further away; and (3) a combination of techniques (1) and (2) acting together on the same stator. Utilizing any of these techniques to adjust the flow of the magnetic flux between the stator and the rotor has a same or similar effect to being able to change the size of the permanent magnets of the MGT system at any time during its operation.

Changing the wiring and number of turns to modify the flux of a stator core and the electricity flowing in a core coil wires is not as easy to adjust or vary as the flux flowing from the rotor permanent magnets. However, this disclosure provides a number of methods and configurations to achieve distinctly different volt/amp characteristics in the stator core coils, where each stator core can be configured for an optimized (or nearly optimized) flux flow between the rotor(s) and the stator by adjusting the polar magnetic flux from the rotor acting on the stator to improve efficiency. This can be accomplished by separating the multi-phase stator wiring at a center tap and providing multiple non-twisted parallel wires in the core windings for each phase leg (and in some cases with wires of different size) with the ability to switch and connect the multiple wires in all series, all parallel, and combinations of parallel and series configurations. In some implementations, one or more wires may be disconnected to provide additional configurations (e.g., dropping from a six wire system to a four wire system, or the like). In some implementations, the phase windings are also switchable from a star or wye (Y) configuration to a delta (e.g., triangle) configuration. In some implementations, the system can provide two separate multi-phase wiring configurations with separate controllers on the same stator, and in some implementations separating the coils in each phase leg (including the multiple wires therein) so that any of the stator phases in either separate multi-phase configuration can be switched (e.g., using electronic switches) to be connected in series, in parallel, or in combinations thereof, in either the star (Y) or Delta configuration.

In embodiments, the MGT system can also be adjusted by joining together multiple modular MGT units (e.g., each having respective stator(s) and rotor(s)) to vary the overall system output. For example, the MGT units can be joined together under common control from a central processor where they may operate together for increased power or at least one can operate while another is in neutral. The MGT units may also be configured to shift back and forth between the different series, parallel, or combination (i.e., series and parallel) wiring and switching combinations to provide smooth transitions between the various combinations. The MGT units can also be shifted back and forth between Delta or Star phase configurations with series/parallel switching of the multiple wires in each phase.

In embodiments of this disclosure, any single MGT unit may have any or all of the combinations of multiple wiring and switching described herein, including switching between Delta and WYE configurations, multiple wire windings in series or parallel or in sets of two or more wires in parallel connected to each other in series, and where the MGT unit/system is multi-pole, the individual coils of a phase winding may be connected in series or parallel or in sets of two or more coils in parallel connected to each other in series, providing a wide range of volt/amp and torque speed ratios in a single motor/generator that is electronically reconfigurable to meet widely varying conditions. This feature coupled with mechanical shifting of the rotor magnetic field between the first stator, the second stator or more stators in one or more MGT units (e.g., being able to control no engagement of any stator and/or the partial engagement of one or any combination of two stators) and the ability to focus the magnetic field of the rotor or rotors on the stator cores provides an ability through a computer system processor to select and quickly change the winding configuration of the stator to meet widely variable speed and torque requirements that may be placed on the MGT unit/system at optimum (or near optimum or otherwise selected) energy efficiency. The ability to have the magnetic field of the rotor engaged with a first stator in a first wiring configuration, switching the second stator to a second wiring configuration and then transitioning the magnetic field of the rotor from the first stator to the second stator provides for a smooth transfer of power between the torque/speed of the first setting and the torque/speed of the second setting and further allows the computer system by fine tuning the degree of engagement between the rotor magnets and the stator coils to adjust, increase or diminish, the strength of the magnetic field between the rotor magnets and the stator to optimize the power efficiency of the MGT unit/system at most any desired speed and torque. The same smooth transition of power applies when both stators are engaged with the magnetic field of the rotor and the stators are switched from one wiring configuration to another by switching the first stator and then the second stator and in the interval between the switching, the engagement of the magnetic field with one or both stators is adjusted to accommodate a smooth transition between the two wiring configurations and improve the power efficiency of the MGT unit/system.

This disclosure also provides systems and methods for adjusting the magnetic field of the permanent magnet rotor in an electric motor or generator. It does so by adjusting or focusing the magnetic field acting on the stator cores to meet the torque speed requirements of the motor or generator at any given time. By reducing or increasing the magnetic field acting on the stator core, the MGT system in turn reduces or increases the back EMF and requires lower or higher voltage and amperage (power) to run the motor, or varies torque (e.g., wind speed) needed to turn a generator, thereby allowing the motor/generator employing the MGT system to adjust the back EMF to meet varying conditions and operate the motor/generator at greater efficiency over much wider ranges than ever before possible. With these capabilities the MGT system can control the strength of the interaction of the magnetic fields of both the rotor(s) and the stator over a relatively uniform range of variable power requirements with high efficiency. The efficiency of any electric motor is dependent on the balance between the electromagnetic field of the stator and the electromagnetic field of the rotor interacting with the stator. The state of the art inverter/controller in the MGT unit can regulate the voltage coming from the batteries or other electrical source which in turn regulates the amperage in the stator coil wires within the capacity of the wires and voltage source. The MGT unit can switch between different wiring combinations with a different resistance in each creating a different range of amperage turns in each wiring combination as the inverter/controller through the computer processor increases the voltage in each wiring configuration from low to high. The different wiring configurations are then configured, combined, and coordinated with the voltage regulation so that the overall range of the amperage flowing in the stator coils can be uniformly regulated (increased or decreased) over a greatly extended range as the computer processor switches the wiring from one configuration to the next correspondingly changing the value of the amp turns in the stator coils and the resulting magnetic field strength. With the MGT units ability to focus or control the magnetic field of the rotor magnets interacting with the stator coils over a much larger range from low to high by the movement of the rotor or rotors with respect to the stator, the computer process may be configured make the position of the rotor with respect to the stator a function of the amp turns in the stator coils so that the rotor is positioned to provide the optimum efficiency or balance between the magnetic fields of the stator coils and the rotor permanent magnets.

A linear motor/generator/transmission (LMGT) system configured to actively vary and focus the magnetic field from its permanent magnets is also disclosed. In embodiments, the LMGT system includes a guideway with rails or other linear motion guiding mechanism and a plurality of stator cores and coils evenly disposed along the length and in the center of the guideway. Each phase of the plurality of stator coils includes, in sets of three or more coils, a respective set of parallel non-twisted wires with electronic switches for connecting the parallel non-twisted wires of each phase of the three or more stator coils all in series, all in parallel, or in a combination of series and parallel. The LMGT system also includes carriage that can travel along the guideway with wheels or other linear motion device and at least two or more magnet holding bars (also referred to herein as "magnet bars") with alternating pole magnets mounted thereon. Each successive magnet, if more than one, on each magnet bar is mounted in front of the other in the direction of the carriage travel where the two or more magnet bars are slidably mounted to the carriage, parallel to and on either side of the longitudinal centerline of the carriage such that when adjacent to the center line and each other they are positioned over the stator coils and may be slide ably translated away from the center line of the carriage to a position where they are not over the stator coils.

Example Implementations—MGT Including Selectively Moveable Stator(s)

Referring generally to FIGS. 1 through 6, MGT units and systems are described in accordance with some embodiments of this disclosure. FIG. 1 shows an MGT unit 300, which in some embodiments can be connected to one or more additional MGT units 300 to form a larger MGT system. As shown in FIGS. 2 through 6, the MGT unit 300 includes a rotor 314 that is rotatably coupled to an axle 308. The rotor 314 and the axle 308 to which the rotor is fixed have an axis of rotation 306, where the axle 308 extends longitudinally in a first direction along the axis of rotation 306. The MGT unit 300 also includes stator cage 302 that also extends longitudinally in the first direction and includes one or more stator rings (e.g., a first stator ring 310, a second stator ring 312, and possibly a third stator ring, a fourth stator ring, and so on), where each of the stator rings includes a plurality of stator cores with their respective coils/windings disposed about a periphery of the stator ring. In embodiments of the disclosure, the stator rings are spaced apart from one another in the first direction. The rotor 304 includes at least one rotor ring 314 with permanent magnets disposed about the periphery of the rotor ring 314. The rotor ring 314 can be coupled with the axle 308.

In embodiments of the disclosure, the stator ring 310 and the stator ring 312 are actuatable between three or more positions. The stator ring 310 and the stator ring 312 can be contained within stator cage 302 or coupled to any other support structure that is moveable by an actuator. The stator ring 310 and the stator ring 312 may each have different cores and/or winding configurations so that operating characteristics of an MGT unit 300 can be changed when the stator ring 310 and the stator ring 312 translate between a first stator position where the stator ring 312 is engaged with the rotor ring 314; a second stator position where the stator ring 310 is engaged with the rotor ring 314; and a third position where neither the stator ring 310 nor the stator ring 312 is engaged with the rotor ring 314. It should be noted that the order of stator positions is provided by way of example and is not meant to limit the present disclosure. In other embodiments, a neutral stator position can be positioned between two stators. A neutral stator position can also be at a different end of the MGT unit 300. Further, an MGT unit 300 can include more than one neutral position and so forth. In embodiments of the disclosure, the magnets of the rotor ring 314 can be equally spaced on the periphery of the rotor ring 314, where the outer peripheral surface of the magnets is at a defined minimal distance (e.g., gap) from the inner peripheral surface of the stator ring 310/312 core surface, causing electricity to flow in the stator windings as the rotor ring 314 rotates if acting as a generator, or causing the rotor ring 314 to rotate if electric current is supplied to the stator windings from an external source.

The stator rings 310 and 312 and be identical, reconfigurable, and/or differently structured. For example, the stator rings 310 and 312 can employ different stator windings or selectively reconfigurable stator windings (e.g., as described herein) to provide different power, torque, amperage, and/or voltage capacities and efficiencies. In some embodiments, a computer system can be used to send commands to the actuators of the stator rings to move them in and out of stator positions to achieve enhanced efficiency under widely varying input and output conditions, such as wind powered generators, motors for city busses, and so forth. In embodiments, an actuator 322 (e.g., a stepper motor, linear actuator, or the like) can be directly or indirectly coupled with the stator ring 310 and the stator ring 312. In some embodiments, the actuator 322 can include an arm configured to drive the stator cage 302 containing the stator ring 310 and the stator ring 312, thereby causing stator ring 310 and the stator ring 312 to move relative to the rotor ring 314 to a desired position.

In embodiments of the disclosure, multiple MGT units 300 can be connected together (e.g., end-to-end as described with reference to FIG. 1). For example, the axle 308 can be configured as a modular shaft, and multiple modular shafts can be connected together to form, for instance, a common axle. In some embodiments, each MGT unit 300 can include one or more endplates 316, which can include bearings (e.g., rotary bearings). In some embodiments, the axles 308 of two or more MGT units 300 can be connected together to allow additional MGT units 300 to be added inline (e.g., under a common control system to form larger and more powerful units with variable torque and/or power capabilities). The axle 308 of a first MGT units 300 can include a male end 318 configured to extend into a receiving cavity of an endplate 316 of an adjacently positioned second MGT units 300, whereby the male end 318 can connect to a female end 320 of an axle 308 of a second MGT unit 300.

Example Implementations—MGT Including Selectively Moveable Rotor(s)

Referring generally to FIGS. 16 through 24, MGT units 400 and systems are described in accordance with additional embodiments of this disclosure. FIGS. 16 through 24 shows an embodiment of an MGT unit 400/system that employs variable torque magnetic focusing. For example, an MGT unit 400 can be configured to focus and regulate the interaction of the magnetic flux between rotor rings 444 and at least one stator ring 439. To do this, the MGT unit 400 employs at least two rotors, one located on either side of a center plane of the stator ring 439, such that they can each be translated towards the center plane of the stator or away from it. As the rotor rings 444 are translated from their furthest point from the center plane of the stator, towards the center plane of the stator the interaction of the magnetic flux between the rotor rings 444 and the stator ring 439 increases, thereby allowing the magnetic flux to be focused (e.g., adjusted) so that the magnetic interaction between the rotor rings 444 and the stator ring 439 can be controlled to optimize or improve system efficiency.

Figure 22:
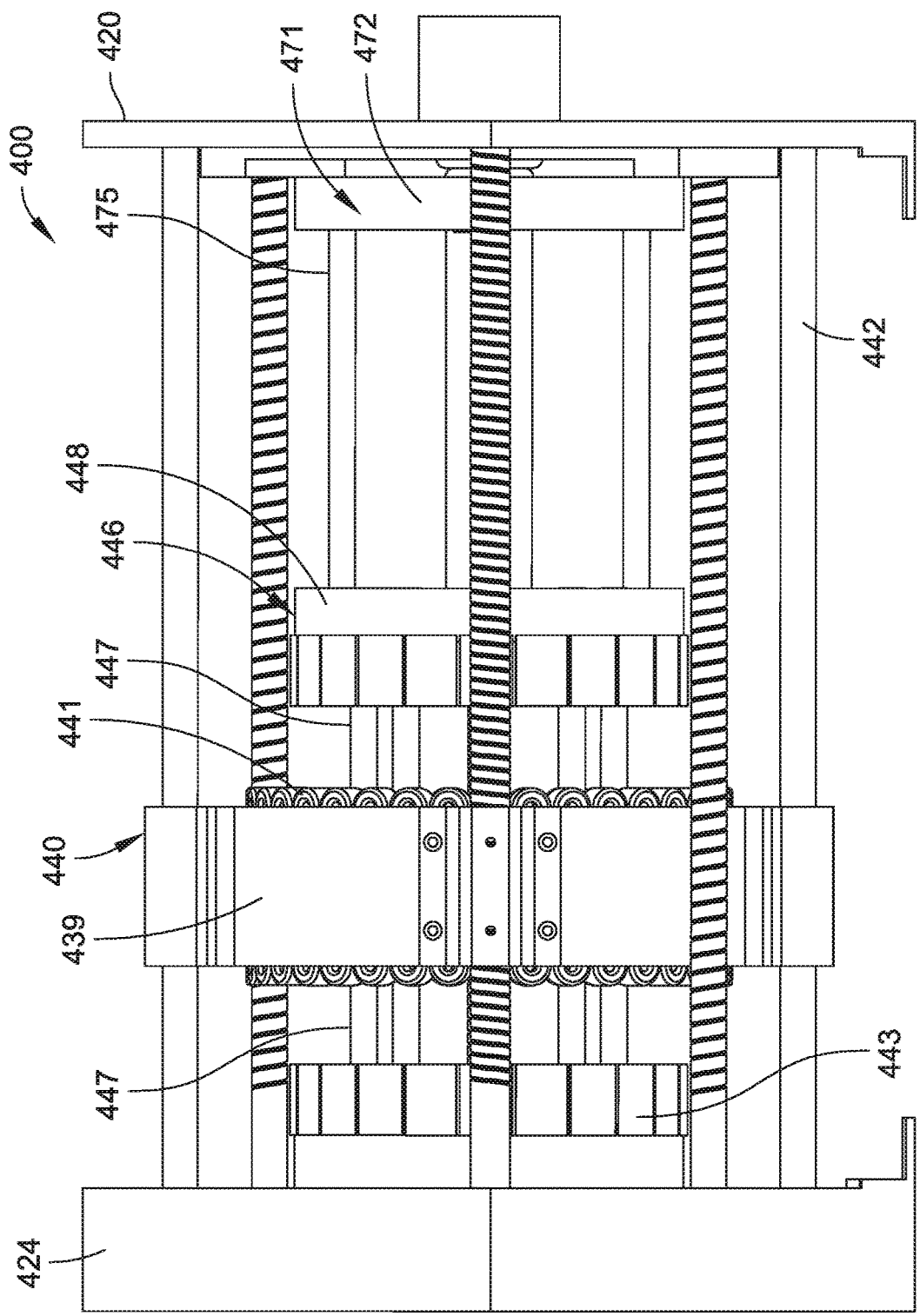
FIG. 22 is a side elevation view of the MGT unit illustrated in FIG. 16 with a portion of its housing removed, in accordance with an example embodiment of the present disclosure, where two rotors are shown apart from one another, in positions that are a distance from a stator of the MGT unit (Position 1)
Figure 23:
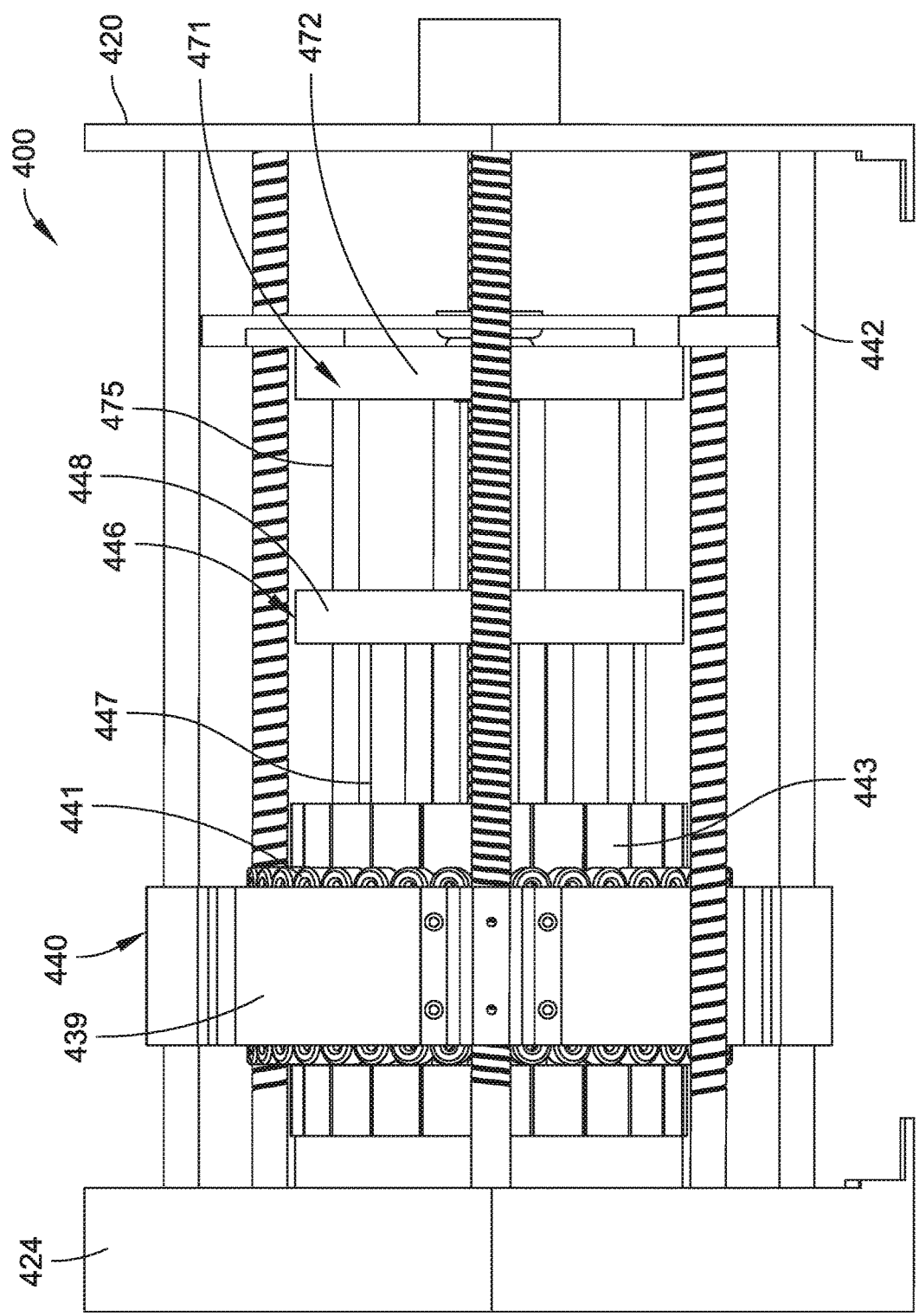
FIG. 23 is a side elevation view of the MGT unit illustrated in FIG. 16 with a portion of its housing removed, in accordance with an example embodiment of the present disclosure, where two rotors are shown apart from one another and an inner edge of each rotor is coplanar with an outer edge of the stator (Position 2)
Figure 24:
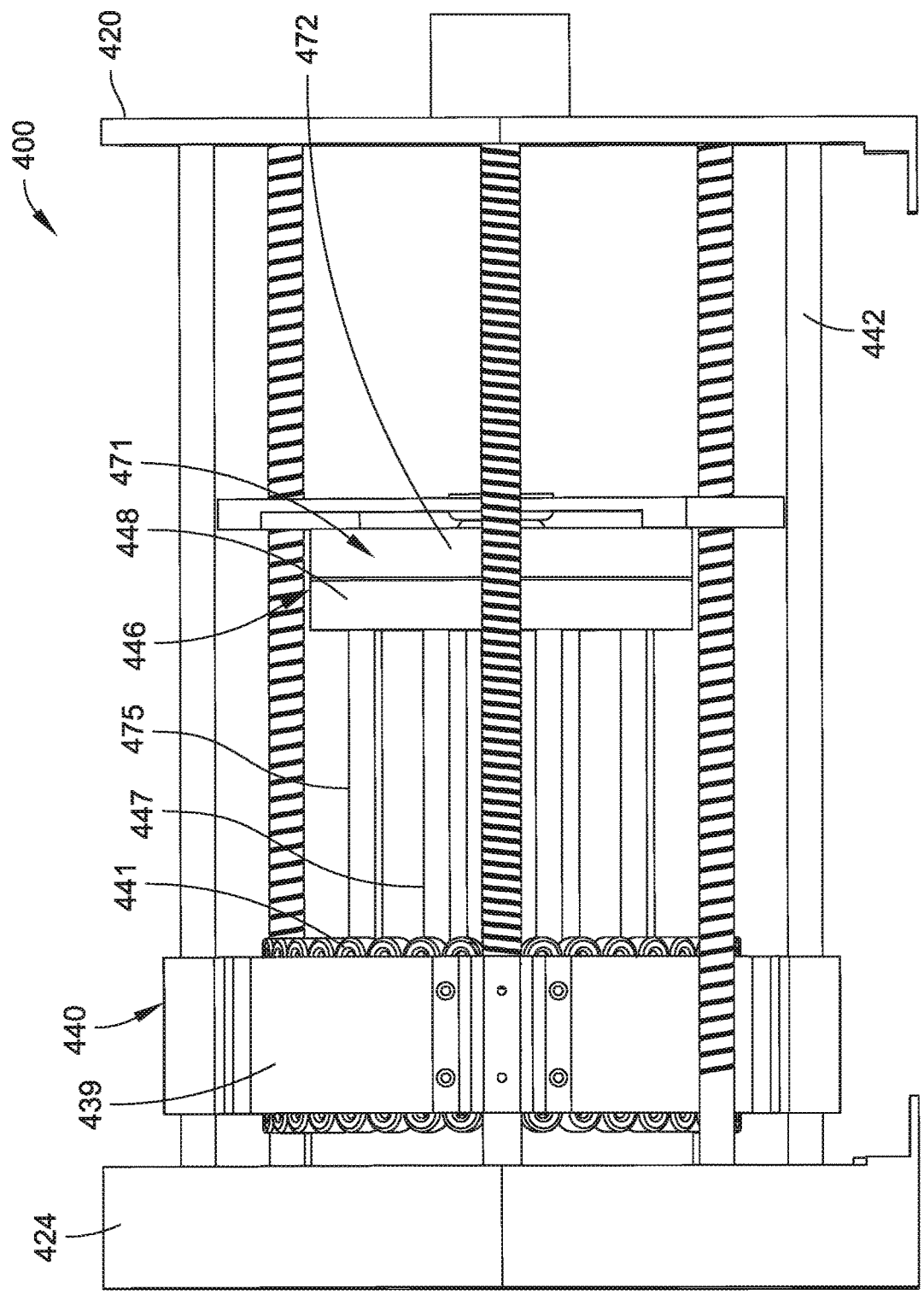
FIG. 24 is a side elevation view of the MGT unit illustrated in FIG. 16 with a portion of its housing removed, in accordance with an example embodiment of the present disclosure, where two rotors are brought together and inner edges of the two rotors are coplanar with a central plane of the stator (Position 3)

In an example implementation, the rotor rings 444 can be translated between at least the following positions: (1) a first position where the inside edges of the rotor rings 444 are approximately one rotor length or more (length of the permanent magnets 443 in the axial direction) from the outside edge of the stator ring 439 (e.g., as shown in FIG. 22); (2) a second position where the inside edges of the rotor rings 444 are in line with the outside edges of the stator ring 439 (e.g., as shown in FIG. 23); and a third position where the inside edges of the rotor rings 444 are in line with the center plane of the stator ring 439 (e.g., as shown in FIG. 24). In the first position (1), there is minimal or no interaction of the magnetic flux between the rotor rings 444 and stator ring 439 and no or minimal flow of electricity in the stator wires when the rotor is turned by outside forces. This can be considered as a neutral position for the MGT unit 400. As the rotor rings 444 are translated from the first position (1) to the second position (2), the polar magnetic fields of the permanent magnets 443 on the rotor rings 444 begin to oppose one another and deflect or focus in the radial direction towards the stator cores creating a greater interaction or magnetic flux flow between the rotor magnets 443 and the stator cores than the sum of the two rotors and their respective magnets 443 would produce from the same position alone and, where the interaction of the magnetic field from the rotor rings 444 to the stator ring 439 increase exponentially as the rotor rings 444 are moved from the first position (1) to second position (2) but is of low value but sufficient as a generator to provide low or trickle power to recharge the batteries over time in a hybrid vehicle operating under combustion power with no or minimal additional drag on or additional power required from a combustion engine. As the rotor rings 444 are translated from the second position (2) to the third position (3) the interaction of the magnetic field or flux flow from the rotor rings 444 to the stator ring 439 increases linearly to the maximum interaction or flux flow between the rotor magnets 443 and the stator cores as does the power generated when acting as either a generator or motor.

Figure 19:
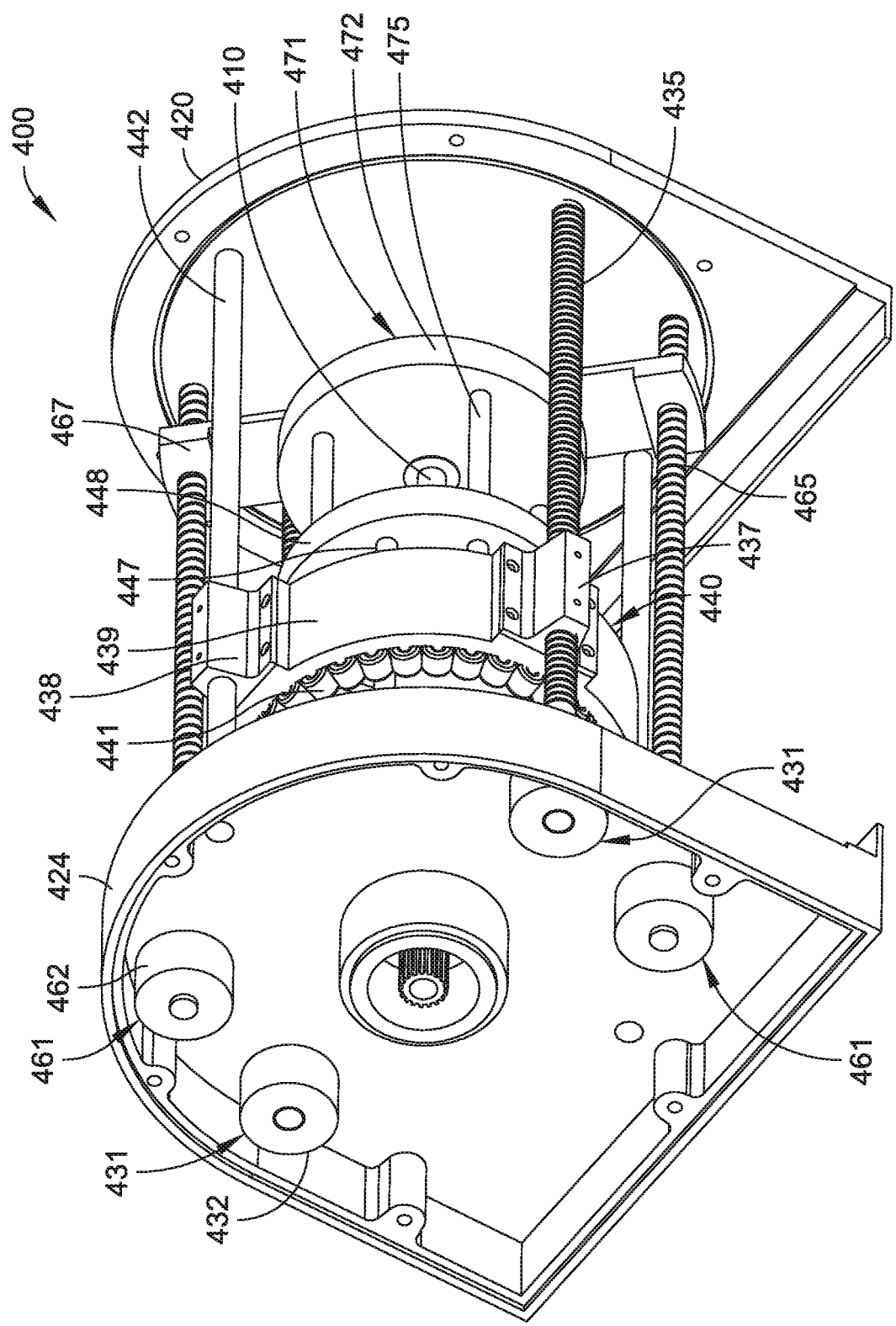
FIG. 19 is another perspective view of the MGT unit illustrated in FIG. 16 with a portion of its housing removed, in accordance with an example embodiment of the present disclosure.
Figure 20:
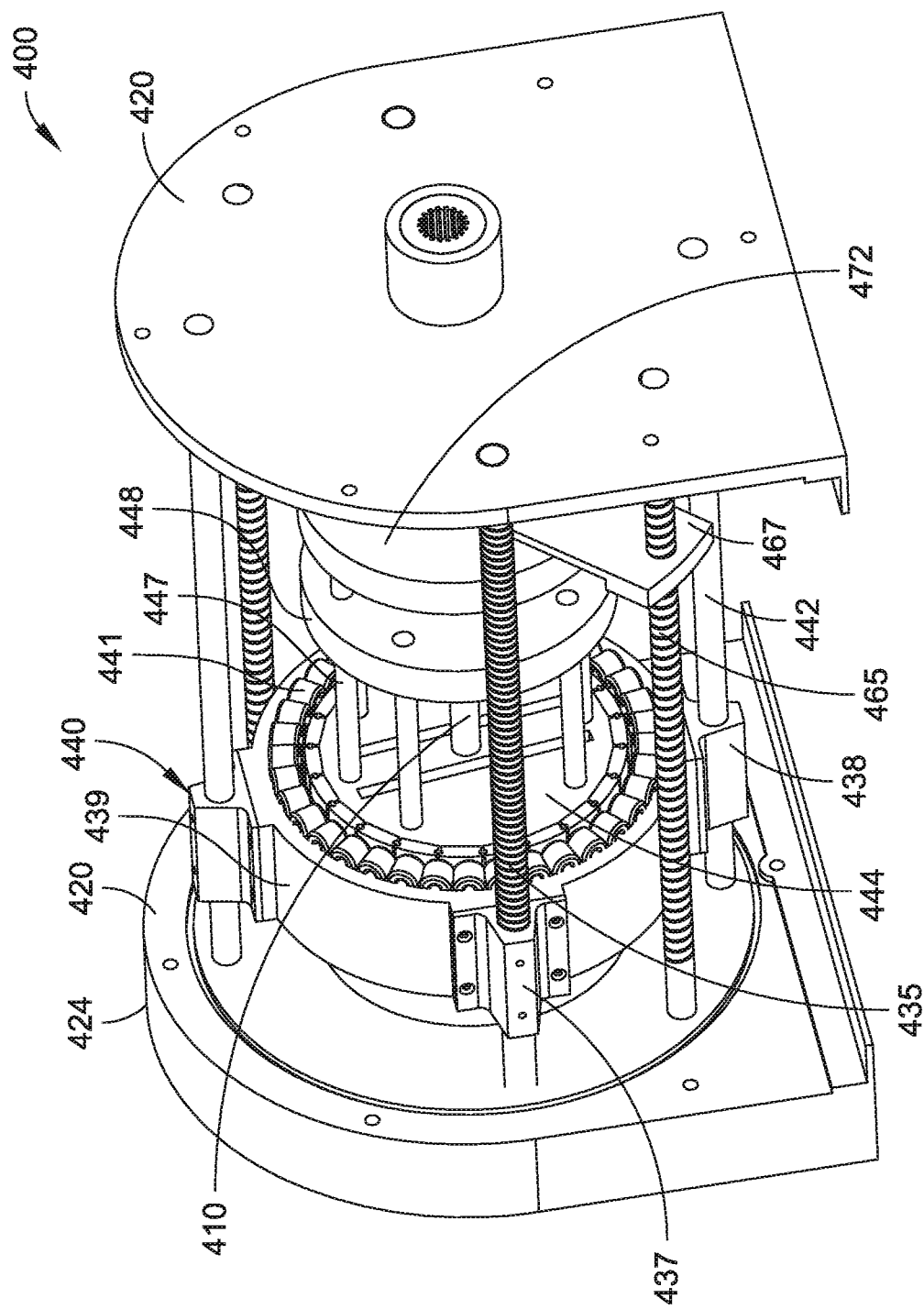
FIG. 20 is another perspective view of the MGT unit illustrated in FIG. 16 with a portion of its housing removed, in accordance with an example embodiment of the present disclosure.
Figure 21:
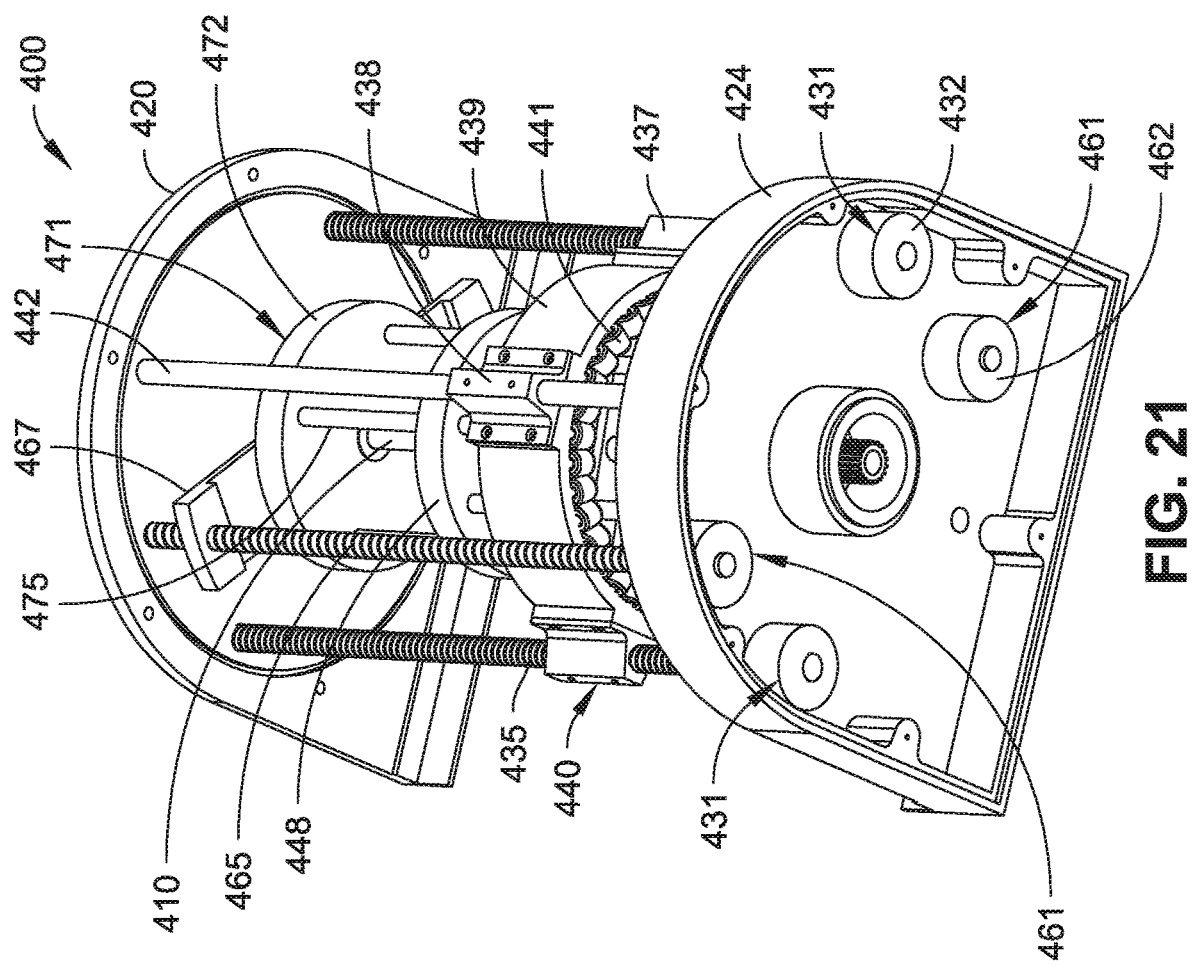
FIG. 21 is another perspective view of the MGT unit illustrated in FIG. 16 with a portion of its housing removed, in accordance with an example embodiment of the present disclosure.

Referring generally to FIGS. 16 through 24, the MGT unit 400 may have a housing including a cover 430, a front end plate 420, a rear end plate 420, and an end plate cover 422. As shown in FIG. 19, the front end plate 420 and the end plate cover 422 provide an enclosure for a motor control box 424 that can include linear actuator stepper motors 432 and 462 and wiring connections (not shown). The MGT unit 400 can include an axle 410 with a fluted male connecting end and a fluted female connecting end and bolting connections for joining the MGT unit 400 with other MGT units 400. The connecting end may be of any style that allows two or more MGT units 400 to be physically mated whereby their axles 410 are joined and turn as one common axle. An end plate 420 may also accept an adaptor plate in compliance with industry standards for joining other manufactured equipment including automotive engines and transmissions. The front and rear end plates 420 of two or more MGT units 400 may be bolted together to ensure the physical continuity of any number of modules.

The rear end plate 420 may be of any style that allows another MGT unit 400 to be mated to it, whereby their axles 410 are joined and turn as one common axle. The rear end plate 420 provides a housing for a fluted female end of the axle 410 and bolting connections for joining it to other MGT units 400. The rear end plate may also accept an adaptor plate in compliance with industry standards for joining other manufactured equipment including automotive engines and transmissions. The front and rear end plates of two or more MGT units may be bolted together to ensure the physical continuity of any number of modules.

The rotor rings 444 can be slidably coupled to a rotor support structure 446 that is coupled to the axle 410. The rotor support structure 446 can include two end disks 448 spaced apart and affixed perpendicular to the axle 410 through their center points, a plurality of (e.g., three or more) linear slide rods 447 parallel to the axle 410, radially outward of the axle 410 and equally spaced around the axle 410, affixed on each end to an end disk 448. The rotor support structure 446 rotates with the axle 410. In one implementation, the forward end disk 448 is affixed to the axle 410 near the end plate 420, and the rear end disk 448 includes three or more holes through the rear disk in the axial direction outward from the axle 410 and equally spaced around the axle 410 with bushings or linear bearings (not shown) to allow the passage and free movement of the rotor push rods in the axial direction through the rear end disk 448 but maintain their radial position relative to the axle 410.

A rotor pusher/puller 471 can include a pushing disk 472 spaced apart and rearward of the rear rotor ring 444 and rear rotor support end disk 448. The pushing disk 472 is slidably affixed to the axle 410 through its center point by means of a bushing or linear bearing (not shown) to allow translation of the pushing disk 472 in the axial direction. The rotor pusher/puller 471 also includes a plurality of (e.g., three or more) linear slide rods 475 spaced and outward from the axle 410, equally spaced around the axle 410 passing through the bushings or linear bearings in the rotor support rear end disk 448 and affixed to the rear rotor.

A translator bar 467 can comprise a flat bar with a hole in the center of the bar perpendicular to the flat face of the bar. The translator bar 467 extends in both directions away from the center hole (a hole slightly larger in diameter than the MGT axle 410 diameter, where the axle 410 may pass through the hole in the translator bar 467 perpendicular to the bar and where the bar is affixed to the rear face of the pushing disk 472 by thrust bearings and is affixed on each end to the rotor linear actuator screw bars 465. The linear actuator screw bars 465 are mounted parallel to the axle 410 outward of the rotor rings 444, rotor support structure end plates 420 and the stator, and they extend through threaded holes in each end of the translator bar 467 so that as the rotor support structure 446 and the rotor pusher/puller 471 rotate with the axle 410—the translator bar 467 does not necessarily but may move or translate in the axial direction when the linear actuator screw bars 465 are turned clockwise or counter clockwise. Thus, as the translator bar 467 is moved in the axial direction the rotor pusher/puller 471 is moved in the same direction as is the rear rotor ring 444.

The MGT unit 400 also includes rotor linear actuators 461 that receive commands from the computer system to activate and turn the two or more threaded rotor linear actuator screw bars 465 which extend through the threaded holes in the translator bar 467 causing the translator bar 467 to move back and forth in the axial direction as the screw bars 465 are turned. The threaded rotor linear actuator screw bars 465 are parallel to the axle 410 and outward of the rotor rings 444, stator ring 439, rotor pusher/puller 471, and rotor support structure 446 and are rotationally affixed to the MGT end plates 420 extending through the front end plate 420 where the stepper motors 462 are attached either as a direct drive with one stepper motor each or a single stepper motor and chain or belt drive to each. The connection between the translator bar 467 and the actuator screw bars 465 may be a conventional male threaded screw bar and female threaded holes in the translator bar 467 or a conventional ball screw arrangement.

A stator support structure 440 can include two or more linear slide bars 442 equally spaced around the axle 410, parallel to it, outward of the rotor, stator, rotor pusher/puller 471 and rotor support structure 446. The stator support structure 440 extends between the front and rear end plates 420. Linear bearing blocks 438 can be slidably affixed to the stator support structure 440 to translate in both directions between the end plates 420, where the linear bearing blocks 438 are in turn affixed to the stator ring 439 holding the stator ring 439 in a position where its central axis is coaxial with the axis of the MGT axle 410, and the circumferential face of its stator cores is separated from the circumferential rotor magnet face by a small air gap.

The MGT unit 400 can also include stator linear actuators 431 (e.g., stepper motors 432) that receiving commands from the computer system to activate and turn the two or more threaded stator linear actuator screw bars 435. The threaded stator linear actuator screw bars 435 are parallel to the axle 410 and outward of the rotor rings 444, stator ring 439, rotor pusher/puller 471 and rotor support structure 446 and are rotationally affixed to the MGT end plates 420 extending through the front end plate 420, where the stepper motors 432 are attached either as a direct drive with one stepper motor each or a single stepper motor and chain or belt drive to each. Linear screw or ball screw bearing blocks 437 are affixed to each screw bar 435 to translate back and forth in the axial direction as the screw is turned by the stepper motor 432 which are in turn affixed to the stator ring 439 causing it to be positioned in a defined spot relative to the rotor rings 444 based on commands from the computer system.

In embodiments, the stator ring 439 can comprise laminated iron plate rings stacked together in the axial direction with slots through the plates forming teeth (cores) on the inner surface of the stator ring 439 such that when stacked together wires may be inserted in the slots that run the length of the stator in the axial direction parallel to the MGT axle 410 (e.g., in a manner consistent with normal industry practice for the state of the art of stators for electric motors). Wires are placed in the slots by winding the wire around one or more teeth (cores) to form a coil 441 and a successive series of coils 441 evenly spaced around the periphery of the stator ring 439, e.g., in a manner consistent with normal industry practice for the state of the art for the wiring of multi-phase electric motor stators except that the wires of each coil 441 phase leg include two or more non-twisted wires parallel to each other and separated at the center tap in a switching system that can place the multiple wires all in series, all in parallel, or a combination of series and parallel to achieve a number of different wiring configurations that depends on the number of wires. The switching system can also be configured to place the phase wiring in the star/wye ("Y") or Delta wiring configurations where the voltage amperage and frequency of the power to the coils 441 is controlled according to commands by the computer system. Example implementations of various stator winding configurations are further discussed herein. Any of the stator winding and switching system implementations can be applied to any embodiment of an MGT unit 400 described herein.

The rotor rings 444 include permanent magnets 443, which may be evenly spaced around the periphery of an iron disk or disks. The rotor rings 444 are affixed to the linear slide rods 447 of the rotor support structure 446 and at least one of the rotor rings 444 is slidably affixed to the linear slide rods 447 running through bushings or linear bearings in the rotor disk securing the rotor rings 444 so that their axis of rotation is collinear with the axle 410 axis of rotation. When the rotor rings 444 are positioned beneath the stator ring 439, the outer surfaces of the rotor rings 444 are separated from the inner surface of the stator ring 439 by a small air gap. The slidably affixed rotor rings 444 may be moved in the axial direction based on commands from the computer system to the rotor linear actuator 461 to be positioned in a defined spot relative to the stator ring 439.

As previously discussed herein, FIGS. 22 through 24 show example positioning of the rotor rings 444 relative to the stator ring 439. For example, FIG. 22 shows the rotor rings 444 positioned by the linear actuators on either side of the stator ring 439 (approximately one rotor length in the axial direction apart from the edge of the stator ring 439) where the interaction of the flux between the rotor magnets 443 and the stator windings is a very low (e.g., negligible or nonexistent) and the MGT unit 400 is effectively in a neutral position.

FIG. 23 shows the rotor rings 444 positioned on either side of the stator ring 439 where the outer edges of the stator ring 439 and the inner edges of the rotor rings 444 are in near alignment. In this positioning, the interaction of the flux between the rotor magnets 443 and the stator windings is low, as is the force to turn the rotor rings 444. If the MGT unit 400 is employed in a generator, this makes it feasible, e.g., in hybrid vehicles, to generate recharge power to the batteries while the vehicle is being operated under combustion power and to do so with no or minimal additional power from the combustion engine, operating essentially on waste inertial power from the moving vehicle. As the rotor rings 444 are moved from the neutral position to the edge of stator alignment, the voltage generated when operating as a generator at constant RPM increases exponentially from zero or near zero to the low value achieved when the inner edges of the rotor rings 444 are aligned with the outer edges of the stator ring 439.

FIG. 24 shows the rotor rings 444 brought together within or substantially within coverage of the stator ring 439, e.g., with their inner edges centered on the center plane of the stator ring 439. In this positioning, the interaction of the flux between the rotor magnets 443 and the stator windings may be at its maximum and the voltage generated when operating as a generator can also be at its maximum. At any point between where the inner edges of the rotor rings 444 are at the outer edges of the stator ring 439 and where the inner edges of the rotor rings 444 is at the center plane of the stator ring 439, the voltage generated is proportional to the distance of the inner rotor ring edges from the outer stator ring edges to the center plane of the stator ring 439, which may be the maximum value.

It is noted that while three distinct positions for the rotor rings 444 relative to the stator ring 439 are described herein, the rotor rings 444 and optionally the stator ring 439 can be repositioned at any number of positions allowed by the components (e.g., slide bars, translator bar, actuators, etc.) of the MGT unit 400. In this regard, the MGT unit 400 can be magnetically focused with a high degree of precision to optimize overall system efficiency, whether employed as a motor or a generator.

FIGS. 25 through 36 show another embodiment of an MGT unit 500/system that employs variable torque magnetic focusing. The difference between the embodiment shown in FIGS. 25 through 36 and the embodiment shown in FIGS. 16 through 24 lies in the method and manner of translating the rotor rings 544 and possibly the stator ring 539 to reconfigure the components to positions 1, 2 and 3 (described above) and any positions in between. It is further contemplated that additional methods of repositioning the rotor rings 544 and possibly the stator ring 539 can be employed without departing from the scope of this disclosure.

Figure 25:
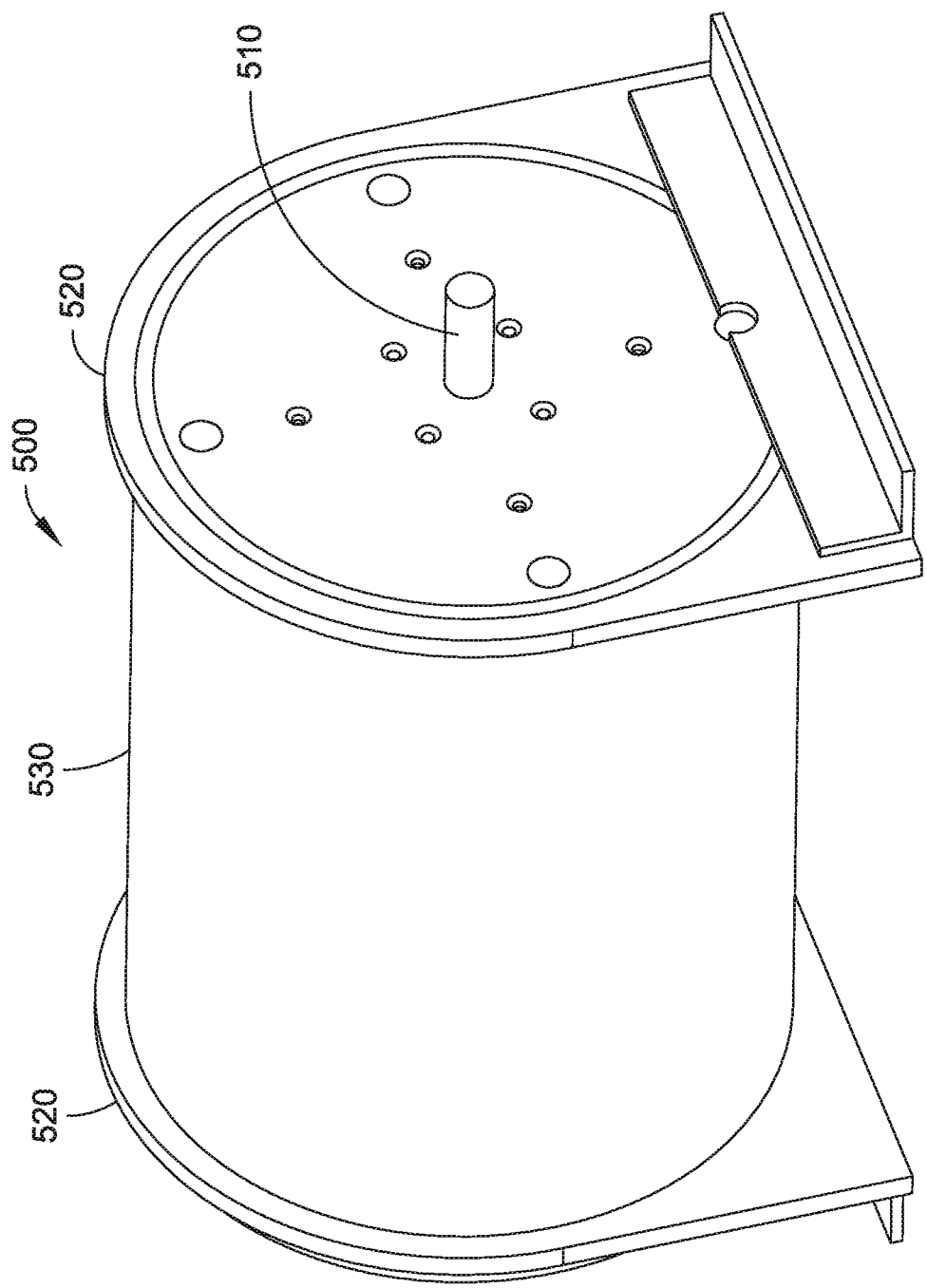
FIG. 25 is a perspective view illustrating MGT unit, in accordance with an example embodiment of the present disclosure.

FIG. 25 shows an embodiment of the MGT unit 500 having a housing including a cover 530 and end plates 520

Figure 26:
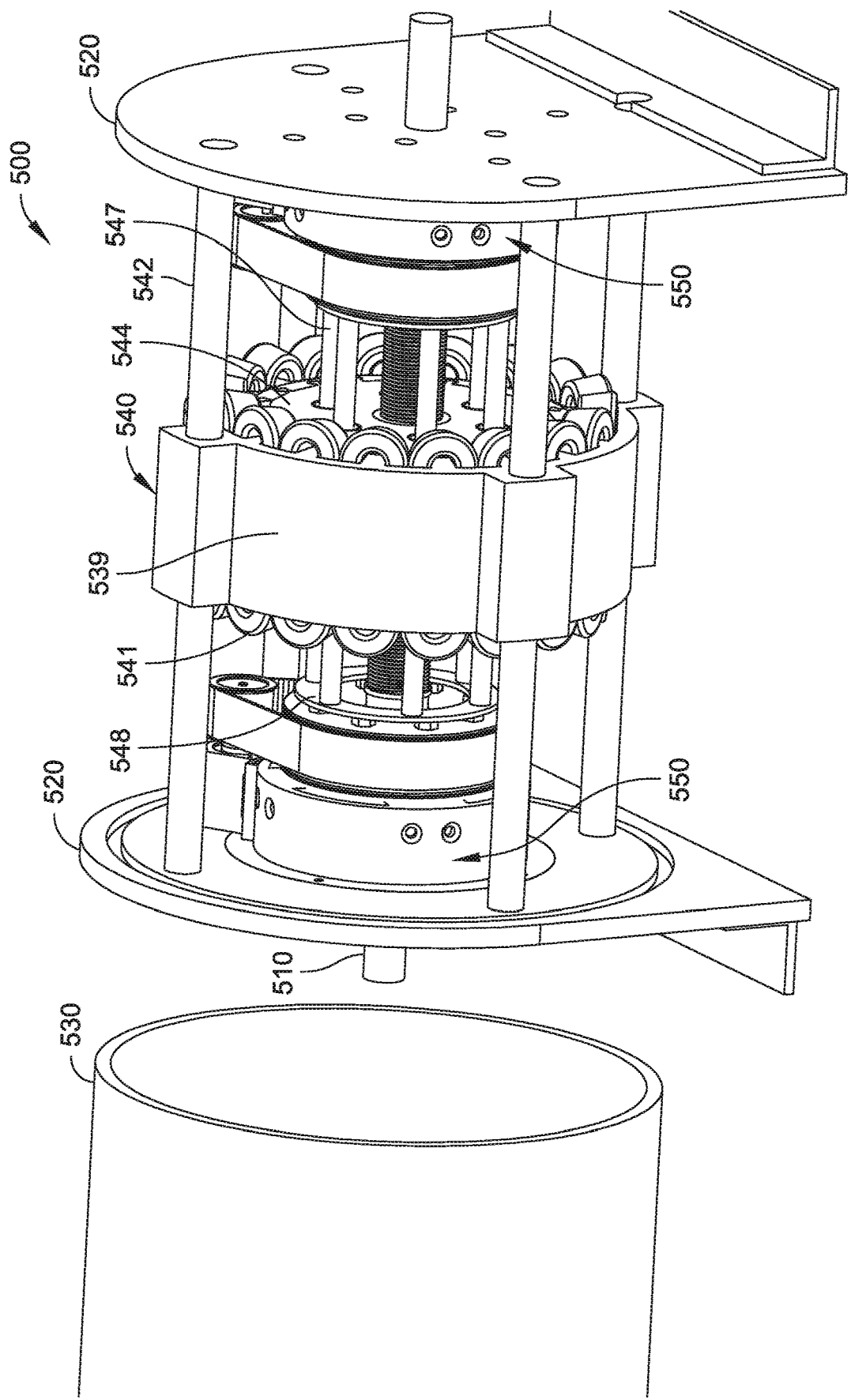
FIG. 26 is another perspective view of the MGT unit illustrated in FIG. 25 with a portion of its housing removed, in accordance with an example embodiment of the present disclosure.
Figure 27:
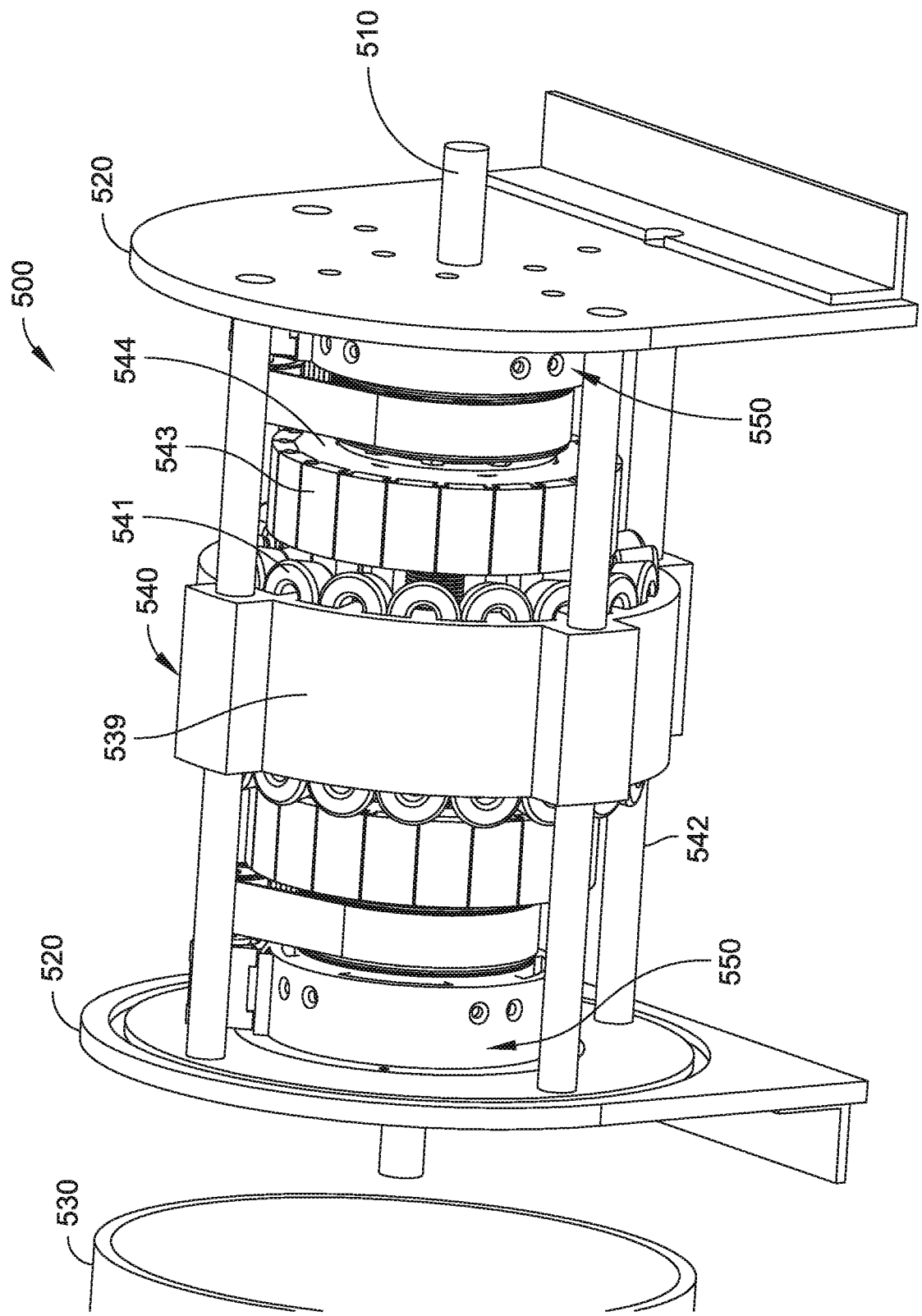
FIG. 27 is another perspective view of the MGT unit illustrated in FIG. 25 with a portion of its housing removed, in accordance with an example embodiment of the present disclosure.
Figure 28:
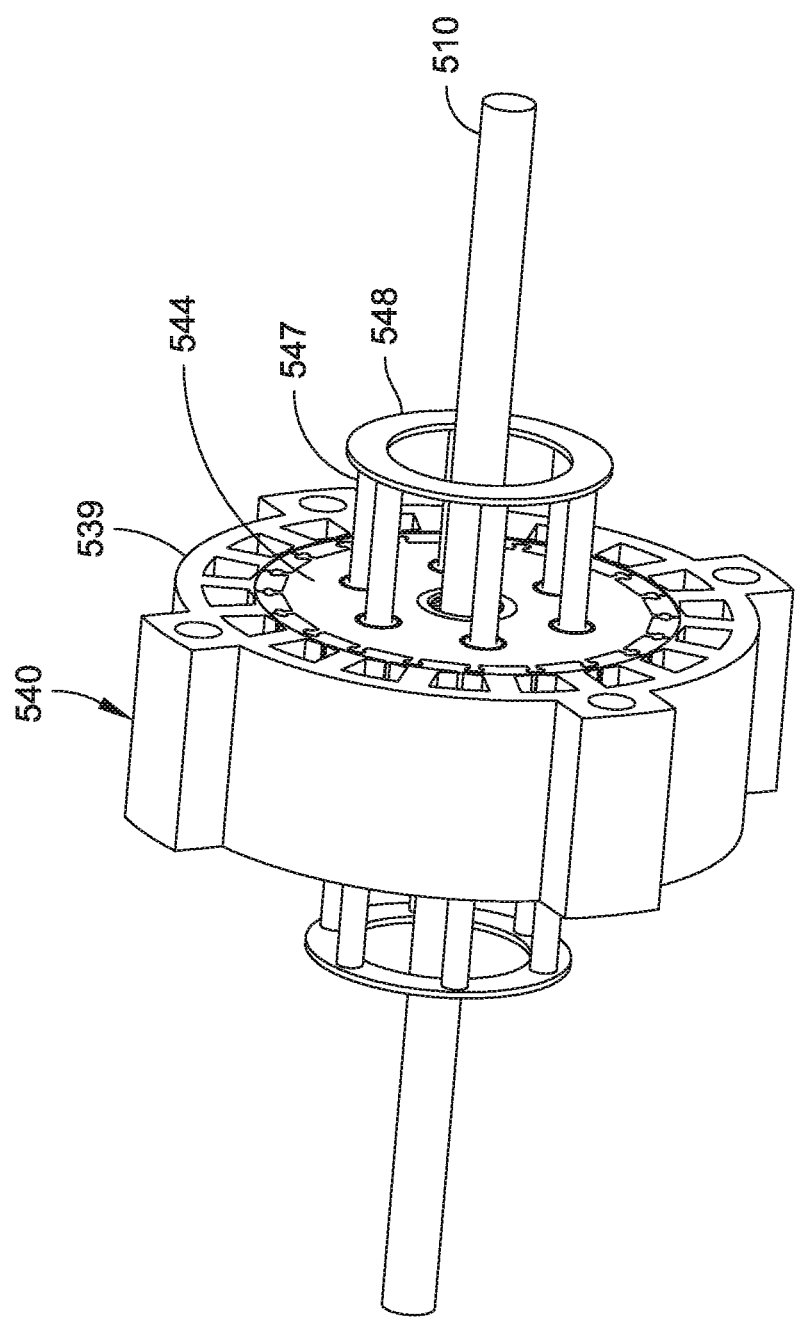
FIG. 28 is a perspective view of a rotor assembly at least partially surrounded by a stator ring of the MGT unit illustrated in FIG. 25, in accordance with an example embodiment of the present disclosure.
Figure 29:
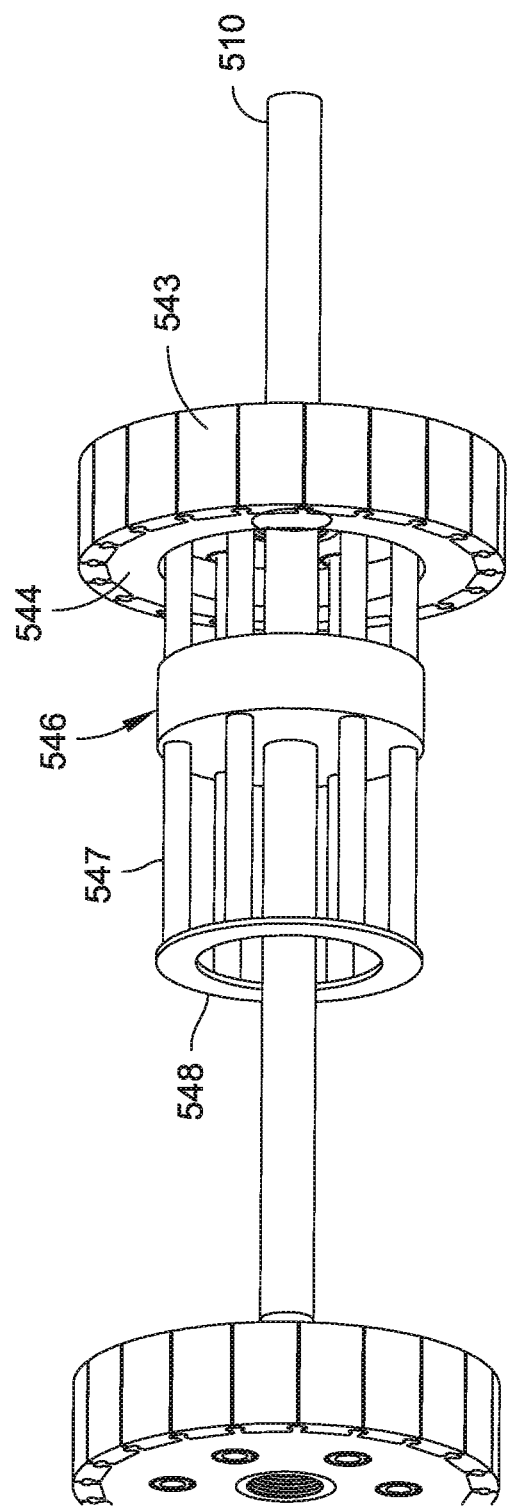
FIG. 29 is a perspective view of a rotor assembly of the MGT unit illustrated in FIG. 25, in accordance with an example embodiment of the present disclosure.
Figure 30:
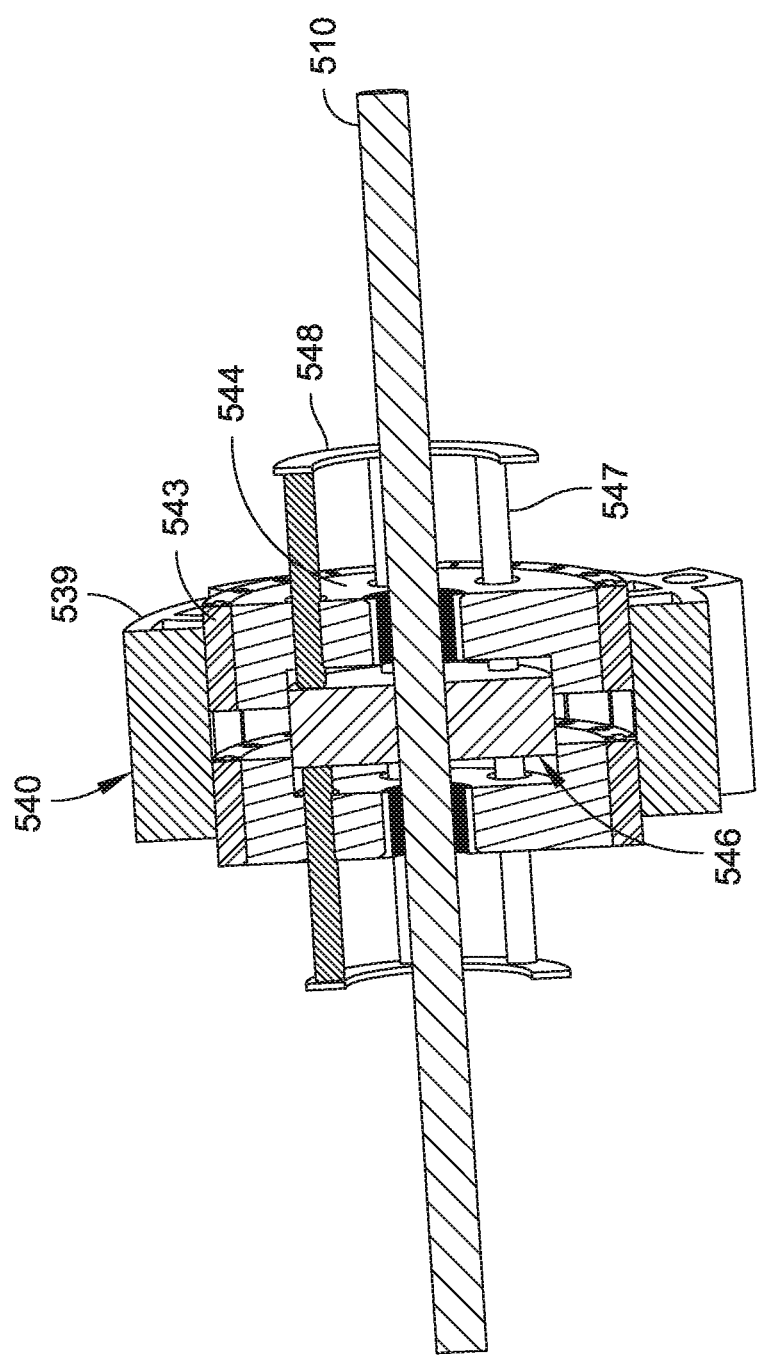
FIG. 30 is a cross-sectional side view of a rotor assembly at least partially surrounded by a stator ring of the MGT unit illustrated in FIG. 25, in accordance with an example embodiment of the present disclosure.
Figure 31:
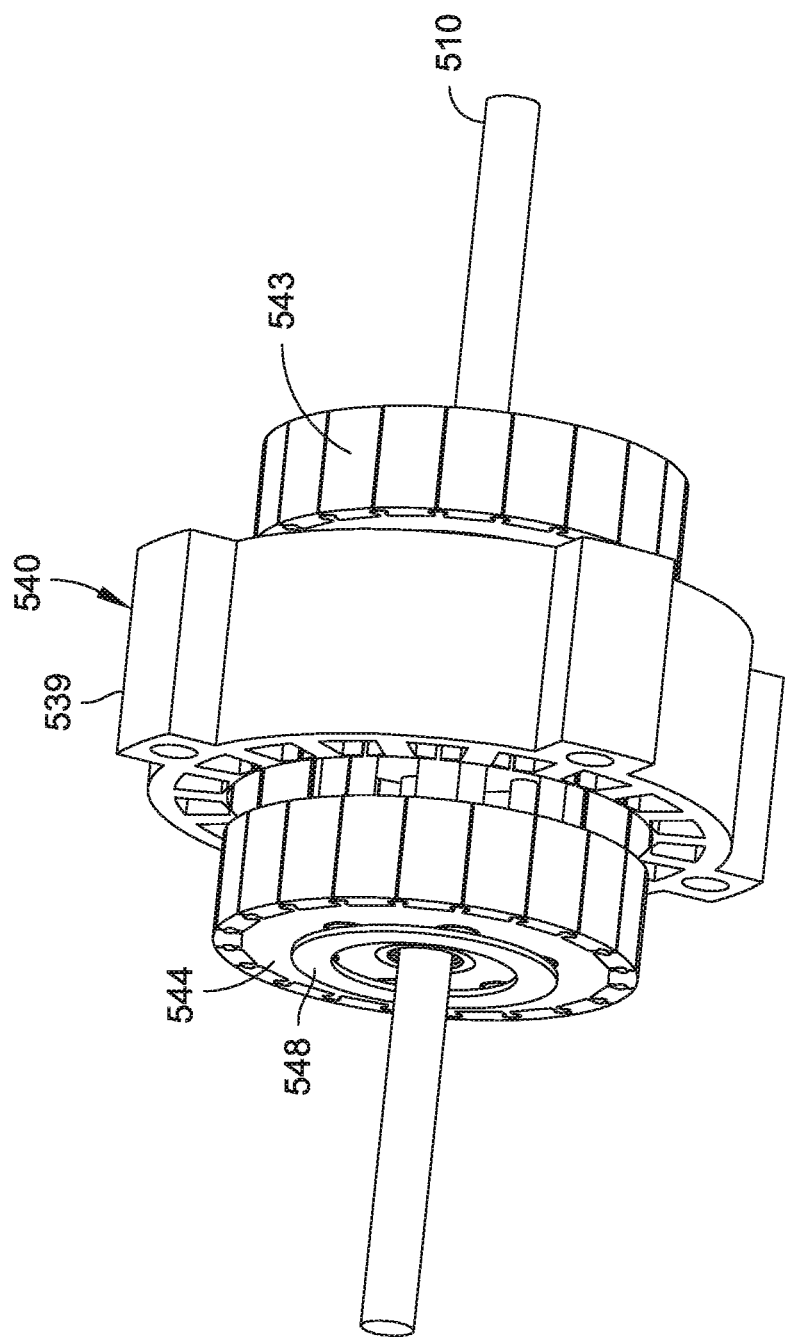
FIG. 31 is another perspective view of a rotor assembly at least partially surrounded by a stator ring of the MGT unit illustrated in FIG. 25, in accordance with an example embodiment of the present disclosure.
Figure 32:
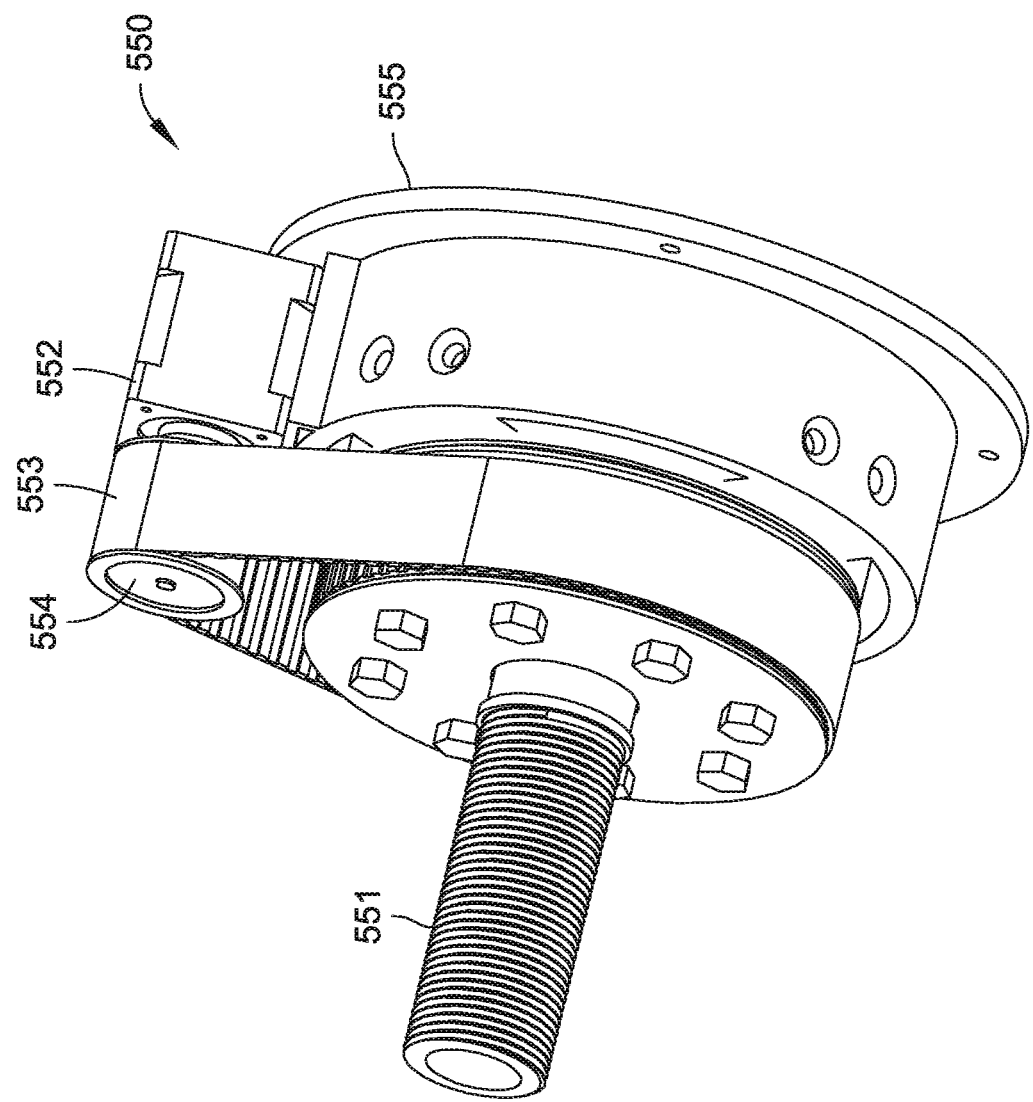
FIG. 32 is a perspective view of a rotor actuator of the MGT unit illustrated in FIG. 25, in accordance with an example embodiment of the present disclosure.
Figure 33:
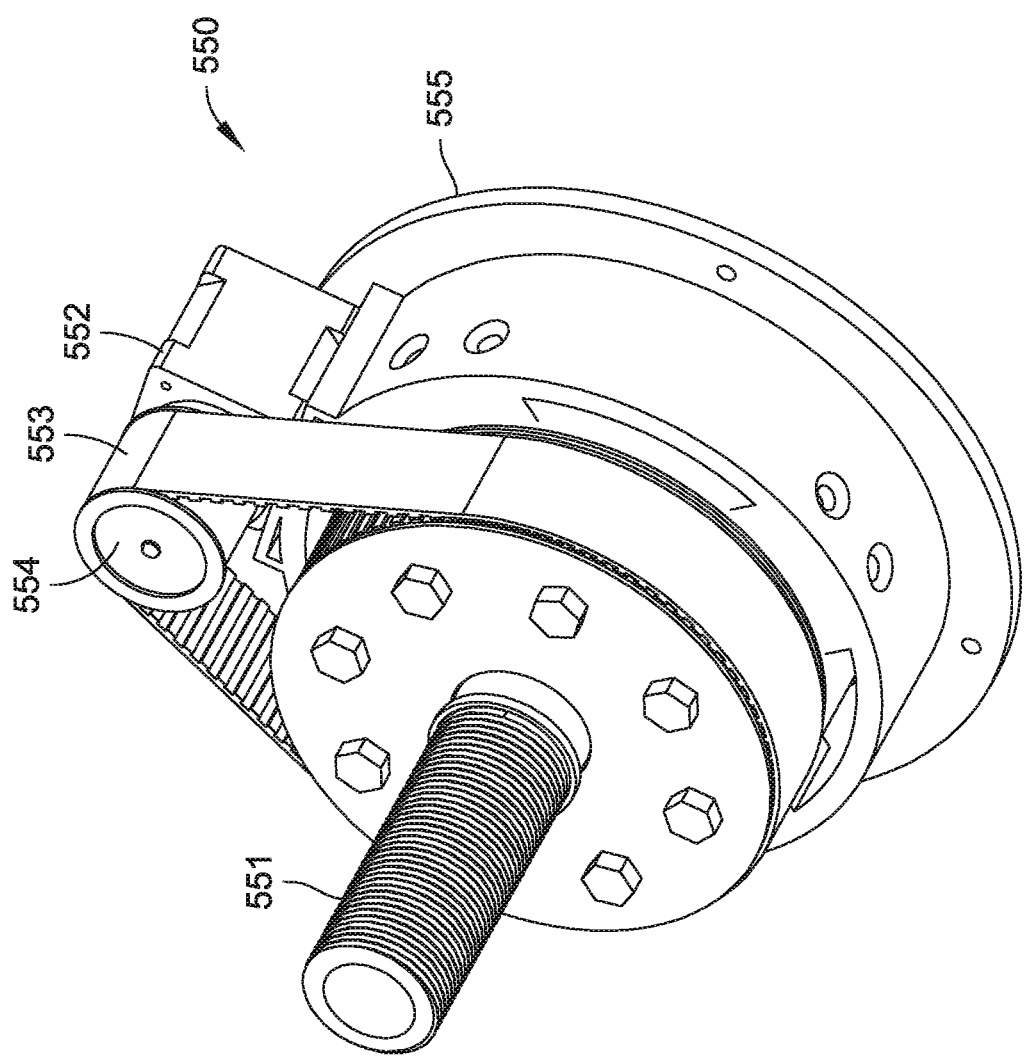
FIG. 33 is another perspective view of the rotor actuator of the MGT unit illustrated in FIG. 25, in accordance with an example embodiment of the present disclosure.
Figure 34:
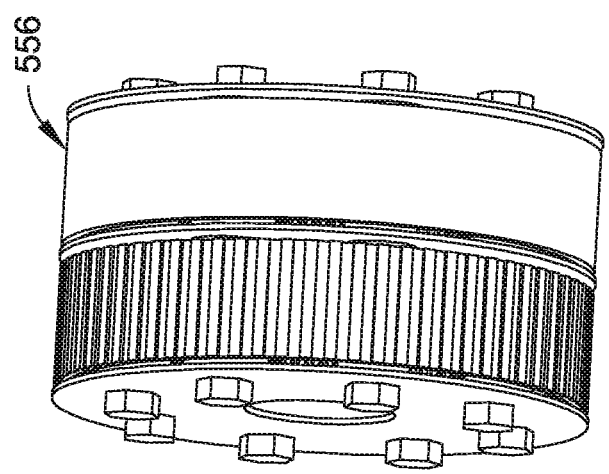
FIG. 34 is a side elevation view of a first set of gears for the rotor actuator of the MGT unit illustrated in FIG. 25, in accordance with an example embodiment of the present disclosure.
Figure 35:
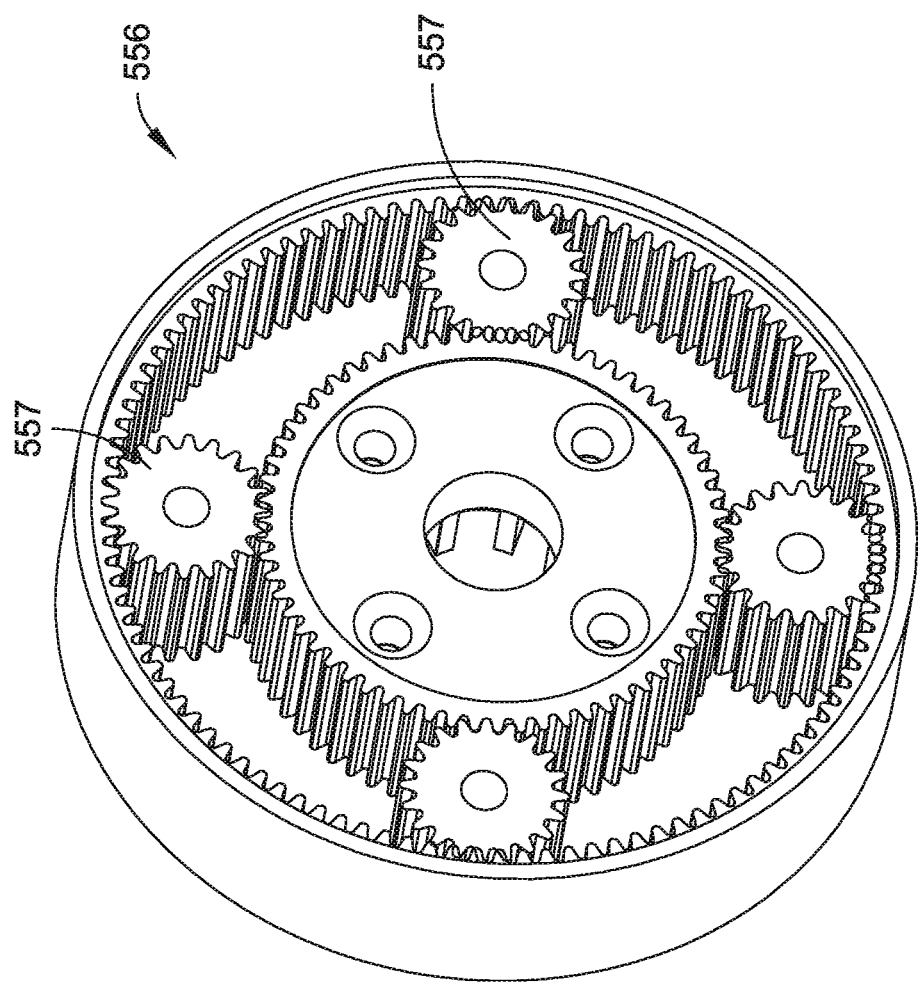
FIG. 35 is a perspective view of a planetary gear, in accordance with an example embodiment of the present disclosure.
Figure 36:
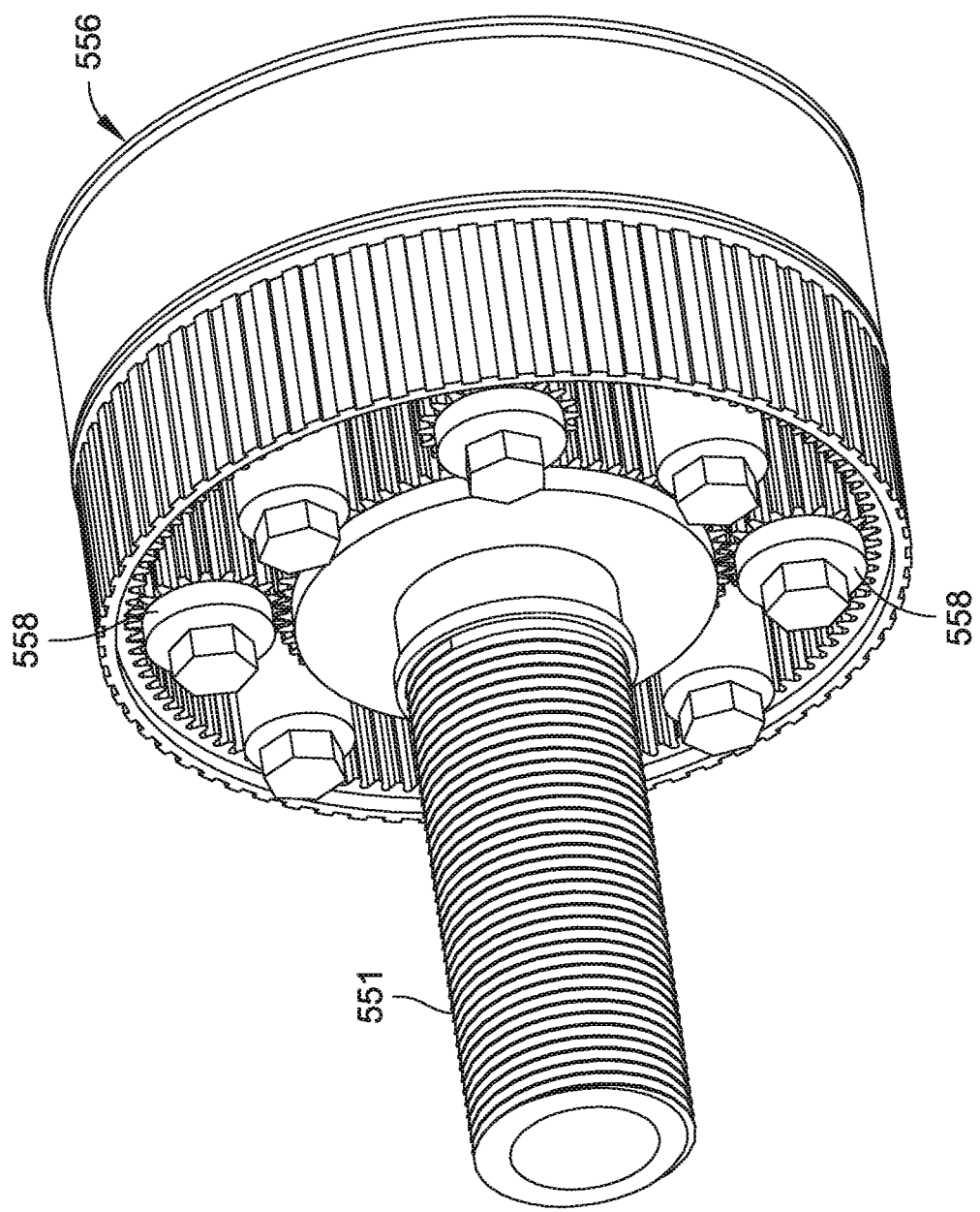
FIG. 36 is a side elevation view of a second set of gears for the rotor actuator of the MGT unit illustrated in FIG. 25, including the planetary gear of FIG. 35, in accordance with an example embodiment of the present disclosure.

(e.g., similar to those of the MGT unit 400 of FIGS. 16 through 24). FIGS. 26 and 27 show the MGT unit 500 with the cover 530 removed and the stator ring 539 with its respective stator windings (coils 541) wrapped around its stator cores. The stator ring 539 can be supported by a stator support structure 540 comprising plurality of (e.g., three or more) stator support bars 542 that can be evenly spaced around the periphery of the stator ring 539 extending between the two end plates 520, affixed to the end plates 520 and the stator ring 539 to hold the stator in a fixed position, which may be near the center of MGT unit 500 with its center plane perpendicular to the axis of the axle 510, coincident with the center plane of the rotor support structure 546 with its central axis collinear with the central axis of the axle 510.

FIGS. 28 through 31 show various views of the sliding rotor support structure 546 with the rotor support structure 546 affixed to the axle 510 with a plurality of (e.g., three or more linear slide rods 547) that can be evenly spaced around the periphery of the rotor support structure 546 running through the inside edge of the rotor support structure 546 parallel to the axle 510, rigidly affixed to the rotor support structure 546 at equal distance from the central axis of the axle 510 with slide rod end plate rings 548 affixed to the ends of the linear slide rods 547. The two rotor rings 544 are slidably affixed to the linear slide rods 547 by bushings or linear bearings (not shown) in the rotor rings 544 allowing movement of the rotor rings 544 in the axial direction towards or away from each other between the center plane of the rotor support structure 546 and the slide rod end plates 520. Permanent magnets 543 are mounted around the periphery of each rotor ring 544, evenly spaced with alternating north and south poles facing radially outward. The outer circumferential face of the rotor magnets 543 can be a constant distance from the central axis of the axle 510, providing a small air gap between the circumferential face of the rotor magnets 543 and the inner circumferential face of the stator ring 539 when the center plane of the stator (perpendicular to the rotor axle 510) and the inside edges of the rotor rings 544 are coplanar. The north and south poles of the rotor magnets 543 on each rotor are affixed in the same radial position around the periphery of each rotor ring 544 such that when the rotor rings 544 are translated together the north pole magnets 543 on the first rotor ring 544 are in the same radial position as the north pole magnets 543 on the second rotor ring 544, directly opposing one another.

FIGS. 32 through 36 show an embodiment of the rotor linear actuator 550. In this embodiment there is one rotor linear actuator 550 for each rotor ring 544. In other embodiments there may be only one rotor linear actuator for both rotor rings 544 or there may be at least one linear actuator for the rotor rings 544 and at least one for the stator ring 539. The rotor linear actuator 550 can include a stepper motor 552, a drive belt 553, a drive gear 554, two sets of planetary gears 556, a screw actuator 551, and a planetary gear housing 555. The screw actuator 551 is a hollow pipe threaded on its exterior surface for most of its length. The screw actuator 551 fits around the axle 510 which runs through it, extending outwardly from the rotor support structure 546. The screw actuator 551 is rotationally affixed to the axle 510 by bushings or rotary bearings (not shown) on each end. The screw actuator 551 threads mate on the end facing the rotor support structure 546 with matching threads in a hole in the center of the rotor ring 544 such that as the screw actuator 551 is turned relative to the axle 510 the rotor ring 544 will translate in the axial direction in either direction depending on whether the screw actuator 551 is turned clockwise or counter clock wise. The screw actuator 551 is affixed on the end away from the rotor support structure 546 to the sun gear of the inner set of planetary gears 558 closest to the rotor support structure 546. The screw actuator 551 and the first sun gear generally rotate with the axle 510 turning the planetary gears which have common axles 510 with the planetary gears on the outer set of planetary gears 557 whose sun gear is affixed to the rotor shaft and whose ring gear is affixed to the planetary gear housing which in turn is affixed to the end plate 520. When the stepper motor 552 is activated by command from the computer system, the drive belt 553 turns the ring gear on planetary set 556 causing the screw actuator 551 to turn relative to the axis of the axle 510, causing the rotor ring 544 to translate between positions 1, 2, and 3 previously described herein (and any other positions) as selected by the computer system based on sensor information and/or commands received through a user interface.

Example Implementations—Variable Stator Winding Configurations

Figure 7:
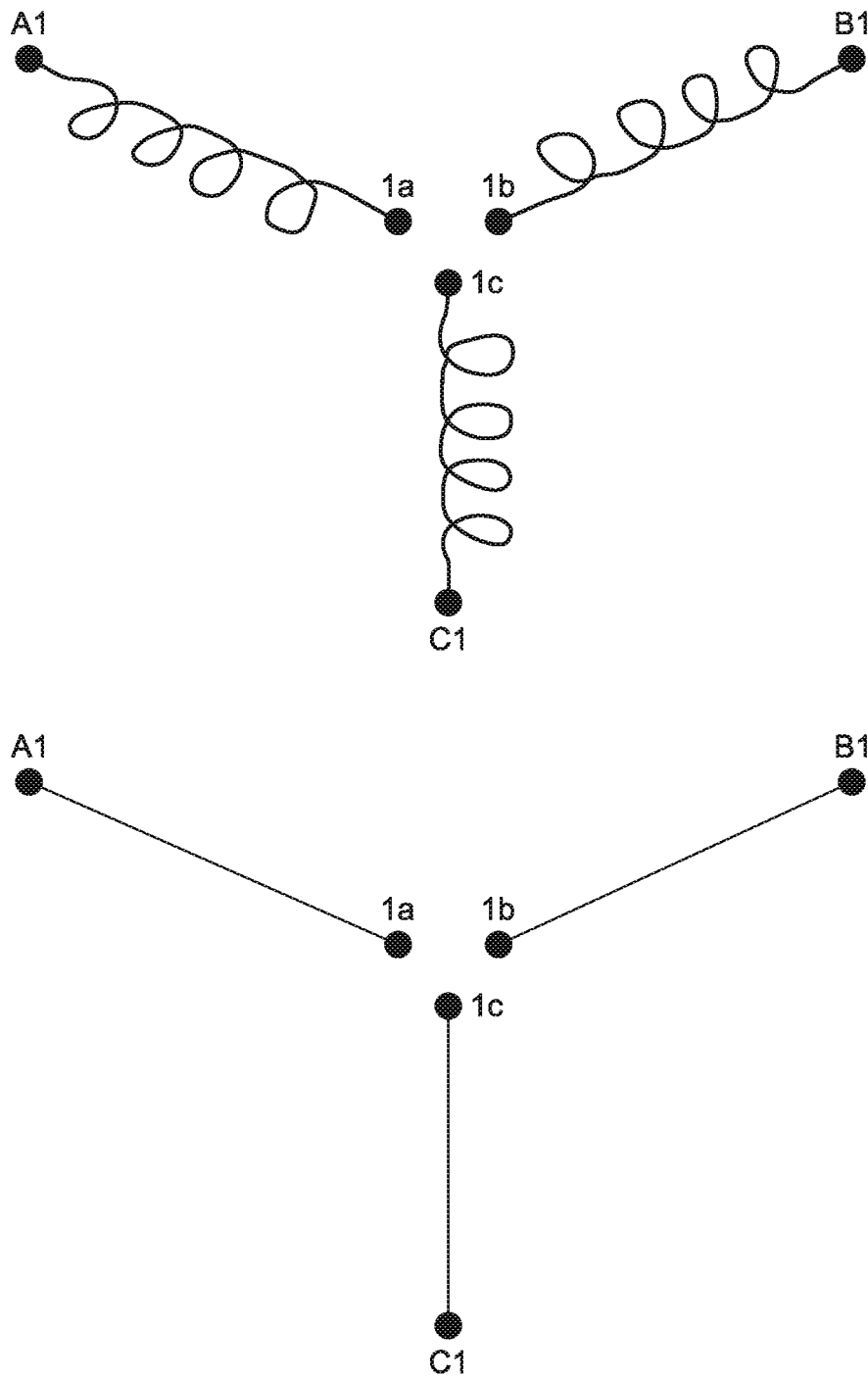
FIG. 7 is a diagrammatic illustration of separated center three-phase stator winding assemblies, in accordance with an example embodiment of the present disclosure.

Referring now to FIGS. 7 through 14, a stator configuration (e.g., for any of the stator rings described herein) can comprise a separated center 3-phase wiring (e.g., as shown in FIG. 7). The 3-phase stator's center connections 1a, 1b, and 1c are configured to link three phases (e.g., phases 1, 2, and 3) to one point when coupled together. The live end of phase 1 is illustrated as A1, the live end of phase 2 is illustrated as B1, and the live end of phase 3 is illustrated as C1. As shown in FIG. 7, the phases can be separated such that the center connections 1a, 1b, and 1c are to be selectively connected (e.g., ends 1a, 1b, and 1c can be connected together or connected to other 3-phase windings).

Figure 8:
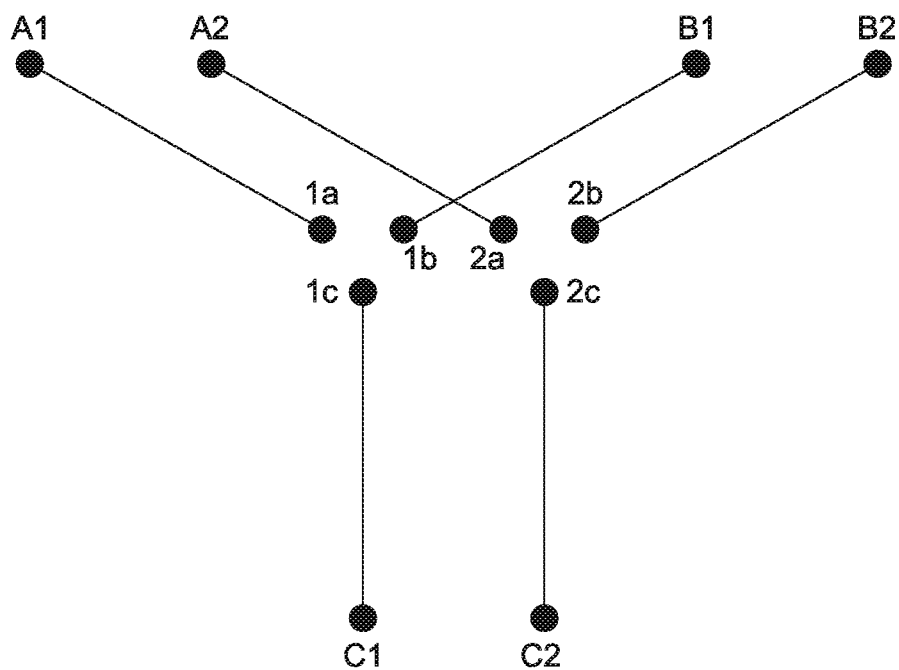
FIG. 8 is a diagrammatic illustration of a two-wire separated stator winding assembly, in accordance with an example embodiment of the present disclosure.

In some embodiments, a separated center 3-phase wiring including a 2-wire configuration (e.g., as shown in FIG. 8). Phase 1, phase 2 and phase 3 for each of the two windings have separated center connections (e.g., center connections 1a, 1b, and 1c for a first winding and center connections 2a, 2b and 2c for a second winding). The live end of phase 1 is illustrated as A1 and A2 for each of the first and second windings, respectively. The live end of phase 2 is illustrated as B1 and B2 for each of the first and second windings, respectively. The live end of phase 3 is illustrated as C1 and C2 for each of the first and second windings, respectively. In this 2-wire scenario the winding A1 and A2 are in parallel around the iron cores and end in the central connections 1a and 2a likewise are B1 with B2, central connection 1b with 2b likewise are C1 with C2, central connection 1c with 2c.

In the 2-wire configuration there are parallel (Gear #4) and series (Gear #1) modes available. The individual winding sections while operating in parallel mode (Gear #4) can include connecting A1 to A2, B1 to B2, C1 to C2, and the central connections 1a, 1b, 1c, 2a, 2b and 2c can be connected together. The individual winding sections while operating in series mode (Gear #1) can include connecting 1a to A2, 1b to B2, 1c to C2, and the central connections 2a, 2b and 2c can be connected together. In this configuration, each active winding section carries half the voltage of the parallel mode (Gear #4) and ¼ of the current found in the parallel mode configuration when serving as a generator under constant power.

Figure 9:
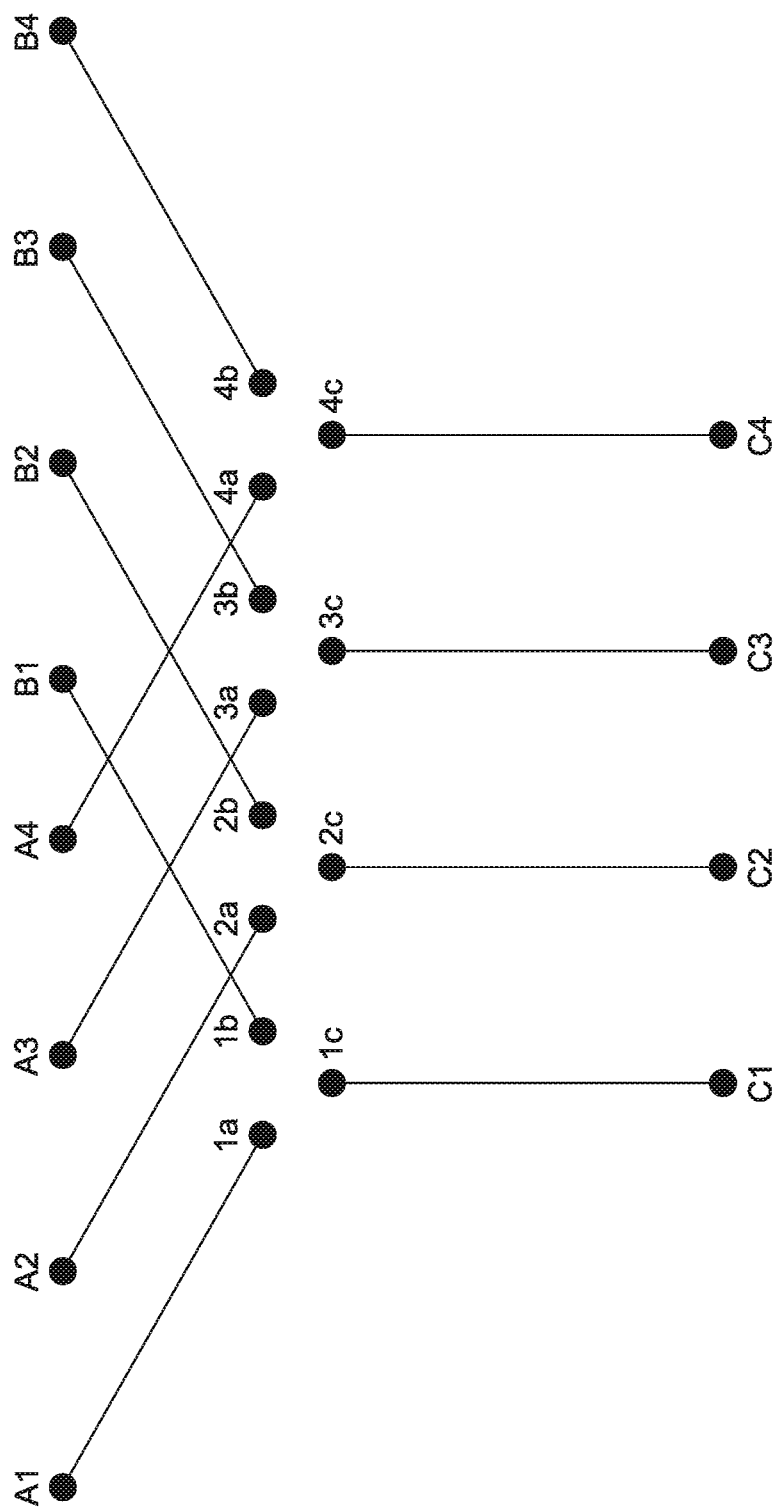
FIG. 9 is a diagrammatic illustration of a four-wire separated stator winding assembly, in accordance with an example embodiment of the present disclosure.

In another embodiment, a stator configuration can comprise a separated center 3-phase wiring including a 4-wire configuration (e.g., as shown in FIG. 9). Phase 1, phase 2 and phase 3 for each of the four windings can have separated center connections (e.g., center connections 1a, 1b, and 1c for a first winding, center connections 2a, 2b and 2c for a second winding, center connections 3a, 3b, and 3c for a third winding, and center connections 4a, 4b and 4c for a fourth winding). The live end of phase 1 is illustrated as A1, A2, A3 and A4 for each of the first, second, third, and fourth windings, respectively. The live end of phase 2 is illustrated as B1, B2, B3 and B4 for each of the first, second, third, and fourth windings, respectively. The live end of phase 3 is illustrated as C1, C2, C3 and C4 for each of the first, second, third, and fourth windings, respectively. In this 4-wire scenario the windings A1, A2, A3 and A4 are in parallel around the iron cores and end in the central connections 1a, 2a, 3a and 4a, likewise are B1, B2, B3 with B4 ending in central connections 1b, 2b, 3b with 4b, and likewise are C1, C2, C3 with C4 ending with central connection 1c, 2c, 3c with 4c.

In the 4-wire configuration there are parallel (Gear #4), parallel/series (Gear #2), and series (Gear #1) modes available. The individual winding sections while operating in parallel mode (Gear #4) can include connecting A1, A2 and A3 to A4; B1, B2 and B3 to B4; C1, C2 and C3 to C4, and the central connections 1a, 2a, 3a, 4a, 1b, 2b, 3b, 4b, 1c, 2c, 3c and 4c can be connected together. The individual winding sections while operating in series/parallel mode (Gear #2) can include connecting A1 to A2; 1a, 2a, A3 and A4; B1 to B2; 1b, 2b, B3 and B4; C1 to C2; 1c, 2c, C3 and C4; 3a, 4a, 3b, 4b, 3c and 4c. In this configuration (Gear #2), each active winding section carries half the voltage of the parallel mode (Gear #4) and $\frac{1}{4}^{th}$ of the current found in the parallel mode (Gear #4) configuration. The individual winding sections while operating in series mode (Gear #1) can include connecting 1a to A2, 2a to A3, 3a to A4, 1b to B2, 2b to B3, 3b to B4, 1c to C2, 2c to C3, 3c to C4, and 4a, 4b and 4c together. In this configuration (Gear #1), each active winding section carries one fourth the voltage of the parallel mode (Gear #4) and $\frac{1}{8}^{th}$ of the current found in the parallel mode configuration when serving as a generator under constant power.

In another embodiment, the stator configuration includes a separated center 3-phase wiring including a 6-wire configuration (e.g., as shown in FIG. 10). Phase 1, phase 2 and phase 3 for each of the six windings can have separated center connections (e.g., center connections 1a, 1b, and 1c for a first winding, center connections 2a, 2b and 2c for a second winding, center connections 3a, 3b, and 3c for a third winding, center connections 4a, 4b and 4c for a fourth winding, center connections 5a, 5b, and 5c for a fifth winding, and center connections 6a, 6b and 6c for a sixth winding). The live end of phase 1 is illustrated as A1, A2, A3, A4, A5 and A6 for each of the first, second, third, fourth, fifth, and sixth windings, respectively. The live end of phase 2 is illustrated as B1, B2, B3, B4, B5 and B6 for each of the first, second, third, fourth, fifth, and sixth windings, respectively. The live end of phase 3 is illustrated as C1, C2, C3, C4, C5 and C6 for each of the first, second, third, fourth, fifth, and sixth windings, respectively. In this 6-wire scenario the winding A1, A2, A3, A4, A5 and A6 are in parallel around the iron cores and end in the central connections 1a, 2a, 3a, 4a, 5a and 6a, likewise are B1, B2, B3, B4, B5 with B6 ending in central connections 1b, 2b, 3b, 4b, 5b with 6b, and likewise are C1, C2, C3, C4, C5 with C6 ending with central connection 1c, 2c, 3c, 4c, 5c with 6c.

In the 6-wire configuration there are parallel (Gear #4), first parallel/series (Gear #3), second parallel/series (Gear #2), and series (Gear #1) modes available. The individual winding sections while operating in parallel mode (Gear #4, illustrated in FIG. 11A) can include connecting A1, A2, A3, A4, A5, and A6 together, B1, B2, B3, B4, B5, and B6 together, C1, C2, C3, C4, C5, and C6 together, and the central connections 1a, 1b, 1c, 2a, 2b, 2c, 3a, 3b, 3c, 4a, 4b, 4c, 5a, 5b, 5c, 6a, 6b and 6c can be connected together.

The individual winding sections while operating in series/parallel mode (Gear #3, illustrated in FIG. 12) can include connecting A1, A2 and A3 together, 1a, 2a, 3a, A4, A5 and A6 together, B1, B2 and B3 together, 1b, 2b, 3b, B4, B5 and B6 together, C1, C2 and C3 together, 1c, 2c, 3c, C4, C5 and C6 together, 4a, 5a, 6a, 4b, 5b, 6b, 4c, 5c and 6c together. In this configuration (Gear #3), each active winding section carries half the voltage of the parallel mode (Gear #4) and $\frac{1}{4}^{th}$ of the current found in the parallel mode (Gear #4) configuration when serving as a generator under constant power.

The individual winding sections while operating in another series/parallel mode (Gear #2, illustrated in FIG. 13) can include connecting: A1 to A2; 1a, 2a, A3 and A4 together; 3a, 4a, A5 and A6 together; B1 to B2; 1b, 2b, B3 and B4 together; 3b, 4b, B5 and B6 together; C1 to C2; 1c, 2c, C3 and C4 together; 3c, 4c, C5 and C6 together; and 5a, 6a, 5b, 6b, 5c and 6c together. In this configuration (Gear #2), each active winding section carries one third the voltage of the parallel mode (Gear #4) and $\frac{1}{6}^{th}$ of the current found in the parallel mode (Gear #4) configuration when serving as a generator under constant power.

The individual winding sections while operating in series mode (Gear #1, illustrated in FIG. 14) can include connecting: 1a to A2; 2a to A3; 3a to A4; 4a to A5; 5a to A6; 1b to B2; 2b to B3; 3b to B4; 4b to B5; 5b to B6; 1c to C2; 2c to C3; 3c to C4; 4c to C5; 5c to C6; and 6a, 6b and 6c together. In this configuration (Gear #1), each active winding section carries one sixth the voltage of the parallel mode (Gear #4) and $\frac{1}{12}^{th}$ of the current found in the parallel mode (Gear #4) configuration when serving as a generator under constant power.

Figure 11A:
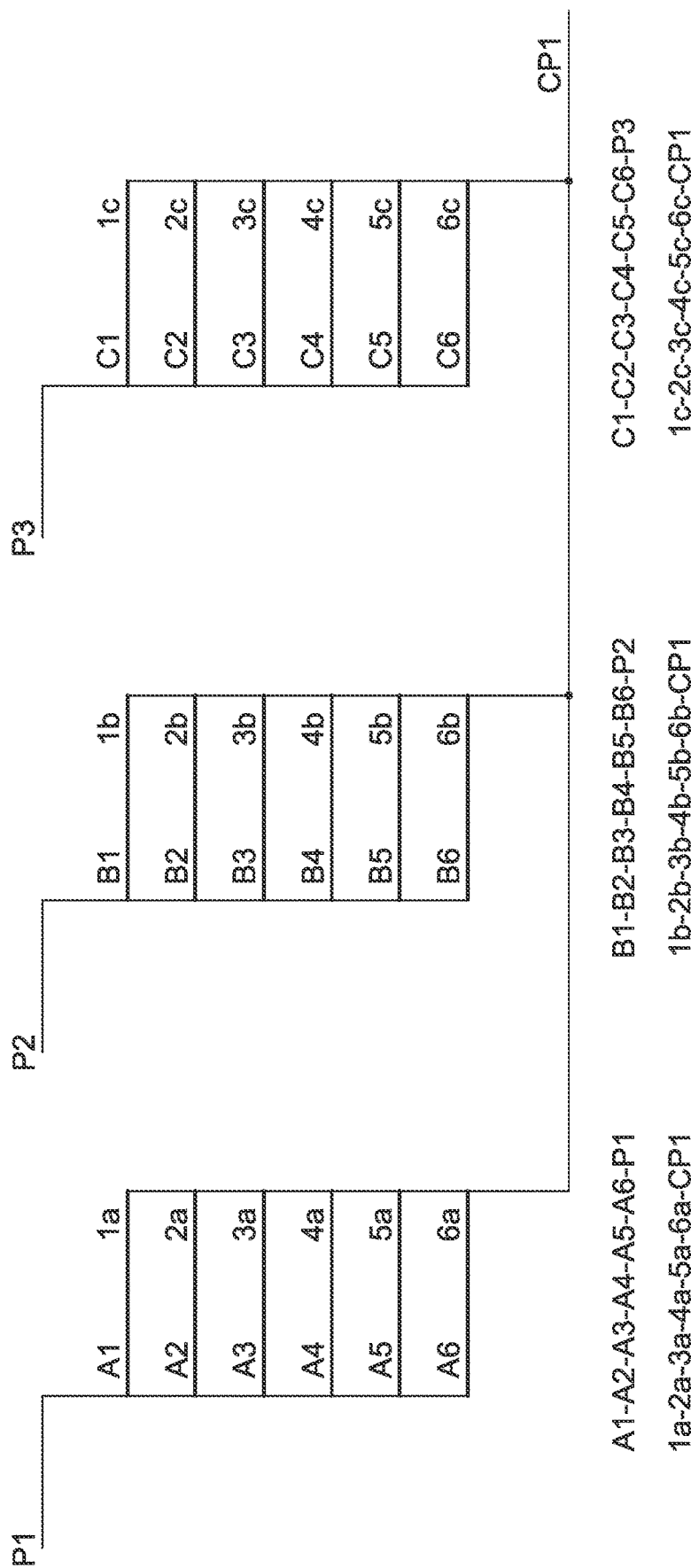
FIG. 11A is a diagrammatic illustration of stator winding sets in a parallel gear configuration, in accordance with an example embodiment of the present disclosure.
Figure 11B:
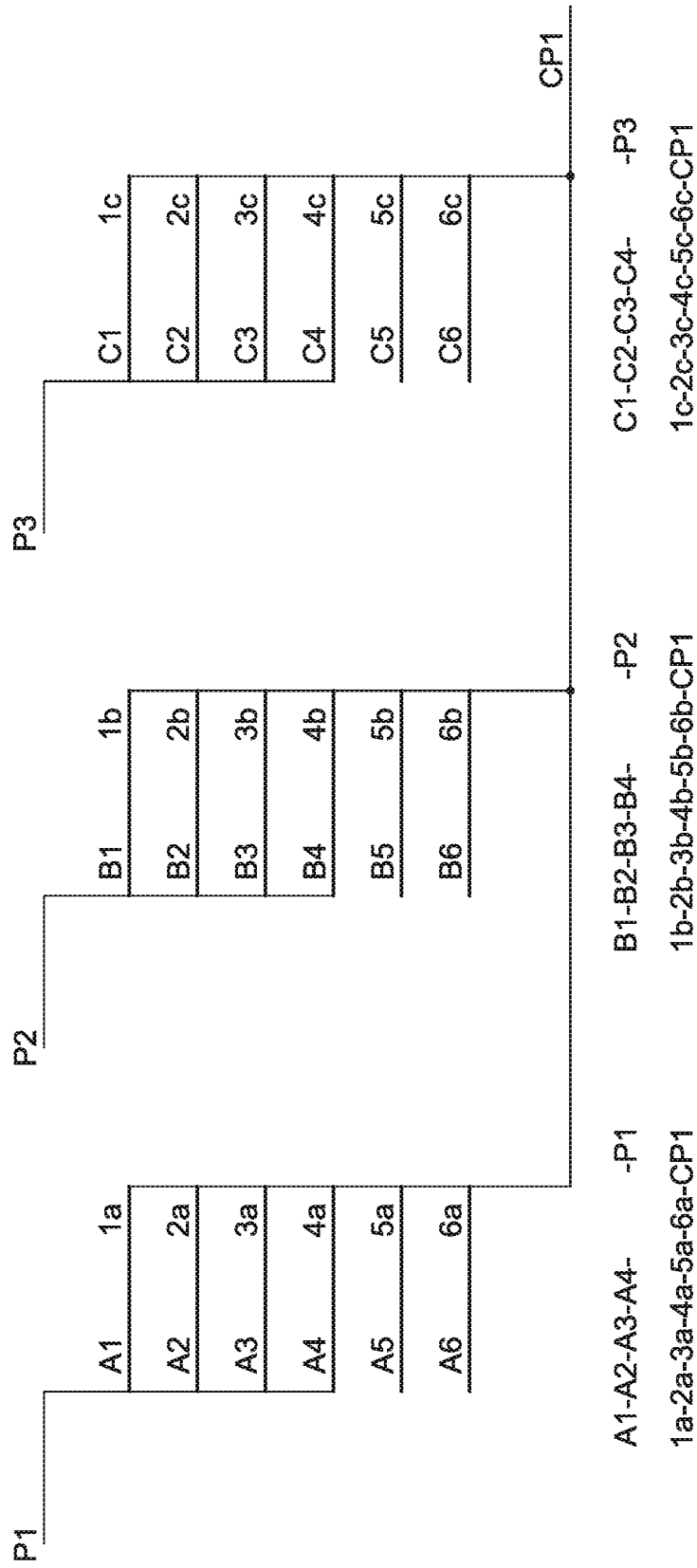
FIG. 11B is a diagrammatic illustration of stator winding sets in a parallel gear configuration, where a portion of multiple parallel non-twisted wires are connected in parallel and one or more wires are disconnected from the connected portion of the multiple parallel non-twisted wires, in accordance with an example embodiment of the present disclosure.
Figure 11C:
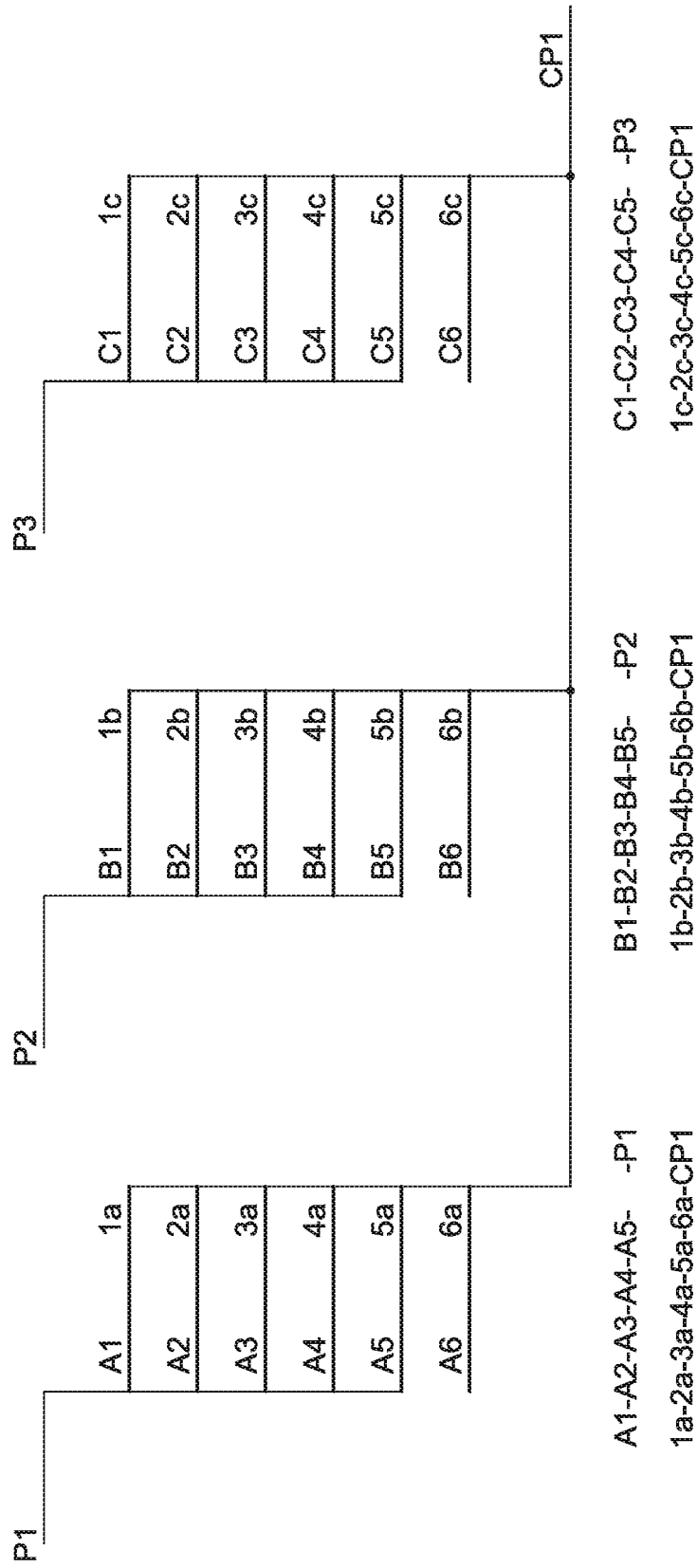
FIG. 11C is a diagrammatic illustration of stator winding sets in a parallel gear configuration, where a portion of multiple parallel non-twisted wires are connected in parallel and one or more wires are disconnected from the connected portion of the multiple parallel non-twisted wires, in accordance with an example embodiment of the present disclosure.
Figure 12:
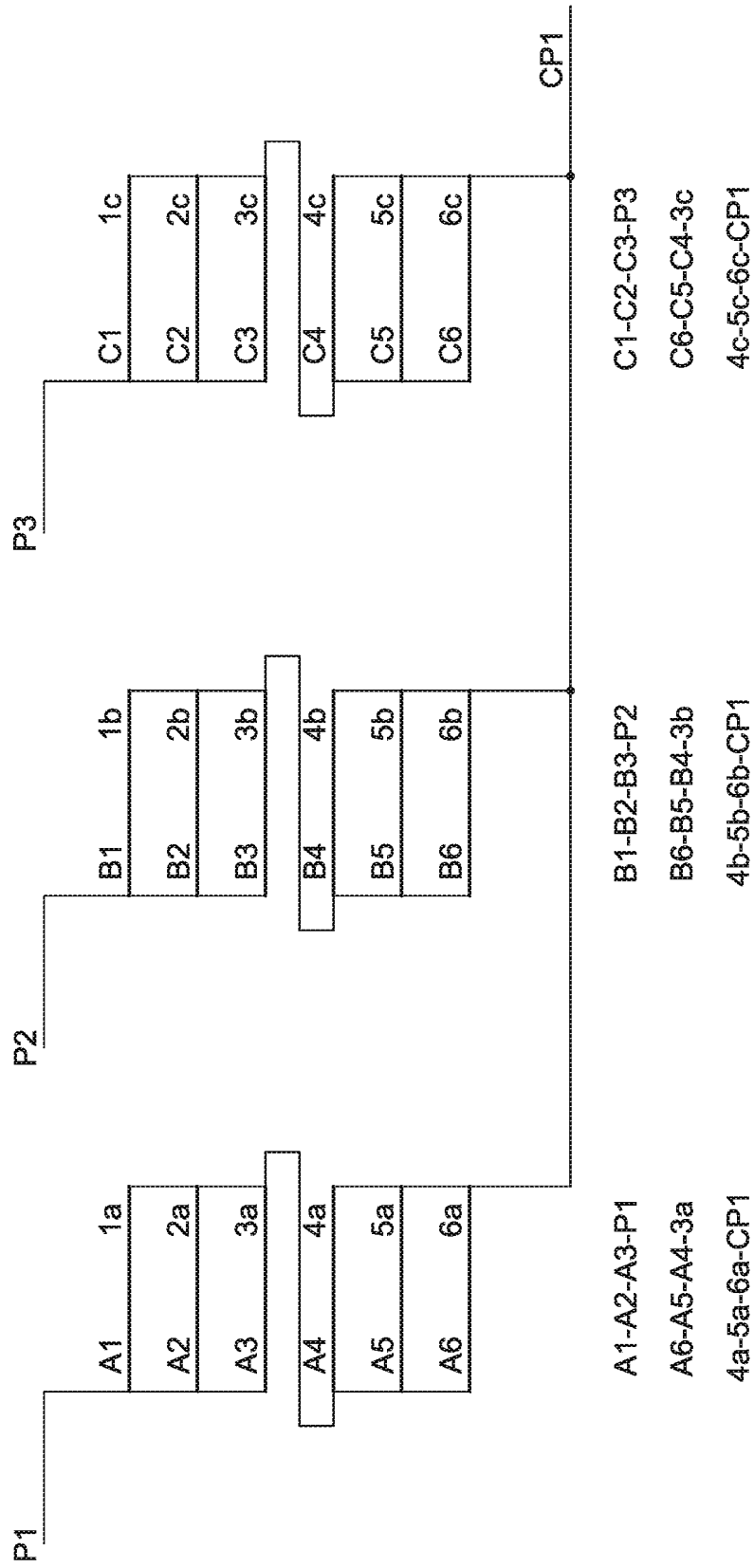
FIG. 12 is a diagrammatic illustration of stator winding sets in a partially parallel/partially series gear configuration, in accordance with an example embodiment of the present disclosure.
Figure 13:
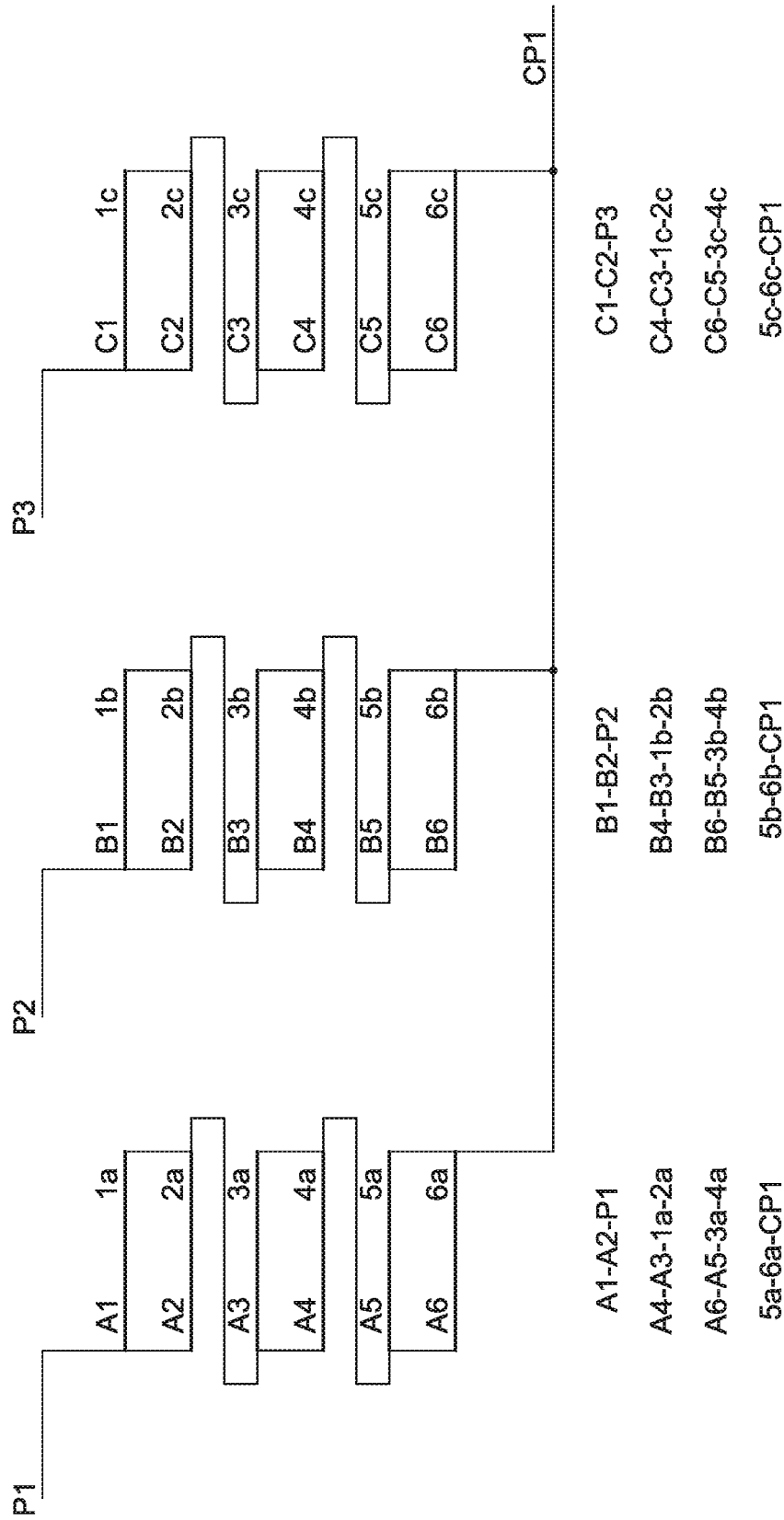
FIG. 13 is another diagrammatic illustration of stator winding sets in a partially parallel/partially series gear configuration, in accordance with an example embodiment of the present disclosure.
Figure 14:
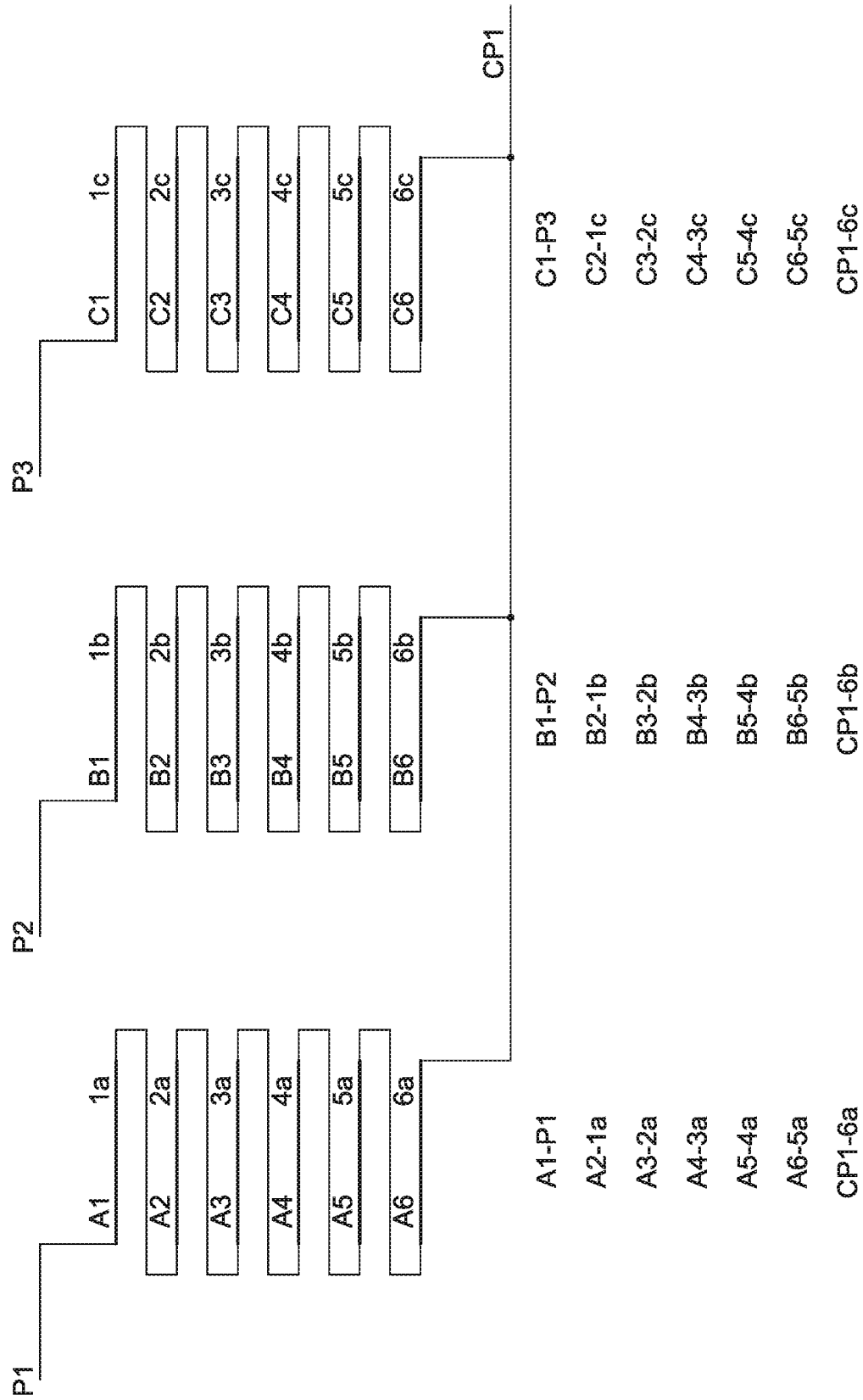
FIG. 14 is a diagrammatic illustration of stator winding sets in a series gear configuration, in accordance with an example embodiment of the present disclosure.

The amperages of six wire system of 20 ohm coils with a 100 volt potential would be 49.8 amp turns in first gear (all series); 199.8 amp turns in second gear; 451.2 amp turns in third gear and 1800 amp turns in fourth gear (all parallel). Subsequently the computer can cause a wires or wire sets in the all parallel mode to be disconnected creating additional gears between third and fourth. For example, four all parallel wires is 800 amp turns, and five all parallel wires is 1250 amp turns. The foregoing voltages are provided for illustrative purposes, and those skilled in the art will appreciate that different voltages and additional configurations can be provided to achieve any number of gears. Furthermore, one or more electronic switches, in addition to being configured to connect the wires in the arrangements described above, can also be configured to disconnect one or more of the wires/ windings, e.g., to implement a 4-wire configuration in a 6-wire system, and so forth, e.g., as shown in FIGS. 11B and 11C for a six-wire system putting two intermediary gears between third and fourth gears. When switching from the third gear (Gear #3) to the fourth gear (Gear #4—all parallel), there may arise a need to not only remove one or two wires in each leg of the phases to create addition two or more gears between third and fourth gear, but also using a pulse width modulation scheme on said wires to partially include them as a percentage to provide a variable (e.g., infinitely variable) gearing between third and fourth gear.

In some embodiments, for a three-phase motor/generator, six (or four or eight or more) parallel, non-twisted wires are wound around the stator cores of each stator ring, in the same manner as the stator cores would be wound with one wire. However, the six wires may have fewer wraps around each core before the available space is filled. In a three-phase motor, the wires (sometimes referred to a legs or branches) of each circuit phase normally come together at a common point. According to various embodiments of this disclosure, six wires are disconnected or separated at the common point and are run through a switching system (e.g., a plurality of logic controlled electronic switches) configured to cause the wires to be in series, parallel or a combination thereof but remain in three-phase configuration (as described above). The same or a similar switching system can also be applied to connections between the common stators in successive sets, in addition to the connections between the wires within the stators.

In some embodiments, a single MGT unit can have one or more rotor stator sets of two or more differently wound stators with one or two rotors per set and mechanical shifting to place the magnetic field of the rotor or rotors in contact with the electromagnetic field of one or the other stator. In some embodiments, an electronic shifting capability is provided within for each stator of any stator and rotor combination including both: a MGT unit having multiple stators with a rotor for each stator and no mechanical shifting; and an electric MGT unit with one or more rotor/stator sets as described herein. In both cases, with multiple stators or multiple stator sets, similarly wired stators may be wired together in parallel or series. When there are four stators, the stators may be configured as follows: all stators may be connected in parallel (Gear #4); two sets of stators may be connected in parallel and the sets connected in series (Gear #3); or all stators may be connected in series (Gear #1). When there are six stators, the stators may be configured as follows: all may be connected in parallel (Gear #4); there can be two sets of three stators wired in parallel and the sets connected in series (Gear #3); three sets of two stators wired in parallel and the sets connected in series (Gear #2); or all sets connected in series (Gear #1).

When the stators are electrically connected to each other on a common shaft or axle, the rotors may need to be identical and the stators may need to be identically wired and radially oriented or the voltages, torque and phase from each stator rotor combination can conflict. In some embodiments, for example, in a system with six commonly wired stators, all of the stators may need to be energized together. If one or more are electrically disconnected, the motor/generator may experience inefficiency from the induced drag when there is no neutral the MGT unit however may have a neutral and successive stators or units may be placed in neutral and electrically disconnected. There are four levels of torque/voltage when the connections between the stators are switched as above described.

In embodiments of six rotor/stator sets with two or more stators per set, the total power of the electric motor/generator can be increased or decreased by activating more or less rotor/stator sets within the units and further adjusted by shifting the rotor's magnetic field to the next stator of different wiring and even further adjusted by adjusting the number of rotor rings in the rotating magnetic field as described above. In cases where there are two or more rotor stator sets in operation, the active stator in each of the sets, the rotor magnets in each of the sets, and the stator wiring in each of the sets must be identically set and radially oriented, then additional adjustments in torque and voltage may be made by switching the parallel/series connections between the stators as above described.

In some embodiments, the mechanical shifting in the rotor/stator sets is implemented with the electronic shifting of the stator wiring, and when there are multiple stator sets, the sets are connected with the ability to switch the connections between them from series to parallel and the noted combinations thereof. For further clarification, when a second set of two or more stators is added to a first set of two or more stators, both sets must be in either series or parallel for the same voltage to run through both of them and generate the same torque for the common shaft. As stated above, stators can run all in series or all in parallel or equal sets of two or three stators in parallel where the sets are connected in series. When shifting between series and parallel the stators should all be shifted together, unless multiple controllers are used with separate (independently controlled) stator sets.

Moreover, when additional sets of stators are added to the motor/generator, the power capacity of the generator is increased, and the motor/generator will also have a different torque. This can be done by having multiple rotor/stator sets that each have a neutral or idle position, where the magnetic field of the rotor is not engaged with the electro-magnetic field of any of the stators in the multi-set motor/generator, and then as the power available or required increases, the stators in the sets are brought on line as needed. The power capacity of the motor/generator can also be increased or decreased by shifting to differently wound stators within the sets and further fine-tuned by adjusting the number of rotor magnets engaged in the flux field at any one time. The ability to add or subtract active stators from the motor/generator and change between stator windings, and to add rotors and focus the magnetic field of the rotors interacting with the stators, and to add and subtract magnets from the rotors, and then further change the windings from series to parallel and combinations thereof, provides the motor/generator with an ability to dynamically adapt to widely varying sources of energy. This serves to optimize motor/generator configuration for improved electrical generation and to adapt to widely varying demands for motor power in hybrid vehicles, wind powered generators, and similar uses.

The MGT units as described herein can have modular electrical connections comprising standard electrical connectors that can be modified to be attached to the said modular end caps as to electrically connect multiple MGT units together as one unit. The MGT units as described herein can also have power switching transistors for the generator mode also comprising standard 3-phase motor control invertors for various motor modes (as described above) utilizing both variable frequency and pulse width modulation schemes for motor functions. In embodiments, power switching transistors are in a configuration where a 15-phase output in generator mode comprises separate output transistors for each of the 15 phases, where the output frequency can be selected from the 15 phases and adjusted independent of the rotor RPM to build the new frequency as minimum RPM can support a maximum frequency desired.

The MGT units as described herein can have electronic sensors such as Hall Effect, optical or other resolving sensors attached to the rotor that can calculate and report the RPM, direction and actual rotational position of the rotor or multiple rotor assemblies to the control unit. The motor/generators can have controls and a user interface comprising a computer whereby the RPM, direction, acceleration, torque, generator mode, coast mode, motor mode and stator multiple wire series/parallel configurations are calculated and adjusted according to the user preset parameters and other input devices such as wind speed indicators, brake devices, accelerator devices, failsafe devices, and other input devices.

In some embodiments, the stator ring(s) or rotor ring(s) for each set are radially offset from each other by the number of sets divided by 360 degrees and the opposing stator sets or rotors are radially aligned where each set of 3-phase windings produces a sine power curve that is offset from the adjacent power curve by the number of degrees that the stators or rotors are radially offset where the output frequency of the multiple phases can be selected from the multiple phases and adjusted independent of the rotor RPM to build a new frequency so long as the minimum RPM can be maintained.

In implementations, the electronically controlled switches are configured to connect the two or more non-twisted wires of each phase all in parallel, producing a first torque/speed when the motor/generator is in the star or Wye wired configuration and a second torque/speed when the motor/generator is in the Delta wired configuration.

In implementations, the electronically controlled switches are configured to connect the two or more non-twisted wires of each phase all in series, producing a third torque/speed when the motor/generator is in the start or Wye wired configuration and a fourth torque/speed when the motor/generator is in the Delta wired configuration.

In implementations, the two or more non-twisted wires include multiple sets of two wires, wherein the electronically controlled switches are configured to connect the two wires of each set in parallel and are configured to connect the multiple sets in series with one another, producing a fifth torque/speed when the motor/generator is in the start or Wye wired configuration and a sixth torque/speed when the motor/generator is in the Delta wired configuration, different from all parallel and all series configurations of the two or more non-twisted wires.

In implementations, the two or more non-twisted wires include multiple sets of three wires, wherein the electronically controlled switches are configured to connect the three wires of each set in parallel and are configured to connect the multiple sets in series with one another, producing a seventh torque/speed when the motor/generator is in the start or Wye wired configuration and an eighth torque/speed when the motor/generator is in the Delta wired configuration, different from all parallel and all series configurations of the two or more non-twisted wires.

In implementations, the two or more non-twisted wires include multiple sets of four wires, wherein the electronically controlled switches are configured to connect the four wires of each set in parallel and are configured to connect the multiple sets in series with one another, producing a ninth torque/speed when the motor/generator is in the start or Wye wired configuration and an tenth torque/speed when the motor/generator is in the Delta wired configuration, different from all parallel and all series configurations of the two or more non-twisted wires.

In implementations, the electronically controlled switches are configured to disconnect at least one wire of the two or more non-twisted wires from a series or parallel configuration without electric current flowing through the at least one disconnected wire but through the remaining wires connected in the series or parallel configuration, where each disconnected wire in a phase decreases the number of amp turns in each of the cores and produces a different torque/speed than if all wires were connected in the series or parallel configuration.

In implementations, a center plane of the stator cores and a rotational plane of the rotor magnets, may be offset from one another in an axial direction in varying controlled amounts, wherein increasing the distance between the two planes from a coplanar position decreases an amount of back electromotive force produced by the magnets on the cores, providing a means to balance the gauss created in the windings by the switching from parallel to series and/or Wye to Delta wired configuration with the gauss created by the permanent magnets to achieve energy efficiency at each setting electronically controlled switches.

In implementations, the stator core windings are multi-pole and the poles in each phase are equally spaced around the periphery of the stator, where each pole core winding is terminated on both ends by respective ones of the electronically controlled switches so that the poles in a phase winding can be connected in series or parallel, or in sets of two or more poles connected in parallel with the sets connected to each other in series.

In implementations, the one or more stators comprise at least a first stator ring and a second stator ring, wherein the respective stator windings of the first stator ring and the second stator ring are spaced apart in an axial direction and cored and/or wound differently to create two distinct ranges of performance in torque/speed and amps/volts, each of the two distinct ranges of performance corresponding to an alignment of the rotor with a selected one of the first and second stator rings.

In implementations, the translation of the stator ring(s) and/or the rotor ring(s) is controlled by commands from a computer system that can accept information from various torque, speed, volt, amp, heat, proximity and other input sensors and/or human activated control devices (e.g., a computer interface device). The computer system can be configured to perform one or more algorithms to control the movement of the stator ring(s) and/or rotor ring(s) from or to positions 1, 2, 3, and other positions in between to affect the magnetic interaction between the stator ring(s) and the rotor ring(s) to change the speed/torque and volt/amp ratios of the, MGT unit causing it to perform as a transmission.

In implementations, the stator ring and rotor ring may be at least one of, laminated iron plates, powdered iron and resin or any other material known in the art of electric motors or generators. The permanent magnets along the periphery of the rotor ring may be comprised of neodymium iron boron (NdFeB) or material of comparable or better magnetic strength and/or coercivity composition of magnets or magnet with increased magnetic strength and/or coercivity.

In implementations, any one or more of the two or more non-twisted parallel wires that are connected in series, in either WYE or Delta configurations, may be disconnected from the series with no electric current flowing through it or them but through the remaining wires connected in the series. Where each of the wires disconnected in the phase decreases the number of amp turns in each of the cores and produces a different torque/speed and volt/amp ratio for each of the wires disconnected than if all were included in the series winding. For example, FIGS. 11B and 11C show examples where a portion of the non-twisted parallel wires in each phase leg are connected in parallel, and one or more wires are disconnected from the connected portion of wires.

In implementations, the multiple wires in the core phase windings may be of different diameter having different amp carrying capacities and resistance enabling the implementation of different amp and amp/turn combinations in the core windings as the switching is conducted.

In implementations, the stator core windings are multi-pole, and the poles in each phase are spaced around the periphery of the stator where each pole core winding is terminated on both ends at electronically controlled switches so that the poles in a phase winding can be connected in series or parallel or in sets of two or more poles connected in parallel and the sets connected to each other in series and so that the coils may be independently energized.

Figure 37A:
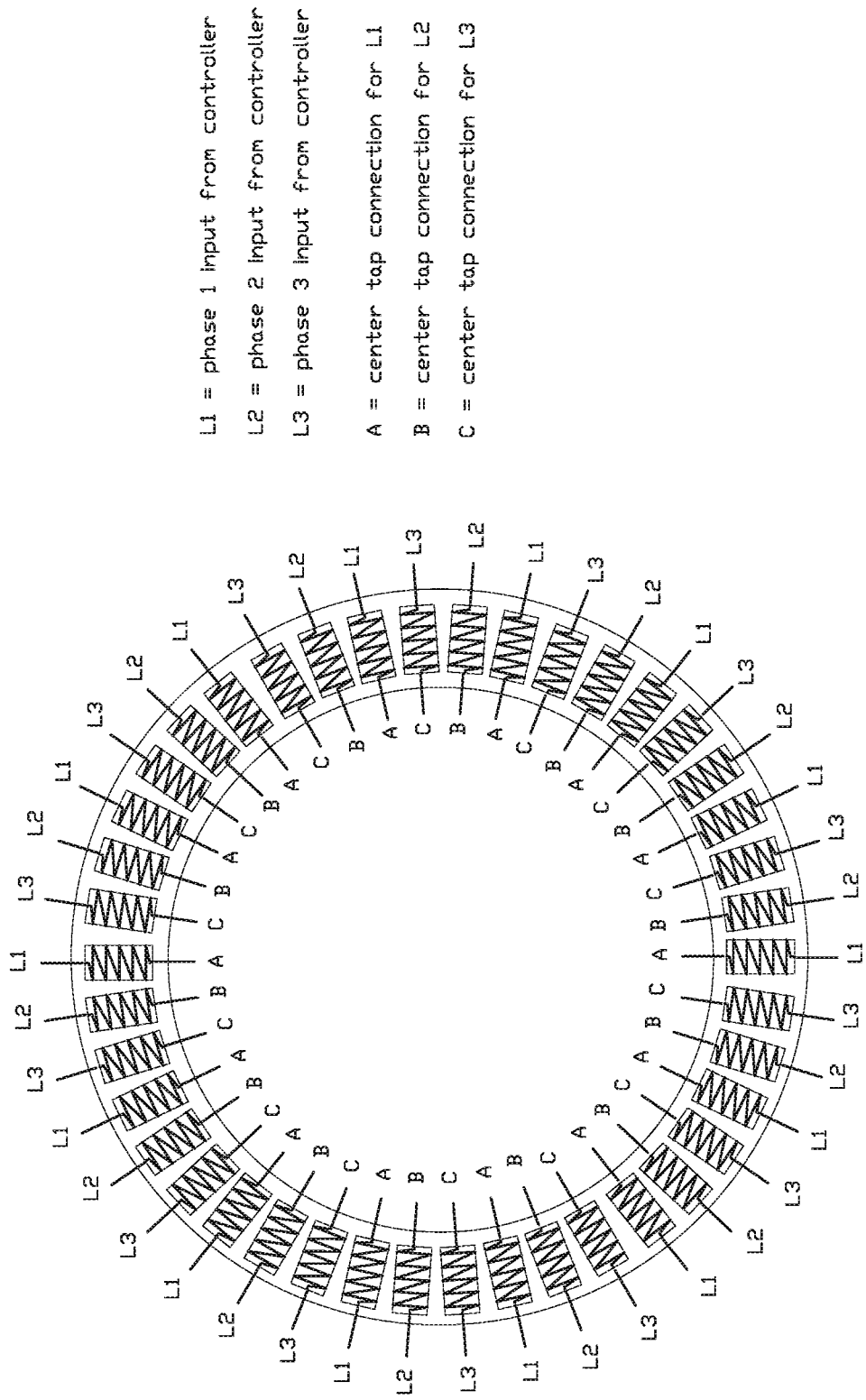
FIG. 37A is a schematic of a stator winding configuration of a 3-phase stator, in accordance with an example embodiment of the present disclosure.
Figure 37B:
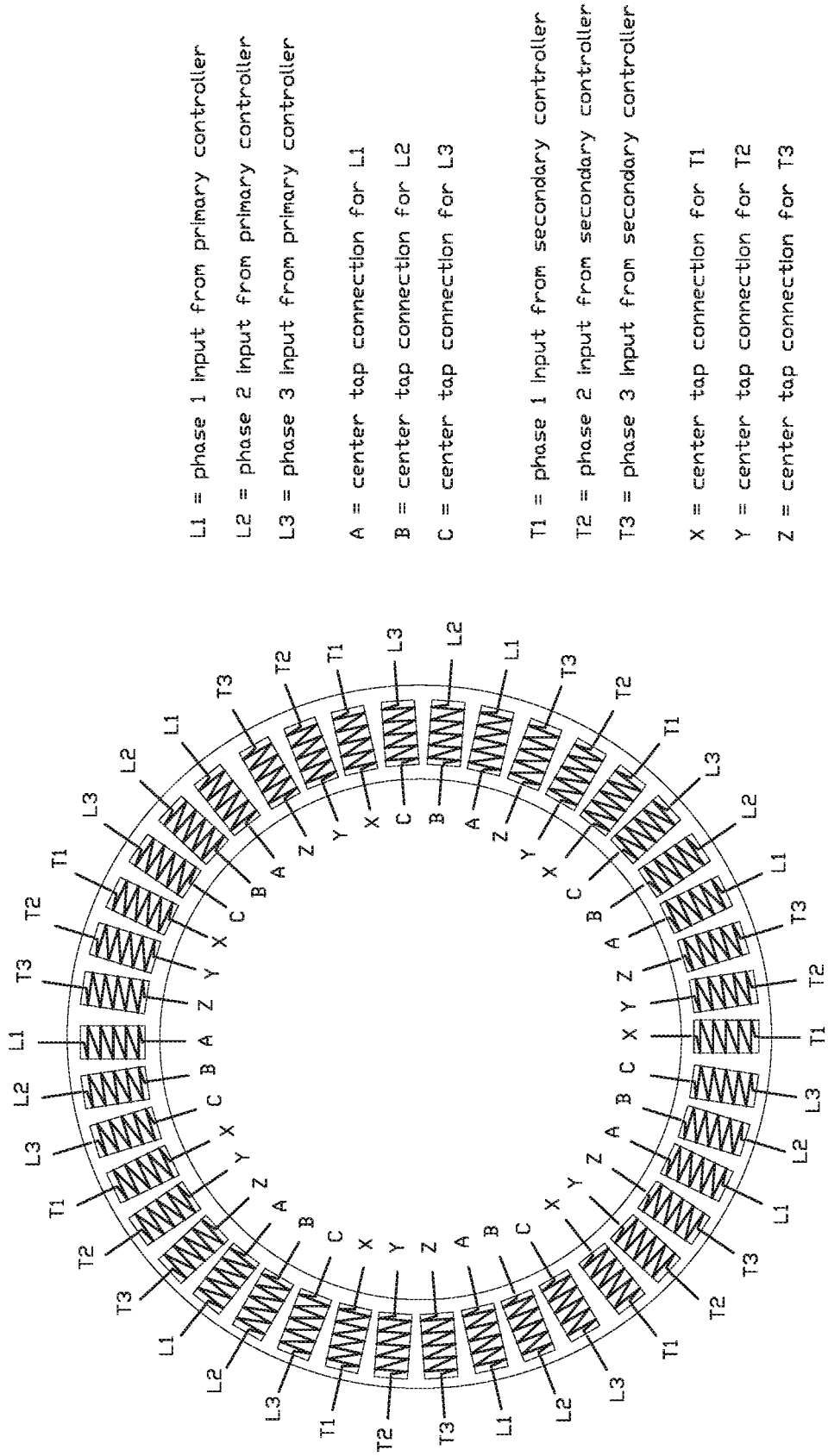
FIG. 37B is a schematic of a dual wound stator configuration implementing multiple separately controlled split-pole 3-phase stators in a common stator assembly, in accordance with an example embodiment of the present disclosure.

In some embodiments, the stator rings are dual wound. For example, FIG. 37A illustrates a split stator that is single wound, and FIG. 37B illustrates a split stator that is dual wound. Referring to FIG. 37A, this figure shows connections for a three-phase stator in normal mode as one single stator. The stator ring shown in FIG. 37A has 42 separate coils (14 three phase sets). The center tap of each phase namely A, B and C are connected to corresponding phase where all the A connections are together, all the B connections are together and all the C connections are together. The A center tap connections are for the Phase 1 or L1 inputs from the controller. The B center tap connections are for the Phase 2 or L2 inputs from the controller. The C center tap connections are for the Phase 3 or L3 inputs from the controller. Referring now to FIG. 37B, this figure shows the connections for a three-phase stator in split mode as a double stator. For example, the stator ring in FIG. 37B is configured with a first set of stator coils in half as many coil spaces as are available in the stator ring, alternately spaced around the ring. The first set of stator coils is served by a first controller. The stator ring is further configured with a second set of stator coils in a remaining half of the coil spaces of the stator ring. The second set of stator coils is served by a second controller. A common computer processor is configured to control the first controller and the first set of stator coils and the second controller and the second set of stator coils independent of one another. In an embodiment shown in FIG. 37B, the stator ring has 42 separate coils (two separate instances of 7 three phase sets). They are evenly spaced and balanced around the periphery of the stator frame. The center tap of each phase namely A, B and C are connected to corresponding phase where all the A connections are together, all the B connections are together, and all the C connections are together. The center tap of each phase namely X, Y and Z are also connected to corresponding phase where all the X connections are together, all the Y connections are together, and all the Z connections are together. The A center tap connections are for the Phase 1 or L1 inputs from the controller. The B center tap connections are for the Phase 2 or L2 inputs from the controller. The C center tap connections are for the Phase 3 or L3 inputs from the controller. The X center tap connections are for the Phase 1 or T1 inputs from the controller. The Y center tap connections are for the Phase 2 or T2 inputs from the controller. The Z center tap connections are for the Phase 3 or T3 inputs from the controller. The configuration shown in FIG. 37B enables utilization of two controllers at the same time within a single stator frame, thereby allowing series/parallel internal switching while one controller (i.e., a controller connected to wires that are not being reconfigured) is still in operation.

The use of switched stator windings has been discussed, where the stator coils are wound with multiple wires that could be switched from being in all series, all parallel or a combination thereof in either the WYE or the Delta configuration. Some problems that have been encountered are the following. There may be a loss of torque during the time interval of the switching, causing a bump or jerk in the vehicle being propelled. There is no way to adjust or weaken the magnetic field or a permanent magnet motor. More than two wires while possible are not always practical.

The inventors have found that not only is there a loss of torque in the switching interval but the speed/torque ratio difference between all series and all parallel is quite severe as is switching between the Delta and WYE configuration. This large difference in torque and speed also causes a bump or sudden lurch. In some implementations of this disclosure (e.g., FIGS. 1 through 6), the MGT unit has two or more multiple wire wound stator rings and one permanent magnet rotor ring. The stator rings and the rotor ring can be repositioned while the stator windings are electronically reconfigured to create a synergistic relationship, whereby the MGT unit can be electrically shifted from one gear to the next and also mechanically shifted to smooth the transition between gears. For example, the stator windings of the first stator ring can be configured in a first gear, and the stator windings of the second stator ring can be configured in a second gear. The rotor ring can be moved from a first position (engaging the first stator ring) to a second position (engaging the second stator ring) to provide a smooth shift from the first gear to the second gear. Similarly, the stator windings of the first stator ring can be switched into a third gear, and the rotor ring can be brought back into a position engaging the first stator ring to provide a smooth shift from the second gear to the third gear. This process can be repeated to smoothly transition from one gear to the next in either direction (e.g., going up gears or going down).

In some embodiments, the switching of the wires and the stator poles is controlled by the computer system that can accept information from various torque, speed, volt, amp, heat, proximity and other input sensors and/or human activated control devices (e.g., a computer interface device). The computer system may be configured to process the information by performing one or more algorithms to change the speed/torque and volt/amp ratios of an MGT unit causing it to perform as a transmission.

In some embodiments, a rotor assembly includes two rotor rings having respective sets permanent magnets (e.g., as described herein and shown in FIGS. 16 through 24 or FIGS. 25 through 36), where both of the rotor rings are slidably coupled to their longitudinal rotor support structure, and where they are moved or translated closer together or further apart by a linear motion device (e.g., linear actuator), such as set screw powered by stepper motors located within cavities in the rotor rings, solenoids, hydraulic or pneumatic cylinders, or the like, under the control of the computer system. These units may also have two stators and three rotors two rotors engaged with any one stator at a time switching back and forth between stators to accomplish the smooth transition in switching between wiring configurations as above described.

In some attempted configurations to implement switching between all parallel, all series Delta and Y connections, the process has been frustrated by the generally unacceptable interruption of power, large power surges and jolts to the mechanical process during and immediately following the short time interval necessary to complete the switch from one wiring configuration to another and has been further limited to attempts to create multi-speed electric motors.

This disclosure eliminates the interruption, power surge and jolt problems and further concentrates on obtaining the most efficient energy consumption/production for each range of speed and torque under which the motor or generator will be used. Current electric motor art creates highly efficient motor/generators at the constant speeds and torque settings for which they were designed. This disclosure creates multiple highly efficient points over a much wider speed/torque spectrum and allows the motor/generator to adjust or fine tune the magnetic field between the stator coils and the rotor magnets to meet (or nearly meet) the optimum amp and torque requirements of a motor or generator employing the MGT unit and to optimize efficiency at any time under widely variable conditions such as a motor/generator on a bus or delivery truck or a generator on a wind mill under widely varying wind conditions, or any other motor/generator deployment with variable torque/speed requirements.

Example Implementations—MGT Unit and/or System Controls

Figure 15:
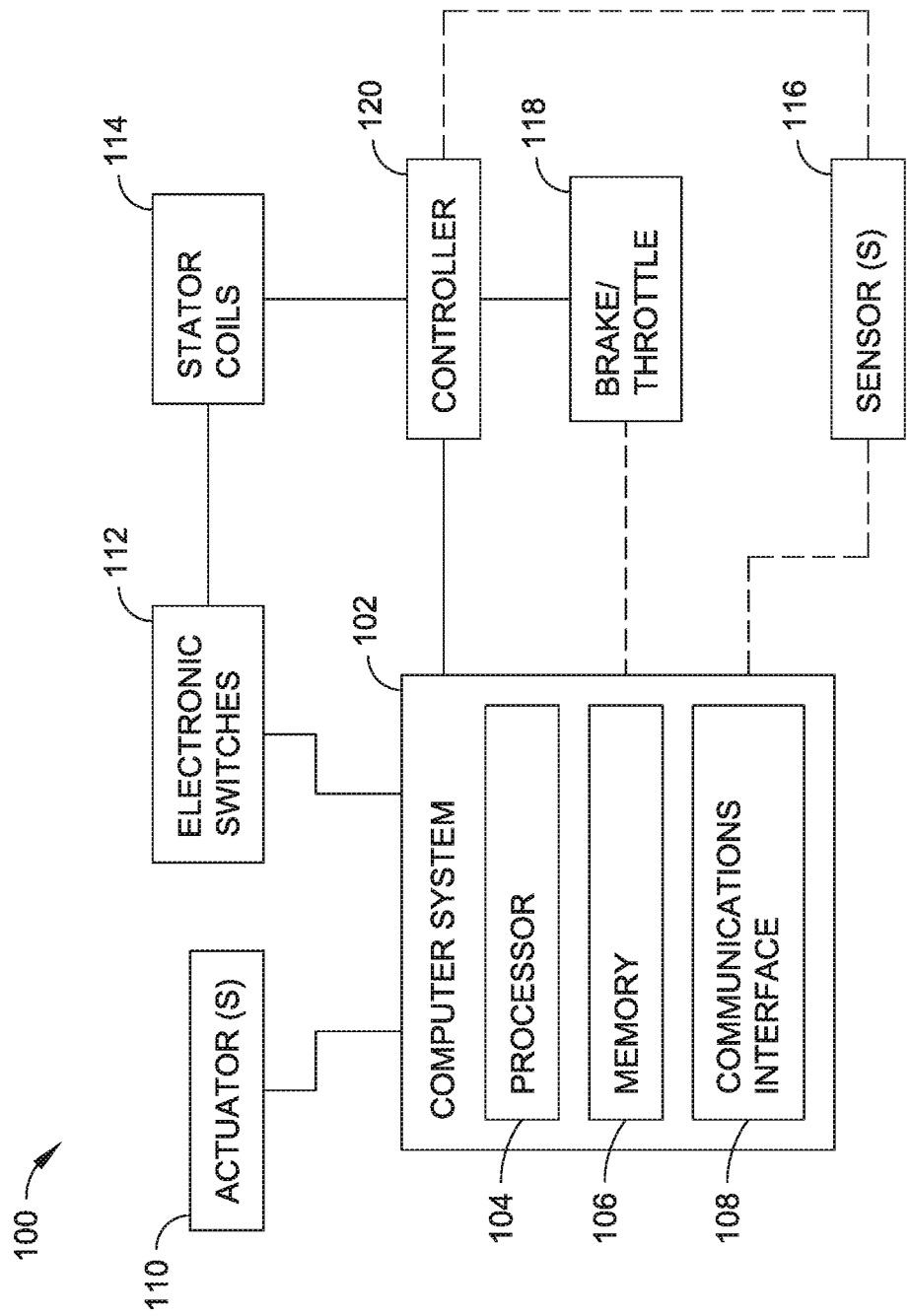
FIG. 15 is a block diagram illustrating control components for an MGT unit/system, in accordance with an example embodiment of the present disclosure.
Figure 16:
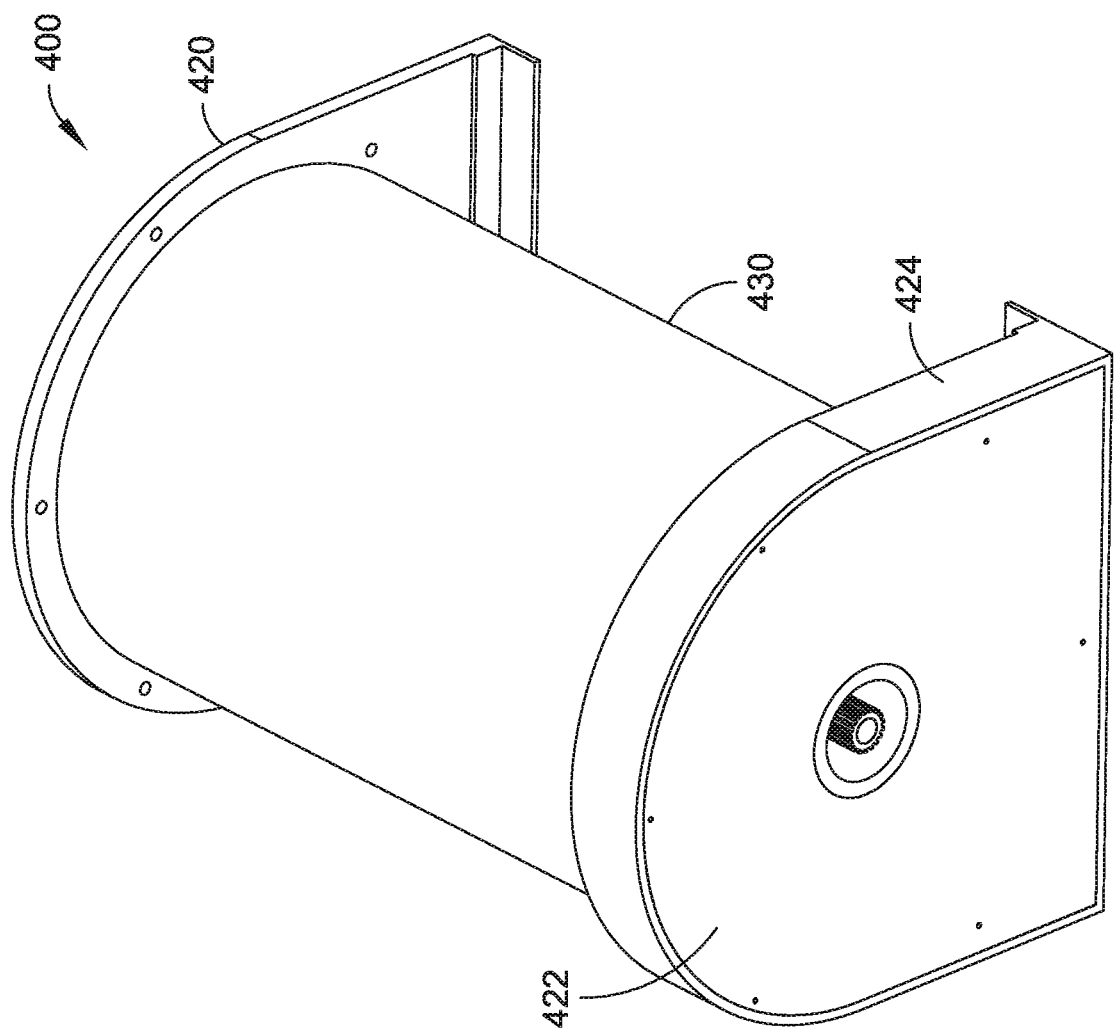
FIG. 16 is a perspective view illustrating MGT unit, in accordance with an example embodiment of the present disclosure.
Figure 17:
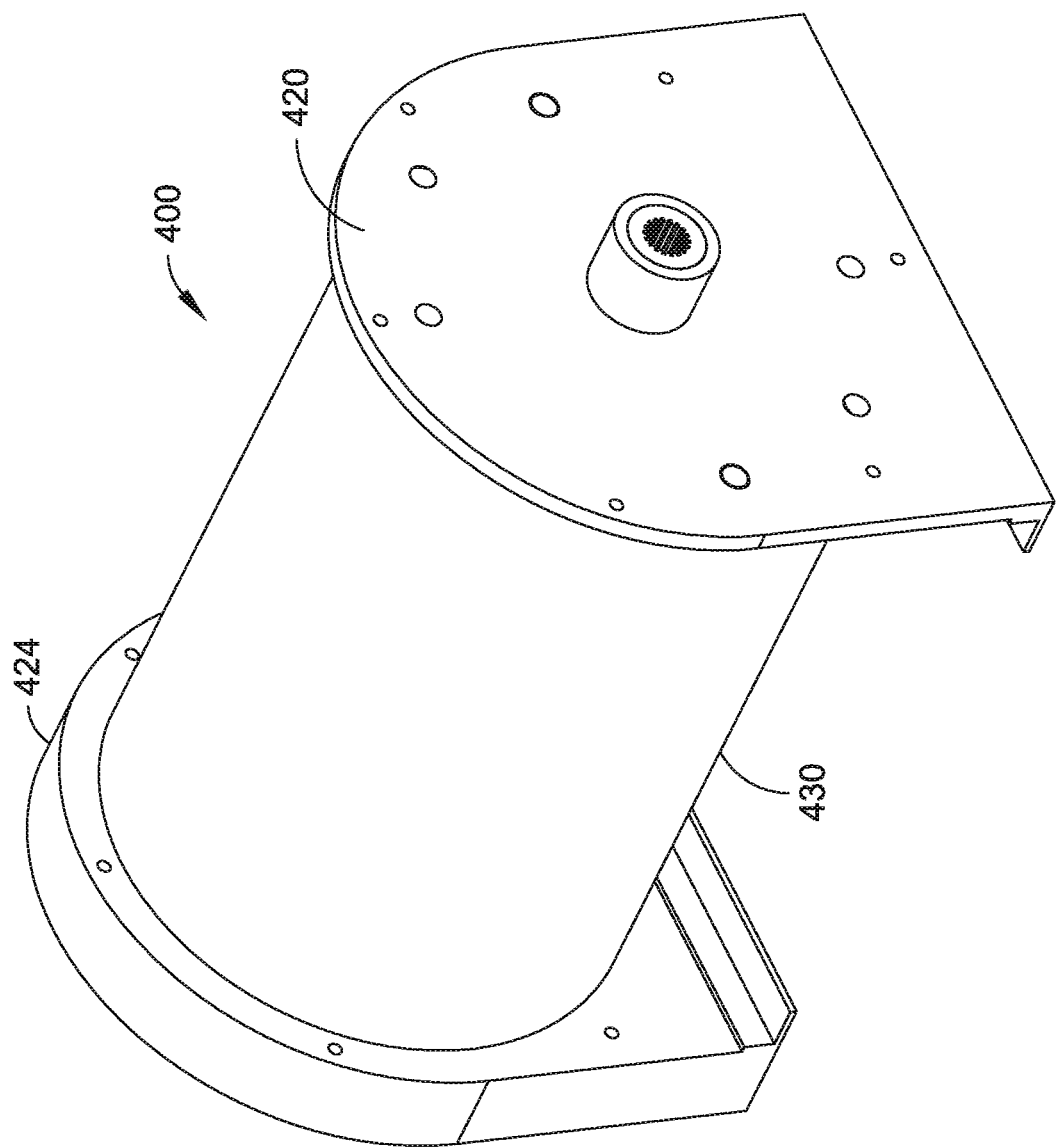
FIG. 17 is another perspective view of the MGT unit illustrated in FIG. 16, in accordance with an example embodiment of the present disclosure.
Figure 18:
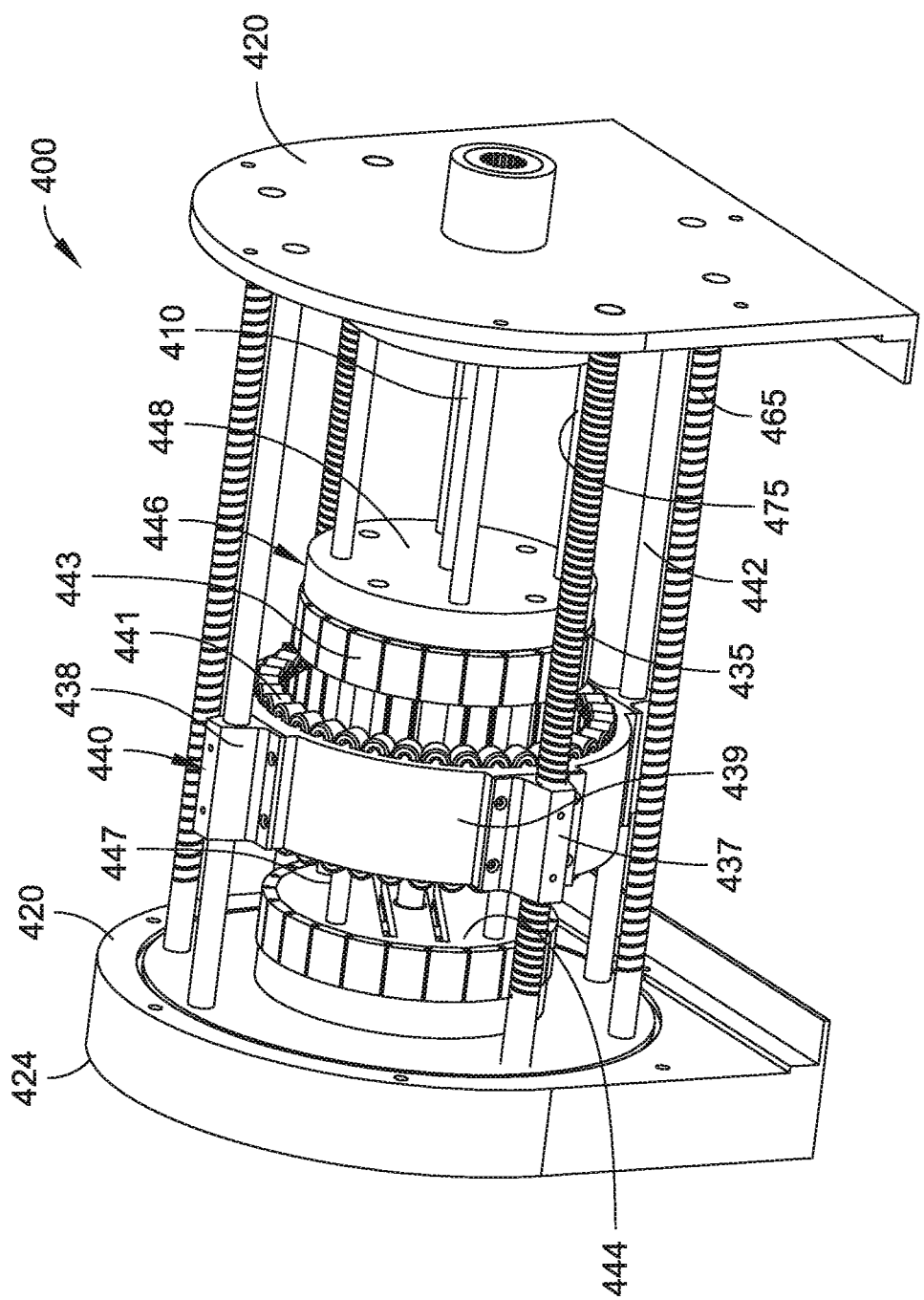
FIG. 18 is a perspective view of the MGT unit illustrated in FIG. 16 with a portion of its housing removed, in accordance with an example embodiment of the present disclosure.

An MGT unit, such as any of those described herein, including some or all of its components, can operate under computer control. For example, FIG. 15 shows a control system 100 for operating one or more MGT units. An MGT unit computer system 102 can be configured to interface with a controller 120 (e.g., H-bridge controller, inverter, and/or converter) for controlling voltage, frequency, and/or amperage supplied to or from the stator coils, the actuator(s) 110 (e.g., linear stator and/or rotor actuator(s)), electronic switches 112 for reconfiguring the stator windings into Star/WYE and Delta configurations and parallel and series configurations and combinations as described herein, sensor(s) 116 (e.g., Hall effect or optical sensors to detect rotational frequency (RPM), voltage sensors, current sensors, frequency sensors, etc.), brake/throttle controls 118, and so forth. In some embodiments, the MGT unit includes the computer system 102. In other embodiments, the computer system 102 can be communicatively coupled to the MGT unit. A processor 104 can be included with or in the computer system 102 to control the components and functions of the MGT unit(s) described herein using software, firmware, hardware (e.g., fixed logic circuitry), manual processing, or a combination thereof. The terms "computer system," "functionality," "service," and "logic" as used herein generally represent software, firmware, hardware, or a combination of software, firmware, or hardware in conjunction with controlling the MGT unit. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

The computer system 102 can include a processor 104, a memory 106, and a communications interface 108. The processor 104 provides processing functionality for at least the computer system 102 and can include any number of processors, micro-controllers, circuitry, field programmable gate array (FPGA) or other processing systems, and resident or external memory for storing data, executable code, and other information accessed or generated by the computer system 102. The processor 104 can execute one or more software programs embodied in a non-transitory computer readable medium that implement techniques described herein. The processor 104 is not limited by the materials from which it is formed or the processing mechanisms employed therein and, as such, can be implemented via semiconductor(s) and/or transistors (e.g., using electronic integrated circuit (IC) components), and so forth.

The computer system 102 may include a memory 106 (e.g., Flash memory, RAM, SRAM, DRAM, ROM, etc.). The memory 106 can be an example of tangible, computer-readable storage medium that provides storage functionality to store various data and or program code associated with operation of the computer system 102, such as software programs and/or code segments, or other data to instruct the processor 104, and possibly other components of the MGT unit, to perform the functionality described herein. Thus, the memory 106 can store data, such as a program of instructions for operating the MGT unit (including its components), and so forth. It should be noted that while a single memory 106 is described, a wide variety of types and combinations of memory (e.g., tangible, non-transitory memory) can be employed. The memory 106 can be integral with the processor 104, can comprise stand-alone memory, or can be a combination of both.

Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the computer system 102 and/or the memory 106 can include removable integrated circuit card (ICC) memory, such as memory provided by a subscriber identity module (SIM) card, a universal subscriber identity module (USIM) card, a universal integrated circuit card (UICC), and so on.

The computer system 102 may include a communications interface 108. The communications interface 108 can be operatively configured to communicate with components of the MGT unit. For example, the communications interface 108 can be configured to transmit data for storage in the MGT unit, retrieve data from storage in the MGT unit, and so forth. The communications interface 108 can also be communicatively coupled with the processor 104 to facilitate data transfer between components of the MGT unit and the processor 104 (e.g., for communicating inputs to the processor 104 received from a device communicatively coupled with the MGT unit/computer system 102). It should be noted that while the communications interface 108 is described as a component of computer system 102, one or more components of the communications interface 108 can be implemented as external components communicatively coupled to the MGT unit via a wired and/or wireless connection. The MGT unit can also include and/or connect to one or more input/output (I/O) devices (e.g., via the communications interface 108), such as a display, a mouse, a touchpad, a touchscreen, a keyboard, a microphone (e.g., for voice commands) and so on.

The communications interface 108 and/or the processor 104 can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 108 can be configured to communicate with a single network or multiple networks across different access points. In a specific embodiment, a communications interface 108 can transmit information from the computer system 102 to an external device (e.g., a cell phone, a computer connected to a WiFi network, cloud storage, etc.). In another specific embodiment, a communications interface 108 can receive information from an external device (e.g., a cell phone, a computer connected to a WiFi network, cloud storage, etc.).

The controller 120 is configured to control the voltage, amperage, and/or frequency of signals suppled to (in the case of a motor) or from (in the case of a generator) stator coils 114 (e.g., signal through wires of stator coils in any of FIGS. 1 through 14 and 16 through 36). For example, the controller 120 may be configured to adjust the voltage, amperage, and/or frequency based on an input signal from the brake/throttle 118 and/or sensor(s) 116 (e.g., based on detected RPM or radial position of rotor rings). The computer system 102 is configured to monitor the controller 120 and possibly other data sources (e.g., sensor(s) 116 for RPM readings, brake/throttle 118 inputs, and so forth). Based on information received from these data sources, the computer system 102 can operate the actuators 110, electronic switches 112, and the controller 120. For example, when the controller 120 has reached a predetermined operating threshold (e.g., minimum/maximum voltage, amperage, frequency, etc.), the computer system 102 may be configured to cause the controller 120 to be placed in a neutral state while the computer system 102 causes the actuators 110 and/or electronic switches 112 to reconfigure the stator and/or rotor rings (as described with regard to any of FIGS. 1 through 14 and 16 through 36). The computer system 102 is configured to then cause the controller 120 to resume transmission to or from the stator coils at an amperage, voltage, and/or frequency that provides approximately the same number of amp-turns (At) as was provided prior to the mechanical and/or electrical reconfiguration of the rotor and/or stator rings. The controller 120 can then continue operation until another operating threshold is reached, where the computer system 102 can then repeat the same reconfiguration and reprogramming of the MGT unit components.

The computer system 102 can be configured to cause the electronic switches 112 to switch a wiring or phase configuration of the stator coils at least partially based upon the rotational frequency (e.g., RPM) of the first and second rotor rings. For example, the computer system 102 can control the electronic switches 112 and/or the actuators 110 to change electrical and/or mechanical configurations of the system based on the rotational frequency or other information indicative of the system power requirements. The computer system 102 can implement a plurality of gears (i.e., different mechanical and/or electrical configurations) to successively increase or decrease amp-turn capacities, thereby increasing or decreasing a corresponding strength of a magnetic field of the stator coils, as a demand for power on the MGT unit/system increases or decreases. The computer system can be configured to cause the electronic switches 112 to connect the multiple parallel non-twisted wires of the stator coils in all series, all parallel, or in a combination of series and parallel. The computer system 102 can also be configured to cause the electronic switches 112 to connect a portion of the multiple parallel non-twisted wires in all series, all parallel, or in a combination of series and parallel and configured to cause the electronic switches 112 to disconnect one or more wires from the portion of the multiple parallel non-twisted wires (e.g., see FIGS. 11B and 11C). The computer system 102 can be configured to cause the electronic switches 112 to switch the phase wiring between the star (Y) configuration and the Delta configuration and configured to connect the multiple parallel non-twisted wires in all series, all parallel, or in a combination of series and parallel. The computer system 102 can be configured to cause the electronic switches 112 to switch the phase wiring between the star (Y) configuration and the Delta configuration, configured to cause the electronic switches 112 to connect a portion of the multiple parallel non-twisted wires in all series, all parallel, or in a combination of series and parallel, and configured to cause the electronic switches 112 to disconnect one or more wires from the portion of the multiple parallel non-twisted wires. In an implementation such as shown in FIGS. 16 through 24 or FIGS. 25 through 36, the computer system 102 can be configured cause the actuator(s) to: place the first rotor ring and the second rotor ring in a first position on either side of the center plane of the stator ring where the distance from the center plane of the stator ring to the inner surface of each rotor ring; place the first rotor ring and the second rotor ring in a second position where the inner surfaces of the first and second rotor rings are coplanar with respective outer surfaces of the stator ring, on either end of the stator ring; place the first rotor ring and the second rotor ring in a third position where the inner surfaces of the first and second rotor rings are coplanar with the center plane of the stator; and place the first rotor ring and the second rotor ring at one or more positions other than the first, second, and third positions. These are some examples of the electrical and/or mechanical configurations that can be affected by the computer system 102 in order to change the magnetic field strengths and interactions in the MGT unit/system. Any combination of the foregoing operations can be implemented by the MGT control system 100 to improve/optimize efficiency of the overall system.

In embodiments, an MGT system can include another MGT system computer that can also include a processor, a memory, and a communications interface, such as those described herein. The MGT system computer can be in communication with the MGT unit including computer system 102 and possibly one or more additional MGT units and their respective computer systems to provide central processing for the MGT system. The MGT system computer can be configured to receive operator commands and parameters such as RPM, speed, torque parameters, and so forth, and the MGT system computer can control the MGT units based on the received information to control the stator and/or rotor positioning and stator winding and/or phase wiring configurations in order to achieve desired (e.g., optimal or near optimal) system requirements.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Various embodiments of MGT units have been described herein. Such MGT units can be implemented in a variety of power generation and power management applications. For example, the MGT units described herein can be implemented in generation devices (e.g., windmills, hydropower generators, and the like) and vehicles or motor-driven devices with multiple power sources, such as hybrid vehicles (e.g., cars, motorcycles, etc.), hybrid marine vessels, hybrid airplanes, and so forth. Some example applications are discussed below.

Example Implementations—Wind Power Generation System

In an example application where an MGT unit as described herein is implemented in a windmill or wind turbine, an operating scenario can start with no wind at the wind turbine and the stator ring(s) and rotor ring(s) in the inactive "stopped" condition. In this scenario, an actuator has moved the stator ring(s) and/or rotor ring(s) to a position where the stator windings are disengaged from the magnetic field of the rotor magnets. As the wind speed starts to increase, a sensor can measure the RPM and "shift" or move the stator ring(s) and/or rotor ring(s) from the neutral mode into a position where the magnetic field of the rotor magnets engages the least amount of stator windings and is 100% parallel requiring the least amount of torque, allowing rotation of the windmill to begin at very low wind speeds and generate electricity much sooner than conventional generators can "startup". The computer system can collect data from wind speed sensors and the rotational speed of the windmill. As the wind speed increases, the computer system can shift the MGT unit from Gear #1, 100% series to Gear #2, three sets of two parallel wires connected in series, and so on to Gears #3 and #4 and so forth (and possibly intermediate gears), increasing the torque required to turn the windmill blades until either a preset rotational speed is achieved or the resisting torque of the stator/rotor set is equal to the power of the wind and the wind mill blades are turning at a constant speed.

As the computer system monitors the wind speed and power available from the wind it can engage the actuators of 1, 2, 3 or more stator/rotor sets to match the power of the wind concurrently shifting each of the stator/rotor sets through their various gears and stators/rotors as above described until equilibrium in the rotational speed of the windmill blades is achieved and the power of the wind is matched with an optimum or nearly optimum generating capacity of the wind power generator and maintaining needed line voltage. As the wind speed increases and it is desired to bring additional stator sets online, say from three sets to four sets, the computer can determine what gear the four sets can be in and what stator activated, then momentarily electrically disconnect the three sets, place the four sets in the new configuration and electrically reconnect the four sets to be concurrently shifted with the same voltage emanating from each stator set. Final adjustments and fine tuning is achieved by fine adjustment of the alignment of the stators with the rotor in the sets. This also applies when minor adjustments are required to accommodate minor variations in the wind speed.

When the wind velocity subsides, and the number of stator sets on line is to be decreased from four to three, the last stator to come on line is electrically disconnected, its stator repositioned to neutral and the three remaining stator sets adjusted to match the wind power then being generated by the windmill. In this manner systems and techniques in accordance with the present disclosure can accurately, swiftly and efficiently balance the power output of the motor generator with the available wind speed at levels of wind speed and produce generated electric power from the wind at high efficiency rate. Generally, the total number of stator/rotor sets in the motor/generator in full series setting acting together can correspond to the maximum structural and mechanical capabilities of the wind mill and its blades. At the point of maximum capacity as with some generators it can automatically shut down. But unlike generators that have a narrow band of wind speeds where they operate efficiently, techniques in accordance with the present disclosure can extract increased power from the wind at high efficiency throughout the entire range of wind speeds up to the structural capacity of the wind mill. When the wind speed starts to slow down, and the output voltage drops, the unit can switch down to the next stator-wiring mode to increase the voltage/power collection. When the wind speed drops to a very slow condition, and although not much power is generated, the unit can still capture this and help with the annual wind turbine output for greater overall machine efficiency where conventional generators may have to shut down.

Another operational function can be described in a larger scaled up version as in megawatt sized wind turbines. This scenario can behave the same as in the small wind example, but the configuration of the generator can be much larger, may have as many as 12 or more stator/rotor sets in a 3-phase configuration to enable a smooth transition in RPM changes do to highly variable wind. The stator engagement process can also be the same or similar, with the exception of extra user controls, sensors for power grid control and monitoring systems to sense the load and adjust to customer demand.

Another feature of this disclosure is the addition of larger stator/rotor sets and the ability to offset each of the stator/rotor sets rotationally by a few degrees as to make the number of stator and rotor section equal the evenly spaced out rotational offsets. This can help with generator "cogging" and enable a design of this disclosure whereby the multiple stator windings can be controlled to have an onboard insulated gate bipolar transistors (IGBTs) select the different high and low voltage points and using pulse width modulation (PWM) schemes, build and create a 3-phase sine wave at a set frequency of 60 hz. When sensing RPM changes and fluctuations, the controls can adjust the stator winding section to keep and maintain this frequency even when moderate RPM changes are noticed. This is a solution for a variable rotational power source and a constant frequency generated output for a local grid or emergency power source without conversion losses due to AC-to-DC and large inverter systems power consumption. To understand this process, an example of a large stator set of multiple pole 3-phase winding and 12 stator and rotor sets is provided. In this example, the stator sets are aligned with each other but the rotor sets are rotationally offset by $1/12^{th}$ of the multiple pole rotational angle. This can provide 12 separate 3-phase outputs equally spaced in oscillation offset. The computer system can then take the current RPM, acceleration, load, back EMF (electromagnetic force), output frequency and target frequency and use the PWM switching IGBT's to select upcoming power potentials from the multiple phases and produce the target frequency from the high and low points of the generated multiple phases, possibly regardless of the source RPM (e.g., as long as the RPM is sufficient to maintain the target voltage and power output). The same linear actuation of the stator sections can regulate the torque and changing wind speed rotor RPM's while producing efficient power for the conditions of gusts and very low wind speed plus conditions in between.

The disclosure's operational function in the application of other renewable energy sources such as tidal and wave generation machines can utilize this same variability in RPM to increase efficiency where the source is intermittent and unreliable, for example, where wave and possible tidal generation machines may also turn a generator one direction and then immediately change rotational direction and continue to generate power efficiently. This disclosure has the ability to add additional rotor/stator set to increase and/or decrease the power capacity and then fine-tune the output with the stator and/or rotor linear movement to coincide with the gradual oscillating output power source and direction changes and further adjust the volt/amp ratios to increase the efficiency of the unit to match the variable input at an instant of time, by switching between stators and parallel or series winding.

Example Implementations—Hybrid Vehicle Propulsion System

Figure 38:
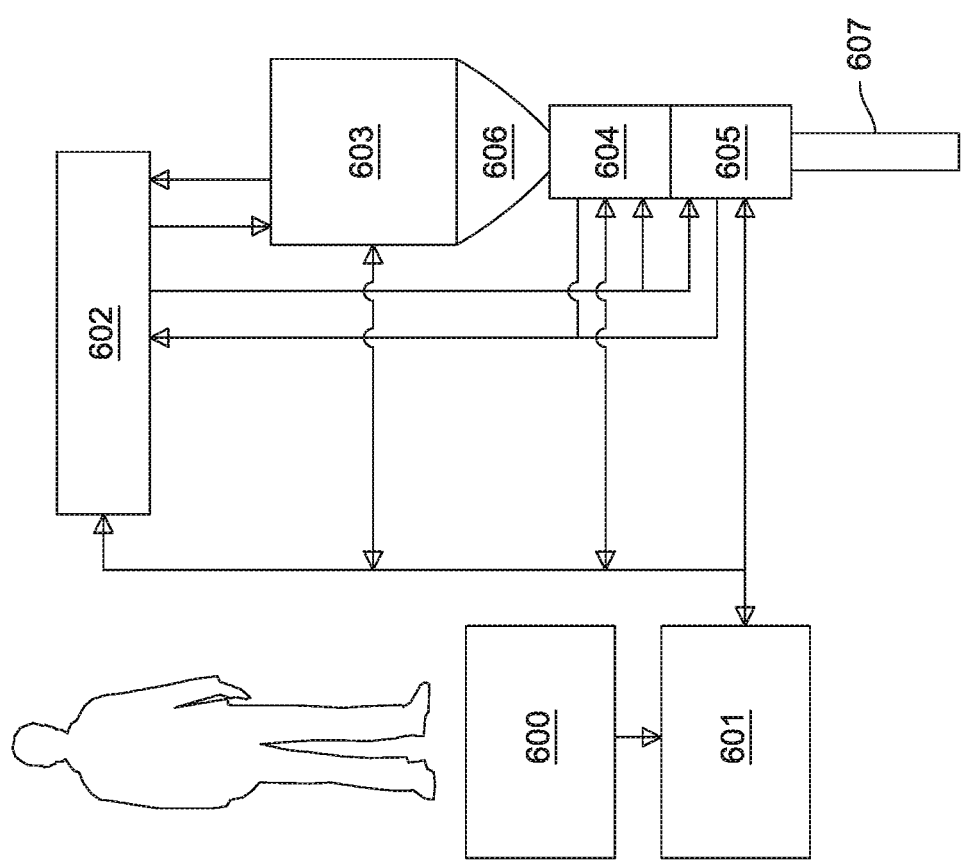
FIG. 38 is a block diagram illustrating a hybrid vehicle that employs an MGT unit, such as any of the MGT units illustrated by FIGS. 1 through 37B, in accordance with an example embodiment of the present disclosure.

FIG. 38 shows an implementation of the MGT unit in a hybrid vehicle (e.g., automobile, boat, or other transportation vehicle) where operator input 600 is supplied to the computer system 601 by a conventional vehicle component, such as a throttle, brake pedal, ignition switch, forward and reverse lever, or the like. An advantage of the MGT unit is that it has a neutral and many combinations of speed and power between neutral and full power and does not require a clutch interconnection 606 between it and the combustion engine 603 and is its own transmission. Also, multiple MGT units may be joined together to greatly increase the available power as is shown in FIG. 38 (e.g., MGT units 604 and 605).

When the vehicle is operating under combustion power only, both MGT units 604 and 605 can be placed in neutral and the vehicle driven as any other vehicle on the road today except that either or both MGT units 604 and/or 605 may have their rotors moved from position 1 (neutral) to position 2 (e.g., as shown in FIG. 23) where trickle power is generated for recharging the batteries over long highway road trips and negligible power is taken from the combustion engine 603. If a full charge is needed more quickly, the rotor rings in MGT units 604 and/or MGT unit 605 may be advanced towards position 3 (e.g., as shown in FIG. 24) based on one or more commands from a computer system 601 (e.g., such as the MGT unit computer system 102 and/or MGT system computer described herein), where the need for battery reserves are balanced against the expense and availability of increased combustion fuel consumption and operator requirements/input. Also when under combustion power as the operator applies pressure to the brake pedal, the rotor rings in one or both MGT units 604 and 605 advance quickly towards position 3 generating electricity to recharge the batteries while applying braking force to the drive shaft commensurate with the amount of pressure applied to the brake pedal by the operator to stop the vehicle. This feature of the MGT surpasses any similar application in a hybrid electric vehicle by virtue of the fact that the permanent magnets in the MGT rotors may be larger than would be used in a conventional electric motor since the interaction of the magnetic field between the rotors and the stator may be varied between 0 and maximum value utilizing lower values when operated as a motor and higher in some cases when operated as a brake generating electricity. Also when the brakes are applied at high speed a significant amount of electricity could be generated in a short period of time and exceed the amperage capacity of the stator coil wires. When this occurs in the MGT units 604 and 605 their stator coils are switched to all parallel or a combination of series and parallel that will accommodate the sudden amperage increase. This is not possible in any conventional electric motor/generator.

In some applications, such as rapid transit, it may be desirable to have the combustion engine 603 providing power to the first MGT unit 604 acting as a generator which would be supplying power to charge the battery bank 602 and the second MGT unit 605 providing mechanical power to the drive wheels of the train. In such cases a clutch 606 would be installed between MGT units 604 and 605. MGT unit 604 serves as the generator and MGT unit 605 serves as the propulsion unit where at any point in time all three including the combustion engine 603 could be providing mechanical power to the drive shaft 607 to the drive wheels and at any point in time both units (MGT unit 604 and MGT unit 605) could be generating electricity to charge the batteries 602 while furnishing braking energy to stop the vehicle (e.g., a train).

In some applications, a hybrid vehicle may be equipped with a combustion engine that is very economical to operate but only of sufficient power to propel the vehicle at slow speed on level ground or higher speed on the interstate highway but insufficient for rapid acceleration or hill climbing. In such an application, the MGT unit is ideal in that it has a neutral and will draw no power when the combustion engine is operating in its most economical mode, but when stressed by the terrain or by additional pressure on the accelerator by the operator the central processor will activate one or more MGT units and move their rotors and switch their stator wires to supplement the power of the combustion engine with sufficient electromechanical power to meet the conditions or circumstances at hand. This same vehicle would also have the same battery recharge and braking features described above.

When the MGT units are used to propel the vehicle exclusive of the combustion engine they are highly efficient, more so than a conventional electric motor under variable speed and torque applications. Conventional electric motors are efficient under a very narrow range of speed and torque for which they were designed. High efficiency requires that the flow of flux or the interaction of the flux between the rotor and stator be balanced. A conventional electric motor can over a narrow range vary the voltage and amperage of the electricity in the stator coils and in the process, change the strength of the stator magnetic field, but it cannot change the strength of the magnetic field of the rotors in a permanent magnet electric motor and only inefficiently in other AC electric motors. Thus, when the strength of the magnetic field of the stator in a conventional electric motor varies from its designed value it losses efficiency since it is not in balance with the magnetic field of the rotor. The disclosed MGT units can vary the magnetic flux from the rotors with that of the stators and further increase the variability of the stators by switching from all series to all parallel or combinations thereof in its stator coils, whereby the balance between the magnetic field of the rotor and the stator is maintained by commands from the computer system to move the rotor position, switch the stator wires between combinations of series and parallel and increase or decrease the voltage, amperage and frequency of the electricity flowing to the stator coils.

Example Implementations—Linear Motor/Generator/Transmission (LMGT)

Referring generally to FIGS. 39 through 55, various embodiments of LMGT systems are described. In prior art permanent magnet electric motors and generators, the magnetic field of the rotor is not adjustable, but is instead fixed. In the case of prior art permanent magnet linear motors, the magnetic field of the "carriage" is fixed and is not adjustable. As a result, most prior art motors and generators are designed for a specific speed and torque with a very narrow range of optimum efficiency. In the case of linear motors, often intended for use in transportation with the occurrence of frequent stopping and starting and widely variable speed and pull, is it is a challenge to design a linear motor using prior art technologies without incurring a significant loss of efficiency as the parameters of speed and pull vary from the designed optimum. The high pull requirements of a linear motor moving large heavy objects employ the use of powerful permanent magnets which in turn create a large back EMF that is typically overcome with high voltage and amperage. When motor speed and torque are constant, prior art motors or generators can be designed for optimum efficiency at the designed speed and torque. Many times, this efficiency is above 90%. Thus, in the manufacturer of these prior art motors, the stator core windings and permanent magnets are selected to act together in the most efficient manner possible to produce the selected design torque, rpm and volt, amp ratios at an optimum or threshold efficiency or in the case of the linear motor the selected design linear carriage speed and pull and volt amp ratios. Once these key components are selected and placed in the prior art motor, generator or linear motor, they cannot be changed. Only the power and speed of the driving force in a prior art generator and the volts and amperage of electricity into a prior art motor can be changed. When the prior art motor, generator or linear motor is put in service where the speed and torque vary widely, such as for example in land vehicles or wind powered generators, the back EMF of the fixed magnets have to be overcome when the speed and torque or pull requirements deviate from the design values for these parameters. When these prior art systems are not operating at the selected design parameters, the overall efficiency of the prior motor or generator dramatically drops in many cases to as low as 20% for example in rapid transit vehicle, automobiles or wind powered generators and the like.

An electric LMGT system is disclosed that is capable of operating with high efficiency wide volt and amperage operating ranges and extremely variable pull force and speed conditions. The LMGT system produces a variable range of pull force, speed and magnetic braking (regeneration) possibilities to more efficiently meet the specifications of a linear motor transportation or conveyance system. The LMGT system can dynamically change the output size of the linear motor/generator by varying the magnetic field induced in the stator by switching multiple non-twisted parallel coil wires in the stator between being connected in all series, all parallel or combinations thereof and correspondingly varying, adjusting or focusing the magnetic field of the permanent magnets acting on the stator by modularly engaging, partially engaging or disengaging magnet bars as power demands increase or decrease. This is particularly true when two or more carriages are connected to a single platform, container or rapid transit car (vehicle). For example acting in concert, the magnetic bars of first and second carriages of a vehicle can provide power to get the vehicle moving during start up and when the vehicle is running along the guideway at a desired speed, the magnet bars of the first carriage may be focused to provide optimum power to maintain the desired speed while the magnet bars of the second carriage may be disengaged from the stator thereby substantially reducing the total amount of electricity used to maintain the desired speed of the vehicle. This is not possible under prior art systems since the magnets of the second carriage would be passing over the stator coils generating electricity and considerable drag or back EMF.

As previously discussed herein, in prior art permanent magnet electric motors and generators, the magnetic field of a rotor is not adjustable but fixed. While it is true that the magnetic field of a permanent magnet is fixed, it is the alternating flow of magnetic flux between the permanent magnets of the rotor and the cores of the stator and the alternating flow of electricity in the wires of the stator core that determine how a permanent magnet motor or generator will operate. Where there is a small amount of magnetic flux flowing between the rotor magnets and the stator core, the system operates as if the rotor of the motor/generator was fitted with small or lower strength permanent magnets. If the amount of magnetic flux flowing between the rotor magnets and the stator core is large, the reverse is true. When small permanent magnets are used in the rotor of a motor, the wires in the stator core coils are appropriately sized with the requisite number of turns to produce a magnetic field in the stator teeth (or cores) that will efficiently react with the magnetic field of the rotor magnets to produce the optimum (or nearly optimum) flux flow or interaction between them and optimum (or nearly optimum) torque or rpm. In the case of a generator, the wires are sized with the requisite number of turns to efficiently accommodate the electricity generated by the alternating flux induced in the stator cores by the permanent magnets on the rotating rotor and will in many cases be different from the wires of the motor even when the permanent magnets are the same size. When large permanent magnets are used in the rotor, the same is true in that the wires of the stator core in both the motor and generator are appropriately sized with the requisite number of turns. The wires and number of amp turns in the large permanent magnet motor/generator is different from the wires and number of turns in the small permanent magnet motor/generator, and the output size of the two motor/generators is dynamically different.

Figure 39:
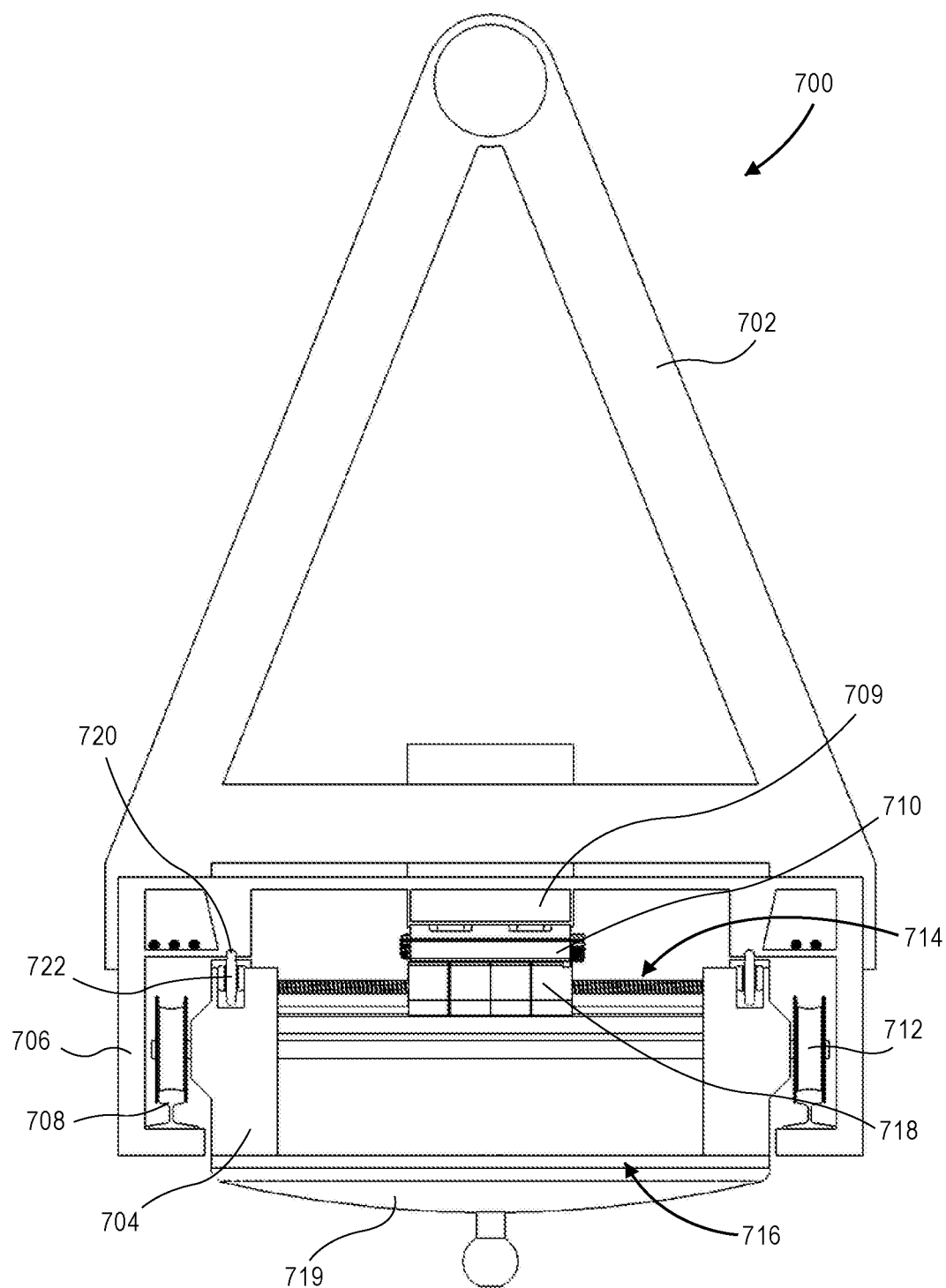
FIG. 39 is a cross-sectional view of an embodiment of an LMGT system.
Figure 40:
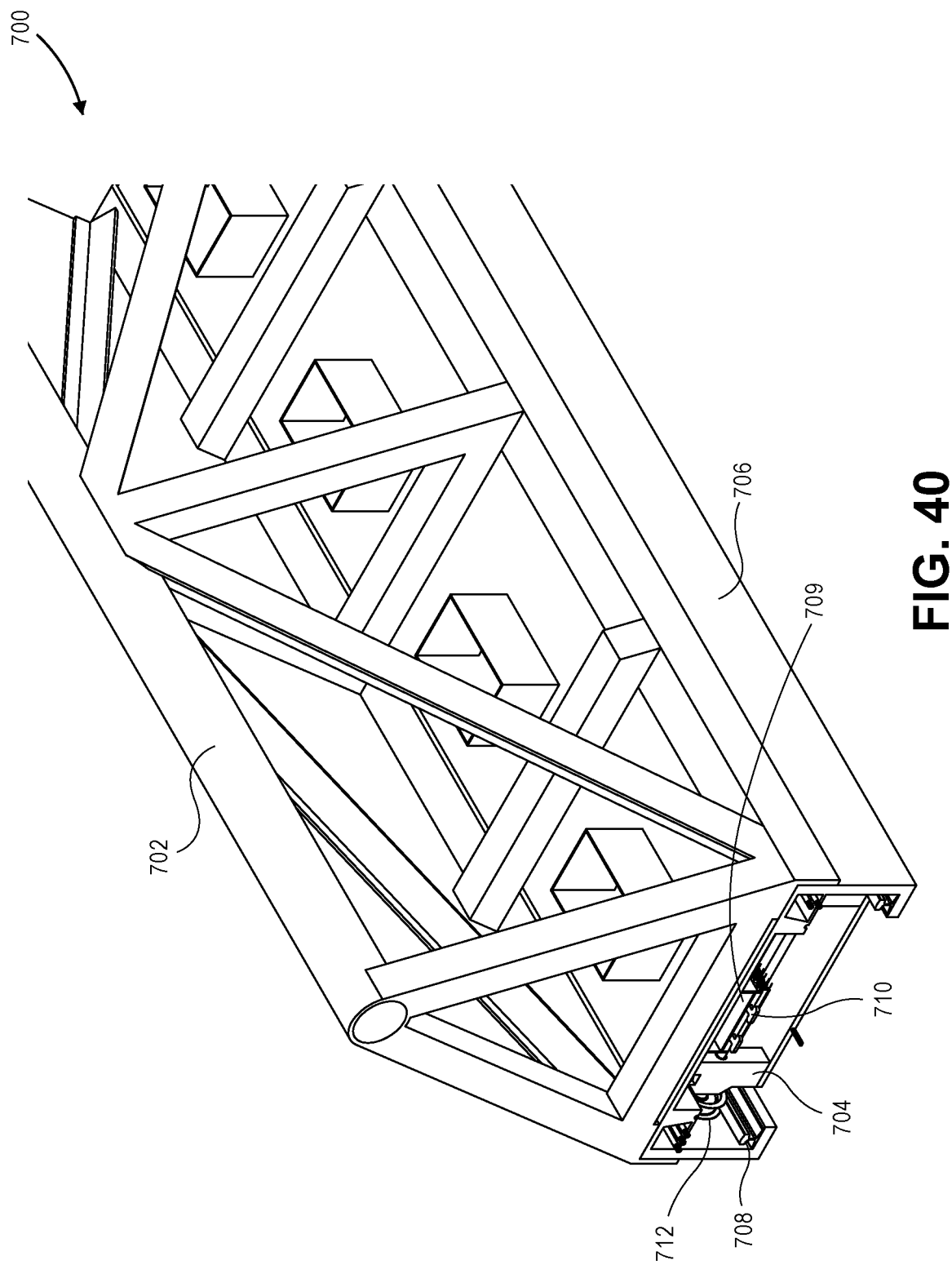
FIG. 40 is a perspective view of an embodiment of an LMGT system.

Referring to FIG. 39 and FIG. 40, an embodiment of the LMGT system 700 is shown. FIG. 39 illustrates a cross-sectional view of the LMGT system 700 and FIG. 40 illustrates a perspective view of the LMGT system 700. In an embodiment, the LMGT system 700 includes a support structure 702 and one or more carriages 704. In an embodiment the support structure 702 is coupled to a guideway 706. In an embodiment, the guideway 706 is suspended beneath the support structure 702. In an embodiment, the guideway 706 is attached to the support structure 702 at the corners of the guideway 706. In alternative embodiments, the guideway 706 may be attached to the support structure 702 via other areas of the guideway 706.

The guideway 706 includes a pair of guide rails 708 that run along a length of the guideway 706. The pair of guide rails 708 are generally parallel with respect to each other. The guideway 706 includes a stator assembly mount 709. A stator assembly 710 is coupled to the guideway 706 via the stator assembly mount 709. The mounted stator assembly 710 generally centered within the guideway 706 and runs along the length of the guideway 706.

The carriage 704 includes rail wheels 712. The rail wheels 712 of the carriage 704 ride on the guide rails 708 of the support structure 702 such that the guide rails 708 guide the movement of the carriage 704 along the length of the support structure 702. The carriage has a first side 714 and an opposing second side 716. The carriage 704 includes a magnet bar assembly 718 that runs along the length of the first side 714 of the carriage 704 and a load attachment plate 719 that is disposed the second side 716 of the carriage 704. While a single carriage 704 has been described, the LGMT system 700 may include multiple carriages 704 that are combined into a single vehicle.

In an embodiment, the guideway 706 includes safety wheel guides 720 that run along the length of the guideway 706. In an embodiment, the guideway 706 includes a pair of safety wheel guides 720 that are generally parallel with respect to each other. The carriage includes safety wheels 722. The safety wheel guides 720 guide the safety wheels 722 of the carriage 704 of the guideway 706 to prevent contact of the magnet bar assembly 718 with the stator assembly 710.

Figure 41:
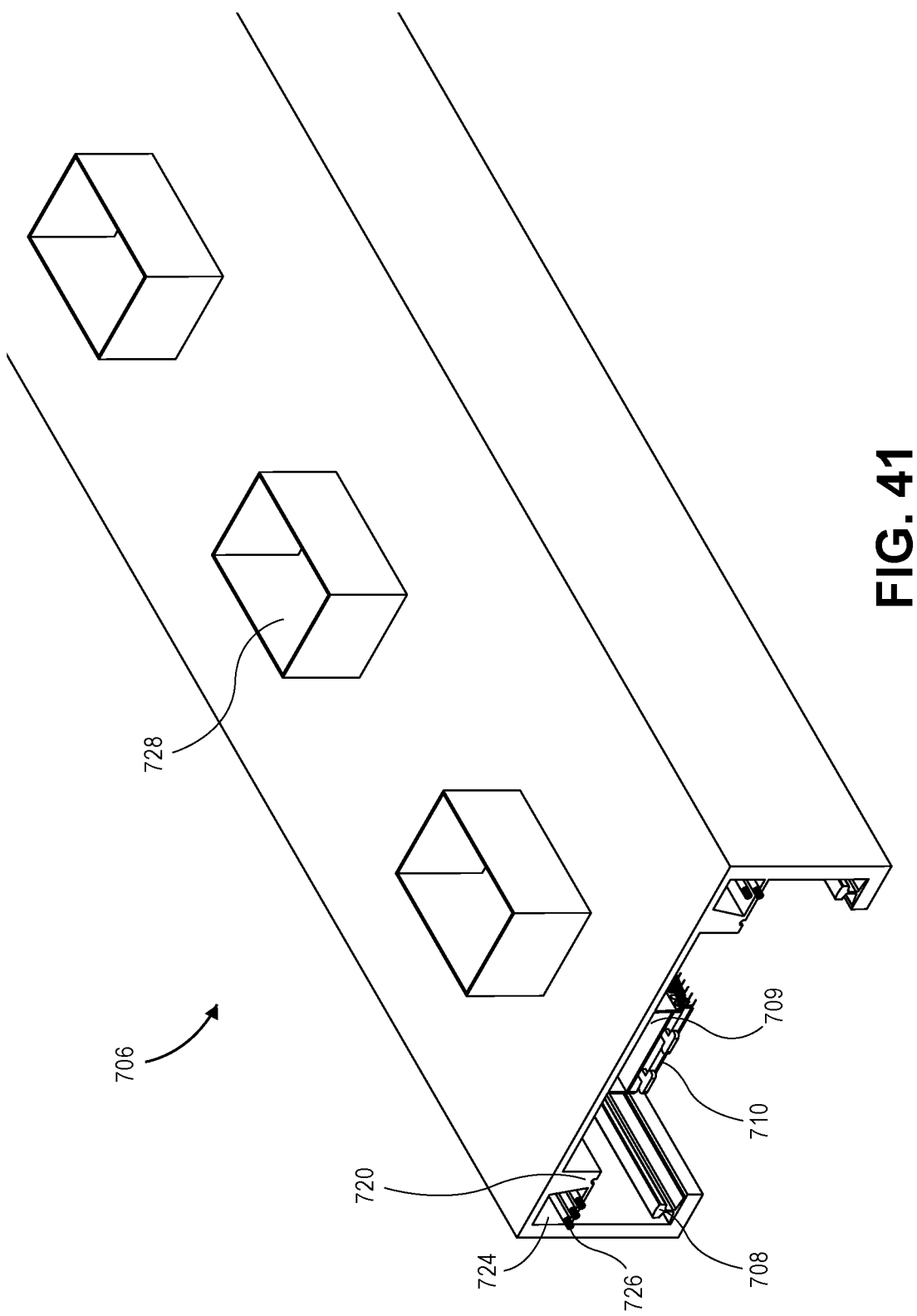
FIG. 41 is a perspective view of an example of a guideway of an embodiment of an LMGT system.
Figure 42:
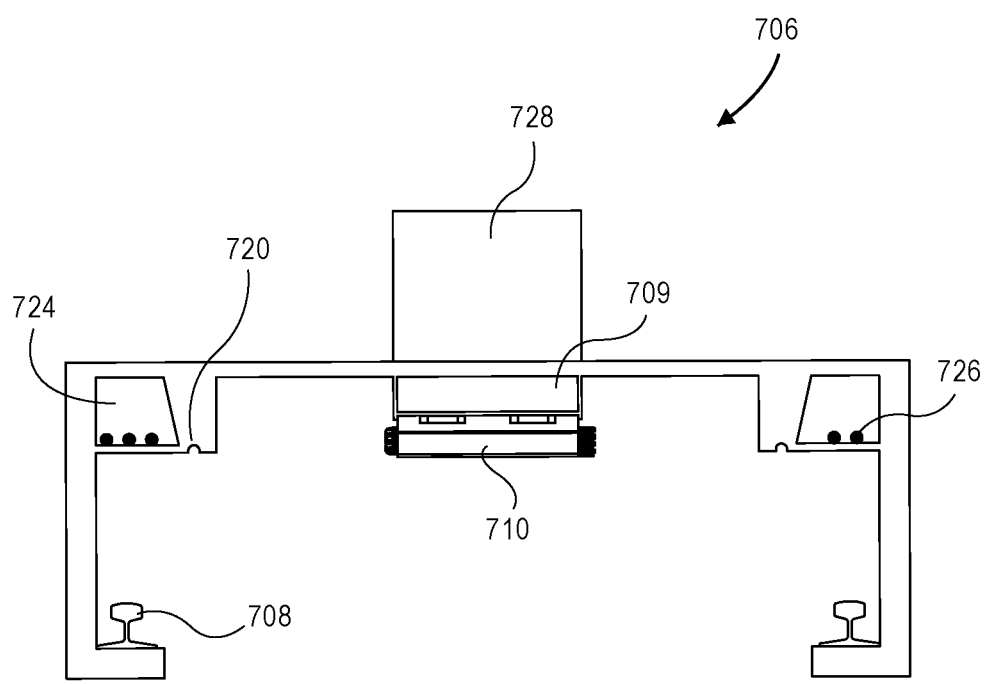
FIG. 42 is a cross-sectional view of an example of a guideway of an embodiment of a LMGT system.
Figure 43:
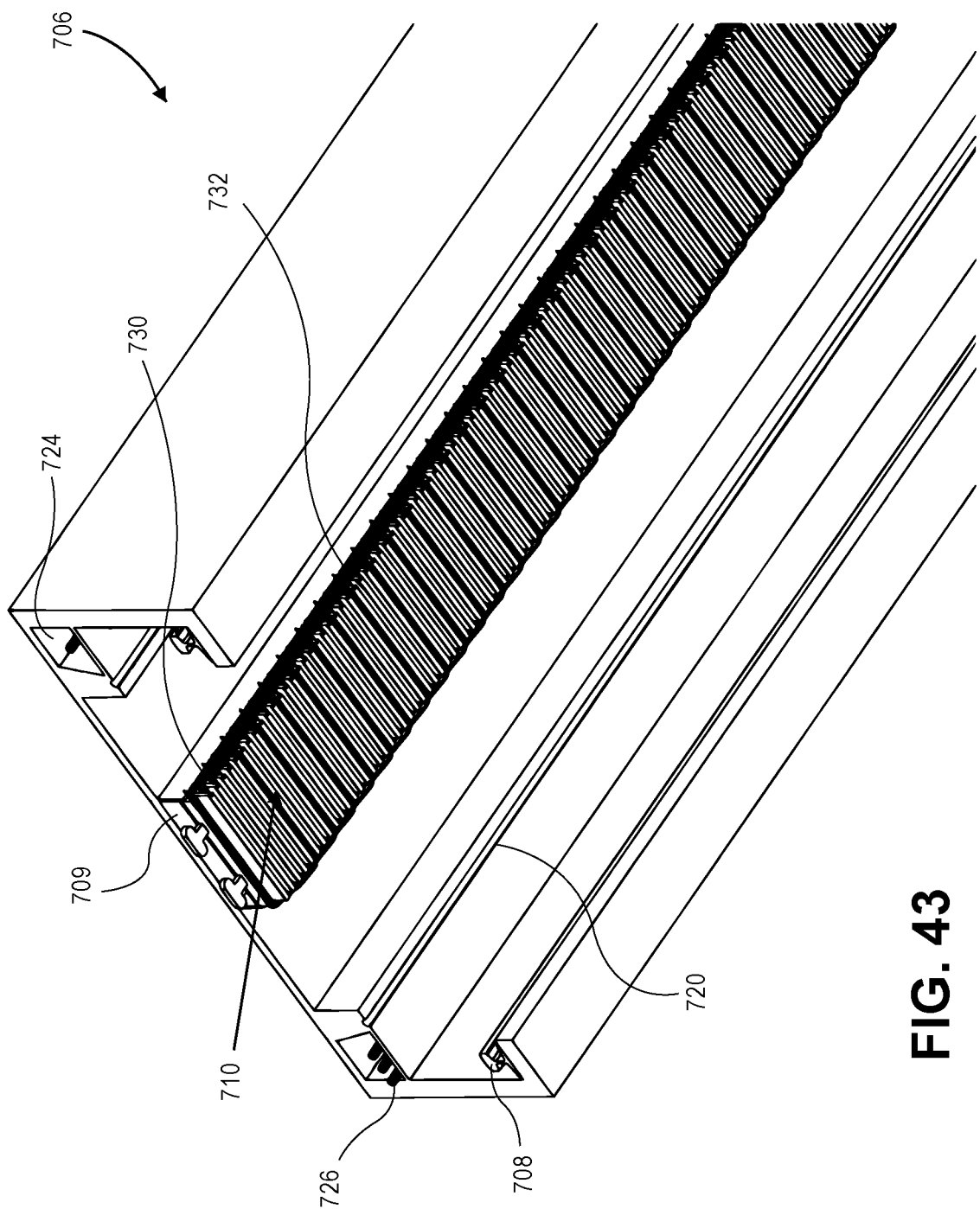
FIG. 43 is a perspective view of an underside of an example of a guideway of an embodiment of an LMGT system.

Referring to FIG. 41, FIG. 42, and FIG. 43, an embodiment of a guideway 706 of an LMGT system 700 is shown. FIG. 41 illustrates a perspective view of the top guideway 706. FIG. 42 depicts a cross-sectional view of the guideway 706. As mentioned above, the guideway 706 includes guide rails 708 that run along the length of the guideway 706 and the stator assembly mount 709. The stator assembly 710 is mounted to the guideway 706 via the stator assembly mount 709. In an embodiment, the guideway 706 includes a pair of safety wheel guides 720 that run along the length of the guideway 706.

The guideway 706 includes at least one power cable raceway 724 that runs along the length of the guideway 706. In an embodiment, a pair of power cable raceways 724 are disposed on either ends of the guideway 706 and are generally parallel with respect to each other. Power cables 726 are disposed within the power cable raceways 724. In alternative embodiments, the guideway 706 may include a fewer or greater number of power cable raceways 724. In alternative embodiments, the power cable raceways 724 may have alternative configurations within the guideway 706.

In an embodiment, a plurality of junction boxes 728 are disposed on a top surface of the guideway 706. The plurality of junction boxes 728 are disposed in a spaced apart relationship with respect to each along the length of the guideway 706. In alternative embodiments, the junction boxes 728 may be disposed at different locations and in alternative configurations on the guideway 706.

FIG. 43 depicts a perspective view of the bottom of the guideway 706 with the stator assembly 710 mounted onto the guideway 706. The stator assembly 710 is mounted onto the guideway 706 via the stator assembly mount 709. The stator assembly 710 includes a plurality of stator cores 730 and stator coils 732.

In an embodiment, the LMGT system is inverted such that the guideway is disposed above a support structure. The support structure includes legs and braces that are coupled to the corners of the guideway and extend downward towards the ground. In an embodiment, the LMGT system includes a guideway that is directedly supported by the ground without a support system. In an embodiment, the guideway is flanked on one or both sides by a transportation platform. In an embodiment the junction boxes are mounted adjacent the guideway. In an embodiment, the junction boxes are buried.

In an embodiment, the guideway 706, including stator cores 730, stator coils 732, power cables 726, guide rails 708, and junction boxes 728 is manufactured in prefabricated sections for quick connection to support structure 702. In an embodiment, guideway 706 is manufactures in approximately forty-foot long guideway sections. Multiple guideway sections may be connected to form a complete guideway 706.

Figure 44:
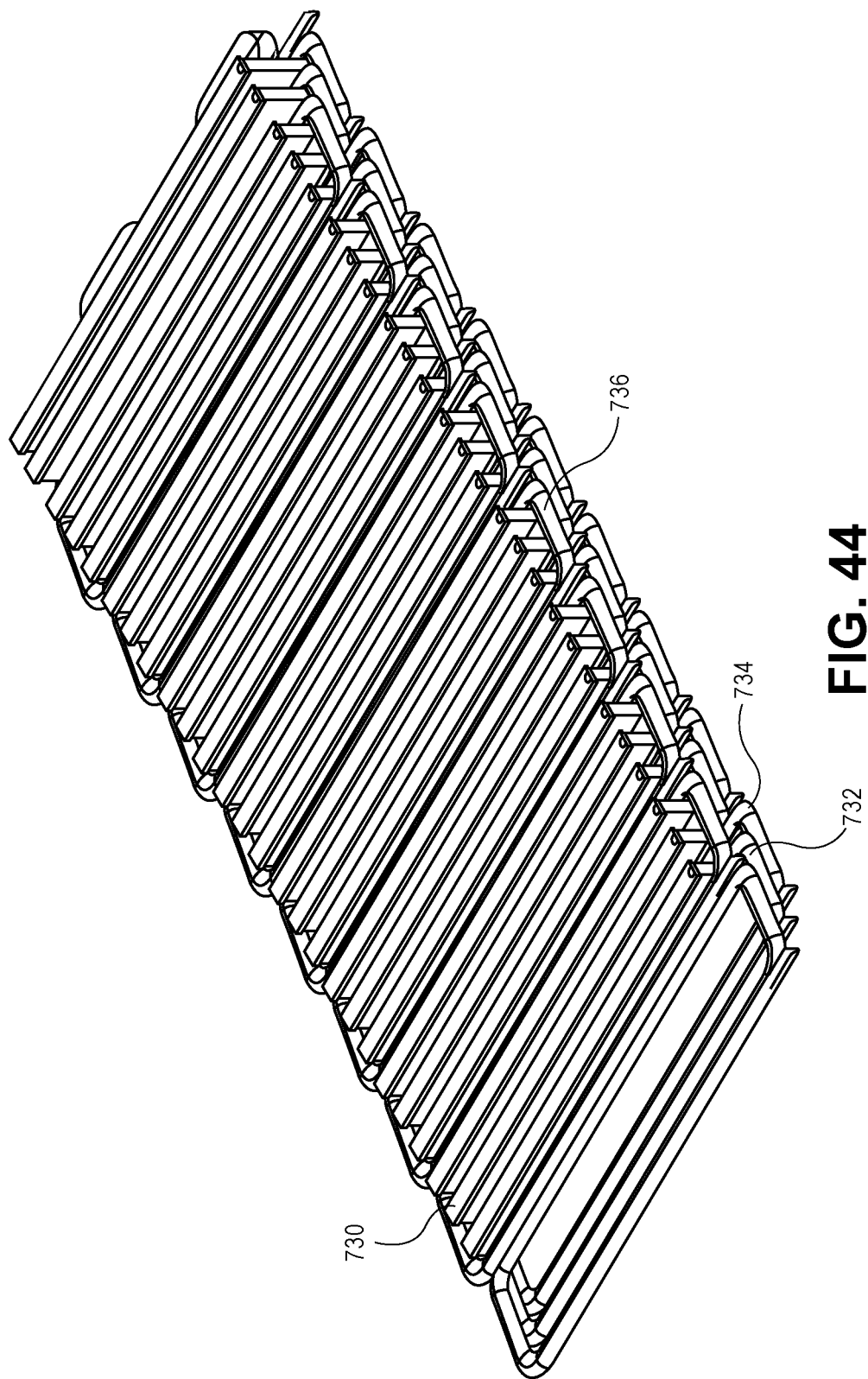
FIG. 44 is a perspective view an example of a stator assembly of an embodiment of an LMGT system.

Referring to FIG. 44, a perspective view of an example of a stator assembly 710 for use in an embodiment of the LMGT system 700 is shown. The stator assembly 710 includes a stator core 730 and a plurality of stator coils 732. The ends of the wire 734 of each stator coil 732 is electrically coupled to one or more components within a junction box 728. The stator assembly 710 includes a plurality of Hall effect sensors 736. A Hall effect sensor 736 is disposed at an end of each segment of the stator core 730 associated with a stator coil 732. The each of the Hall effect sensors 736 are electrically coupled to one or more components within a junction box 728. In an embodiment, each of the stator coils 732 is mounted in a stator slot, cut in laminated soft iron, perpendicular to the centerline of the guideway 706 throughout the length of the guideway 706.

Figure 45:
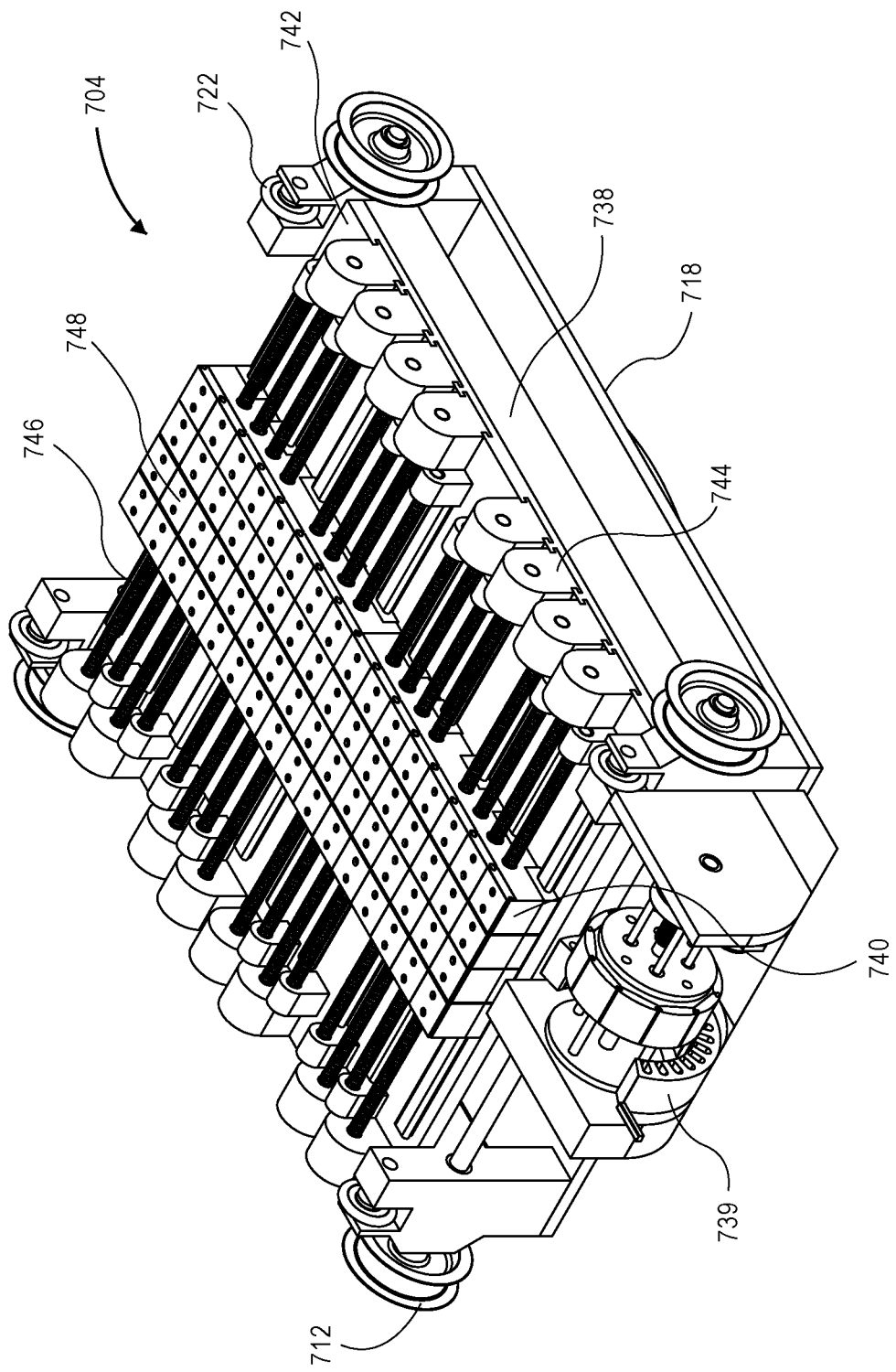
FIG. 45 is a perspective view of an underside of an example of a carriage of an embodiment of an LMGT system.

Referring to FIG. 45 a perspective view of an underside of an embodiment of a carriage 704 is shown. The carriage 704 includes a carriage frame 738. Rail wheels 712 are mounted on either side of the carriage frame 738. In an embodiment, a pair of rail wheels 712 are mounted on either side of the carriage frame 738. The rail wheels 712 run on parallel guide rails 708 that are integral to the guideway 706. Safety wheels 722 are mounted on either side of the carriage frame 738 adjacent the rail wheels 712. In an embodiment, a pair of safety wheels 722 are mounted on either side of the carriage frame 738. The safety wheels 722 run on parallel safety wheels guides 720 that are integral to the guideway 708. The load attachment plate 718 is disposed on the opposing side of the carriage 704. The carriage 704 includes a secondary power unit 739.

The carriage frame 738 supports the magnet bar assembly 718. In an embodiment, the magnet bar assembly 718 includes two or more magnet bars 740, a lateral slide plate 742, lateral drive units 744, and threaded actuator rods 746. The lateral drive units 744 translate each of the magnet bars 740 using the threaded actuator rods 746 towards a centerline of the carriage 704 and towards the outer edges of the carriage 704. In an embodiment, the lateral drive unit 744 includes a stepper motor.

Each magnet bar 740 includes two or more magnets 748 that are affixed end to end over the length of each magnet bar 740 with their respective North and South Poles alternatively facing away from the bar surface on which they are mounted. The magnet bars 740 are mounted parallel to one another on the surface of the carriage 704 such that their length is in the direction of carriage travel along the guideway 706. The North and South Pole surface of the magnet bars 740 face away from the carriage 704. Like pole magnets on each magnet bar 740 are adjacent to each other.

While the magnet bars 740 are fixed in the direction of carriage travel, the magnet bars 740 are slidably affixed to the carriage frame 738 on either side of the centerline of the carriage frame 738 so that magnet bars 740 may be moved or translated towards the centerline and next to each other or away from the centerline and each other. In changing the distance between the like pole magnets 748 on each magnet bar 740, the combined magnetic field generated by the magnets 748 is correspondingly changed. In some embodiments, the LMGT system 700 may include multiple magnet bars 740 in the same longitudinal alignment with each other, for example two sets of four magnet bars 740 across, one set of magnet bars 740 ahead of the other on the carriage 704, where one or all the magnet bars 740 may be engaged with the stator cores 730 at any one time.

Figure 46:
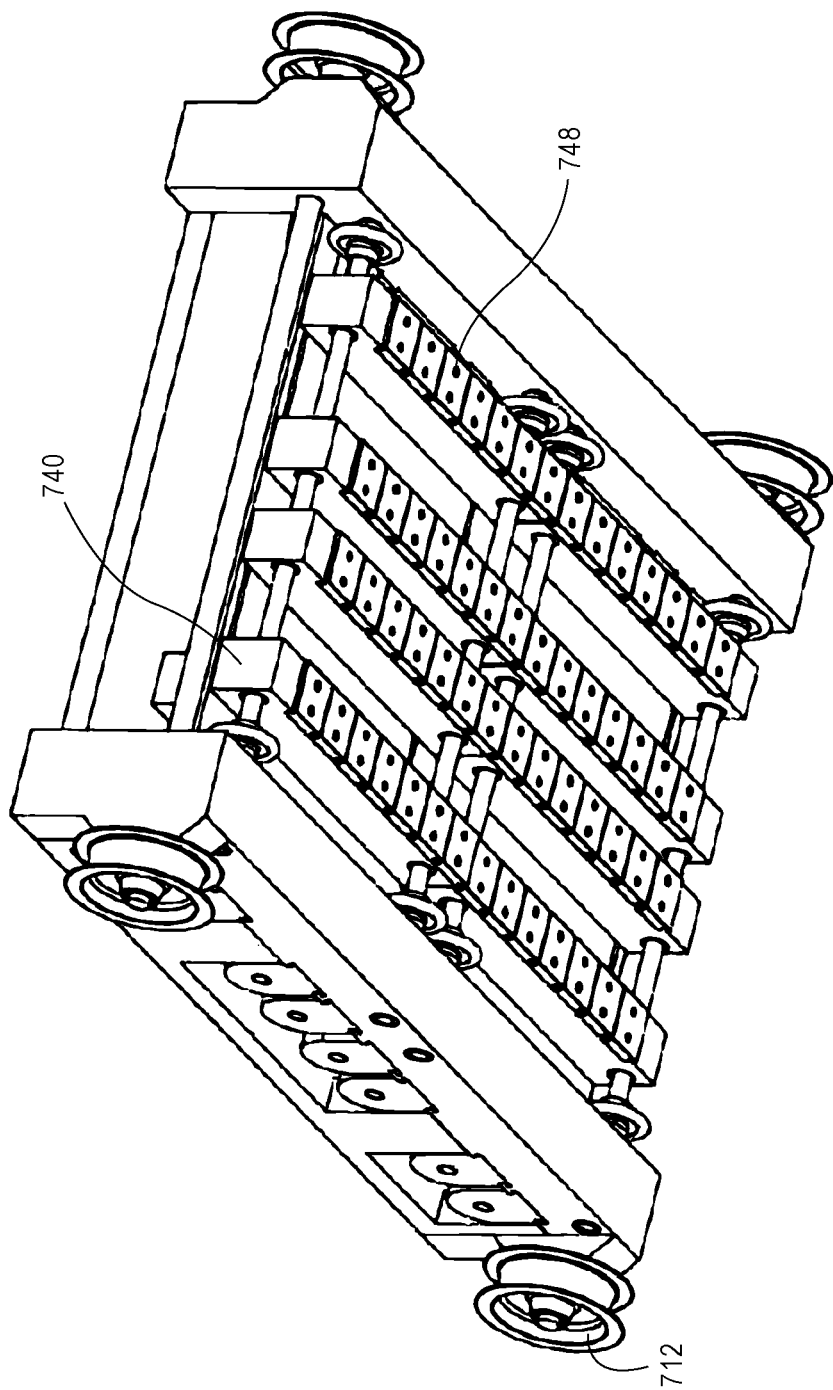
FIG. 46 is a perspective view of an underside of an example of a carriage of an embodiment of an LMGT system.

Referring to FIG. 46 a perspective view of the underside of an embodiment of a carriage 704 is shown. In an embodiment, the magnet bars 740 are segmented or divided into two sections along their length providing eight possible combinations of full engagement of the magnet bars 740 with the stator cores 730 and stator coils 732 and eight instances of varying partial engagement to provide a wide range of magnetic field power to the carriage 704.

Figure 47:
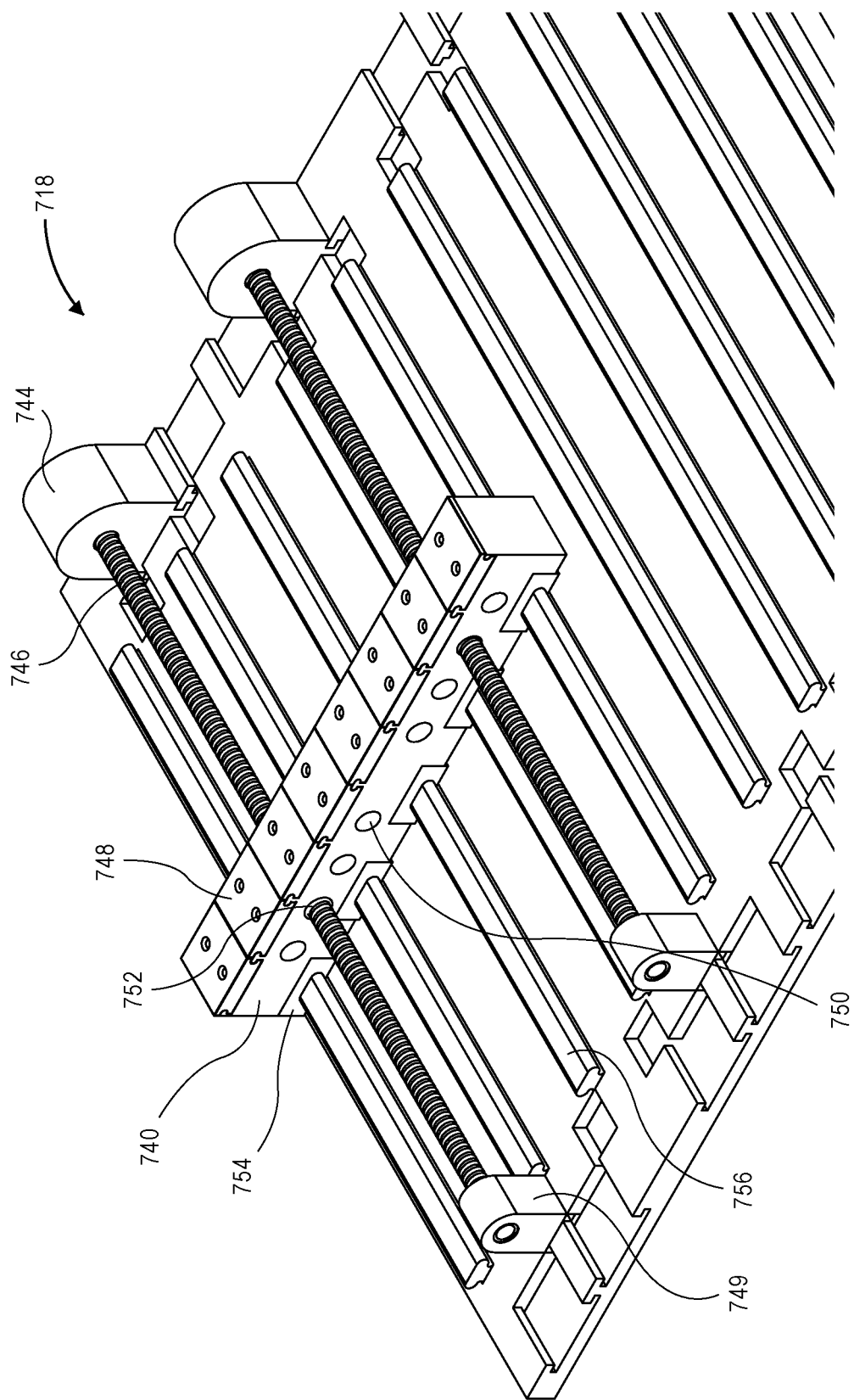
FIG. 47 is a perspective view of an embodiment of the magnet bar assembly for an individual magnet bar 740.

Referring to FIG. 47, a perspective view of an embodiment of the magnet bar assembly 718 for an individual magnet bar 740 is shown. The magnet bar 740 includes surface mounted magnets 748 alternating north and south poles. As mentioned above, the lateral drive unit 744 translates the magnet bars 740 using the threaded actuator rods 746 towards and away from a centerline of the carriage 704.

In an embodiment, each threaded actuator rod 746 has a first end coupled to a lateral drive unit 714 and a second end supported by an end actuator rod bearing block 749. Each of the magnet bars 740 has a plurality of actuator rod clearance holes 750 and actuator rod nuts 752 to receive the threaded actuator rods 746 and to provide lateral motion to the magnet bars 740 as the threaded actuator rods 746 are turned by the stepper motors in the lateral drive units 744. Linear slide bearings 754 encompassing the linear slideways 756 provide for precision movement of the magnet bars 740 towards and away from the centerline of the carriage 704 while maintaining precise control over vertical and horizontal positions of the magnet bars 740 relative to the carriage 704.

Figure 48:
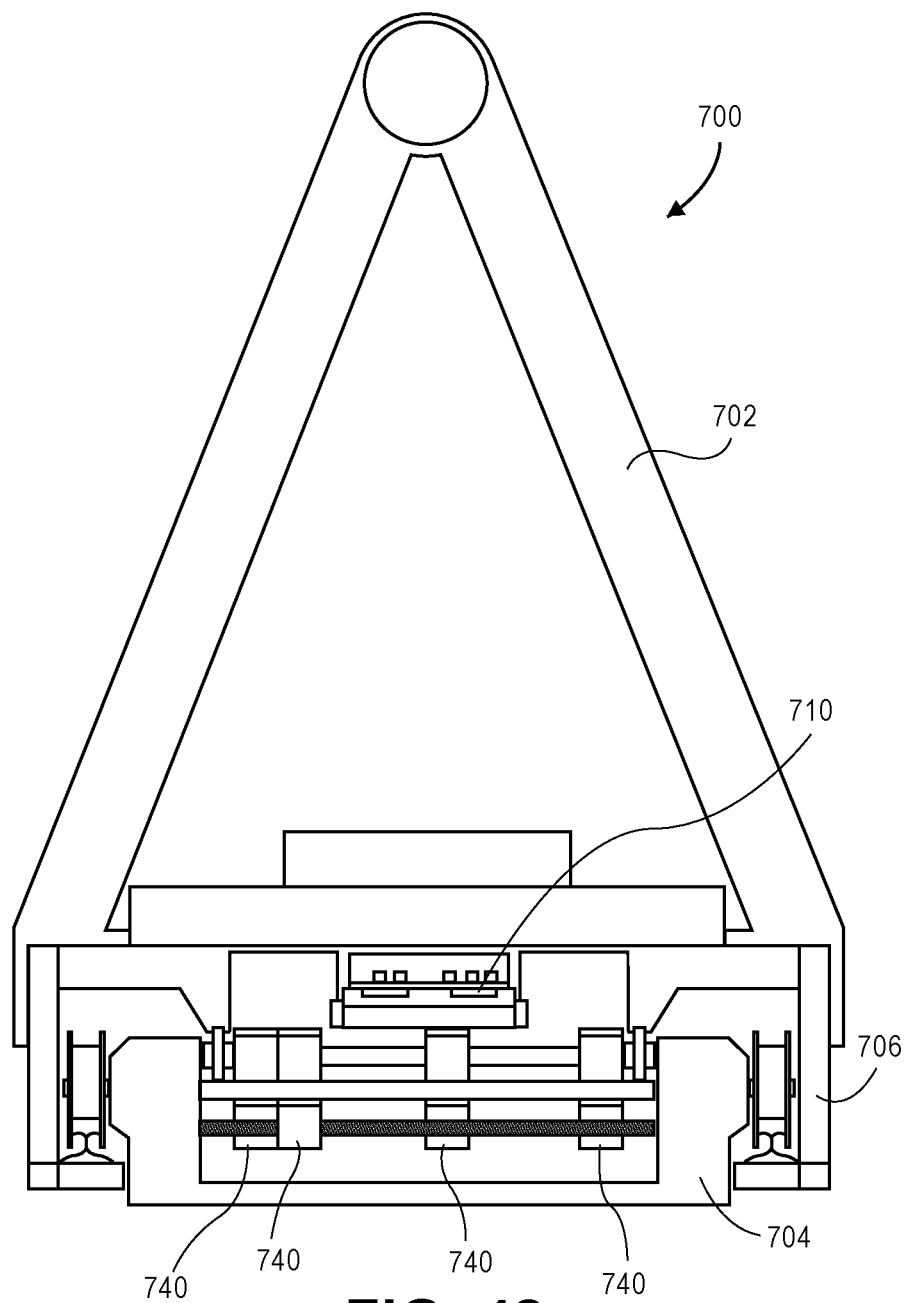
FIG. 48 is a cross-sectional view of an embodiment of the LMGT system illustrating one of the magnet bars of the carriage engaged with the stator assembly of the guideway.

Referring to FIG. 48 a cross-sectional view of an embodiment of the LMGT system 700 illustrating one of the magnet bars 740 of the carriage 704 engaged with the stator assembly 710 of the guideway 706 is shown. The magnet bar 740 has been moved towards the centerline of the carriage 704 such that the magnet bar 740 has a maximum (or near maximum) magnetic effect on the stator cores 730 and stator coils 732 of the stator assembly 710.

Figure 49:
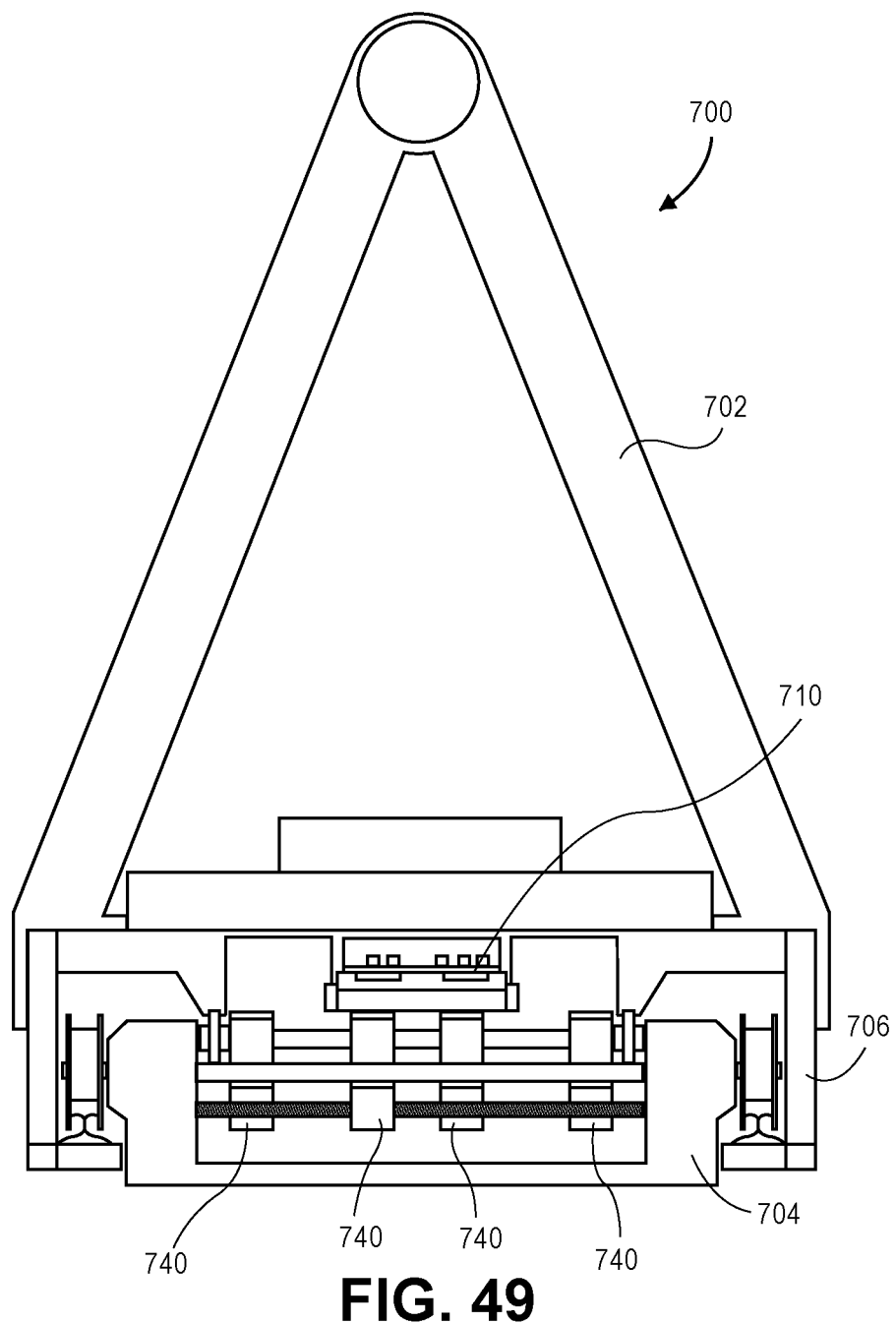
FIG. 49 is a cross-sectional view of an embodiment of the LMGT system illustrating two magnet bars of the carriage engaged with the stator assembly of the guideway.

Referring to FIG. 49 a cross-sectional view of an embodiment of the LMGT system 700 illustrating two of the magnet bars 740 of the carriage 704 engaged with the stator assembly 710 of the guideway 706 is shown. The two magnet bars 740 have been moved towards the centerline of the carriage 704 such that the two magnet bars 740 have a maximum (or near maximum) magnetic effect on the stator cores 730 and stator coils 732 of the stator assembly 710.

Figure 50:
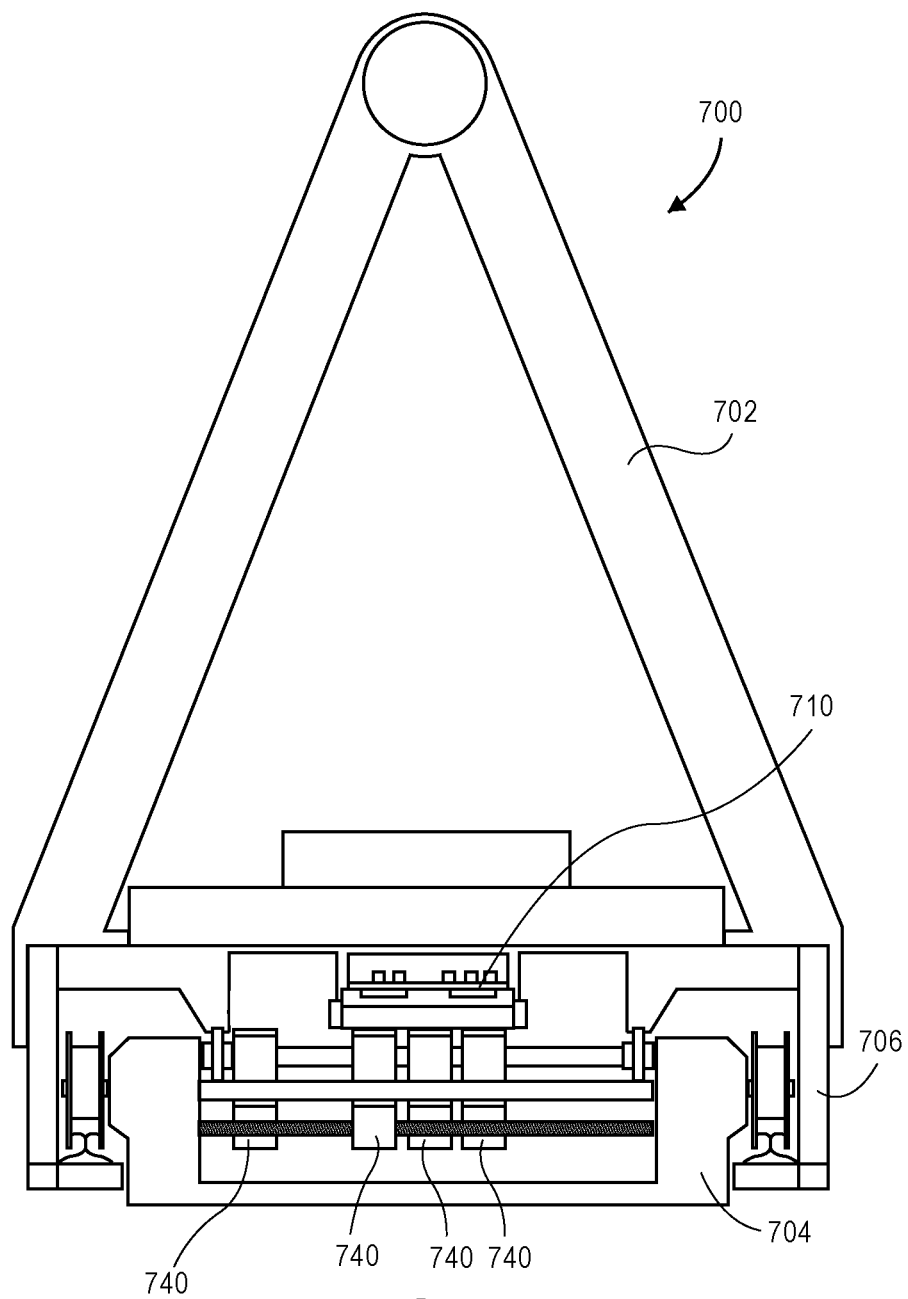
FIG. 50 is a cross-sectional view of an embodiment of the LMGT system illustrating three magnet bars of the carriage engaged with the stator assembly of the guideway.

Referring to FIG. 50 a cross-sectional view of an embodiment of the LMGT system 700 illustrating three of the magnet bars 740 of the carriage 704 engaged with the stator assembly 710 of the guideway 706 is shown. The three magnet bars 740 have been moved towards the centerline of the carriage 704 such that the three magnet bars 740 have a maximum (or near maximum) magnetic effect on the stator cores 730 and stator coils 732 of the stator assembly 710.

Figure 51:
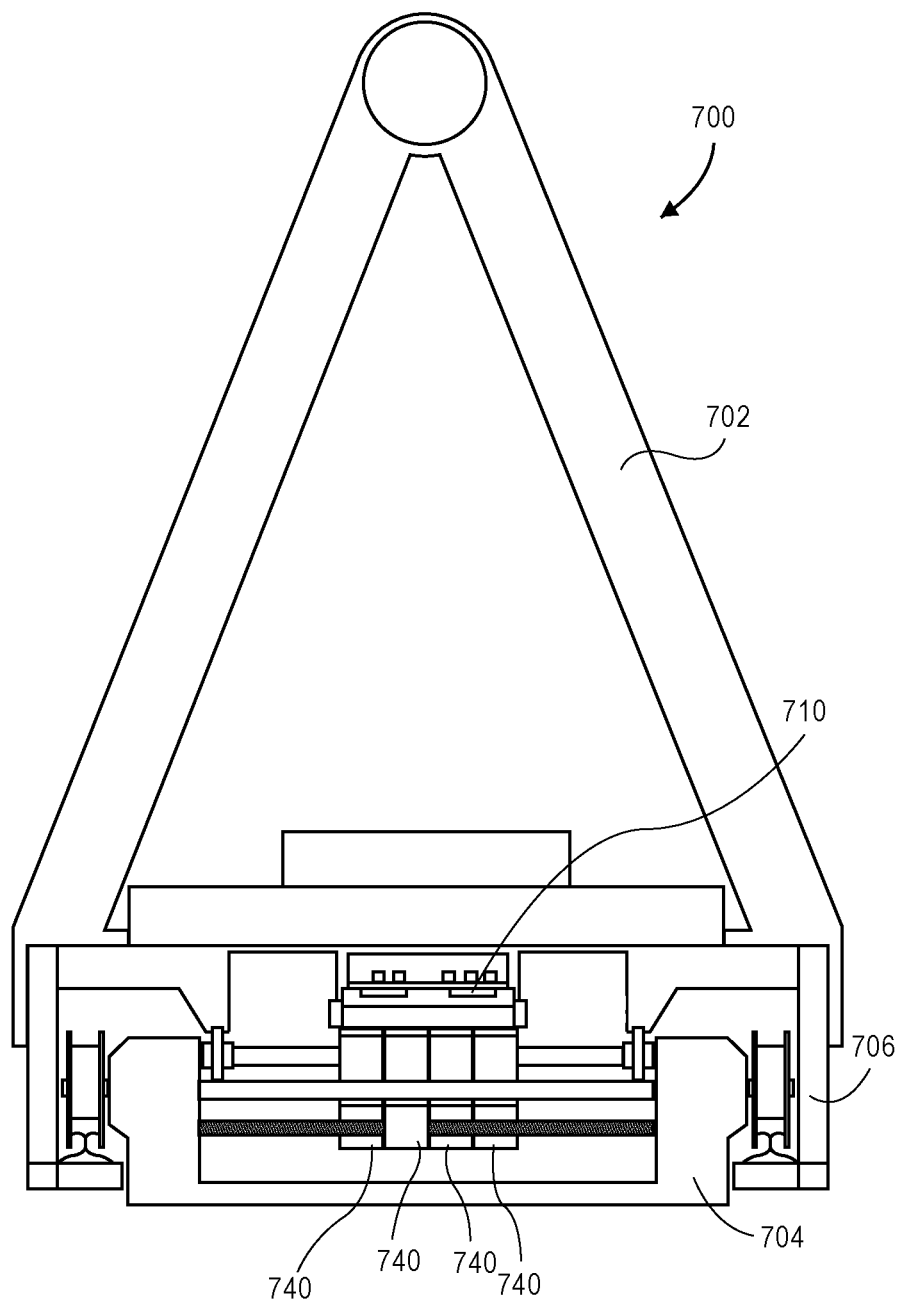
FIG. 51 is a cross-sectional view of an embodiment of the LMGT system illustrating four magnet bars of the carriage engaged with the stator assembly of the guideway.

Referring to FIG. 51 a cross-sectional view of an embodiment of the LMGT system 700 illustrating four of the magnet bars 740 of the carriage 704 engaged with the stator assembly 710 of the guideway 706 is shown. The four magnet bars 740 have been moved towards the centerline of the carriage 704 such that the four magnet bars 740 have a maximum (or near maximum) magnetic effect on the stator cores 730 and stator coils 732 of the stator assembly 710.

It is noted that that any single magnet bar 740, as it is moved while the carriage 704 is moving along the guideway 706 towards the edge of the stator cores 730 and stator coils 732, will first engage the outer loop of the stator coils 732 where electricity will begin to flow in the stator coils 732 and increase as the magnet bar 740 is translated towards the edge of the stator cores 730. The flow of electricity in the stator coils 732 will continue to increase until the magnet bar 740 is fully engaged or completely under the stator cores 730 and stator coils 732.

This flow of electricity in the stator coils 732 creates an opposing magnetic field with respect to the movement of the carriage 704. This opposing magnetic field, known as back EMF, increases with the speed of the carriage 704 along the guideway 706. The back EMF is overcome by increasing the flow of electricity into the stator coils 732 in the opposite direction from the outside power source. The higher the speed of the carriage 704, the greater the amount power used to overcome the back EMF.

Even when coasting, power is used to maintain the speed of the carriage 704 or gradually reduce the speed of the carriage 704 to overcome the back EMF. Large systems carrying heavy weight often use large magnets and a large power application at start up to overcome inertial forces. These large magnets may become a detriment for very fast systems once the vehicle is at its intended speed and only needs enough power to maintain that speed. This is particularly true in magnetic levitation (Mag Lev) systems where friction and rolling resistance is greatly reduced. The LMGT system 700 disclosed herein can balance and/or focus and control the amount of magnetic force needed to overcome inertial forces on startup and then to reduce the back EMF at speed, but then rapidly increase the amount of back EMF for magnetic breaking purposes, which in some instances may require more magnet bars 740 than would be necessary for normal operations. In some implementations, where the system is configured as a Mag Lev system, the rail wheels 712 on each side of the carriage 704 are replaced with Mag Lev pods (e.g., at least one on each side).

Each of the stator coils 732 is mounted in a stator slot, cut in laminated soft iron, perpendicular to the centerline of the guideway 706 throughout the length of the guideway 706 and directly above the surface of the magnet bar assembly 718 as the carriage 704 moves along the guideway 706. The surface of the stator cores 730 between the stator slots is separated from the surface of the magnet bar assembly 718 by a small gap. The transverse centerline of the stator coils 732 is directly above the centerline of the carriage frame 738. The stator slots and respective stator cores 730 are equal to or slightly longer than the combined width of the total number of magnet bars 740 in the magnet bar assembly 718, such that when the magnet bars 740 are together in the center of the carriage 704 the magnet bars 740 are directly under the stator cores 730 and where in some instances to allow for space between the magnet bars 740 for magnetic field adjustment the magnet bars 740 may be slightly separated and still remain under the stator cores 730. Stator coils 732 may be mounted in slots in the stator cores 730 such that the stator coil loop extends slightly beyond the end of the stator core material on each side of the stator cores 730, providing a different magnetic field strength when the magnets bars 740 are positioned, partially or fully over the stator coil ends than when fully over the stator cores themselves. The stator coil wiring can include two or more non-twisted wires that through a switching system may be connected in series, in parallel or a combination thereof. The individual coils in a phase may be connected to each other in series within a group of two or more coils connected to the power source or combinations of series and parallel connected to the power source whereby the resistance within each group of coils may be effectively changed through computer-controlled switches.

In some embodiments, the LMGT system 700 can be implemented with expanded stator cores/stator coils and magnets 748 in a variation of the base configuration to allow for economical high speed long distance travel. For example, the LMGT system 700 can be implemented with standard stator cores and coils, spacing, size and wiring as described herein, where such spacing and size is designed to meet expected widely varying conditions. Beginning with the predetermined spacing, size and wiring to meet standard conditions and transitioning from congested urban area travel to long distance high speed travel, the stator coil size may be increased, and wiring size changed, including in certain situations the elimination of the core material. The changing of the stator coil size and wiring is done gradually by changing the stator coils 732 in the stator track one coil at a time until the desired size is achieved, not, in this example, to exceed twice its original length. The change in stator coil size may require that the magnets 748 be correspondingly changed to match the varying stator coils size changes. This is accomplished by limiting the number of magnet bars 740 in the longitudinal direction on the carriage 704 to one, but still allowing multiple parallel sets of magnet bars 740 that can be moved together under the stator cores 730 or laterally separated removing one magnet set at a time from under the stator cores 730 on each side of the linear stator. Each magnet bar 740 is then equipped with a linear motion device to gradually increase the longitudinal distance between the magnets 748 on each magnet bar 740. The magnet bars 740 are coordinated in sets of two so that the center of the space between the north and south magnets 748 on the first magnet bar 740 is directly adjacent to the center of the magnet 748 on the next adjacent magnet bar 740. Thus, when looking down or directly at the face of the magnets 748 when fully extended on their respective magnet bars 740 and as the carriage 704 crosses an imaginary line across the guideway 706, the magnets 748 on the left and right magnet bar 740 cross the line as North Left, North Right, South Left, South Right, North Left, North Left etc. The length of the North and South Pole Magnets as seen by the stator have effectively been increased to up to twice their original length to match the changed length of the stator coils 732. Sensors are placed on each stator coil 732 so that a sensing device on the carriage 704 can measure the distance between the stator coils 732 and make the adjustments in the distance between the magnets 748 on each magnet bar 740 as the distance changes along the guideway 706. Complimenting this feature is the continued ability to engage additional magnet bar 740 sets for increased or decreased power and further change the wiring configuration of the stator windings between all wires in series, parallel or combinations thereof.

The LMGT system 700 has an output that can be dynamically changed with more efficient performance over a predefined range than previously possible under the current state of the art. The alternating flux of the permanent magnets flowing from the linear magnet bar magnets 748 to the stator cores 730 can be adjusted with several different techniques. For example, the alternative flux can be adjusted by varying the alignment of the linear magnet bar magnets 748 where the flux from the linear magnet bar magnets 748 is partially to varying degrees engaged with the coil end loops and the stator cores 730. In another example, the alternative flux can be adjusted by utilizing two linear magnet bars 740, one on either side of the center plane of the stator, where the alternating north and south magnetic poles of the magnets 748 on the linear magnet bar 740 are in the same linear position relative to one another (directly across from one another-transverse to the direction of carriage travel). The distance from the center plane of the stator to the center plane of the magnet bars 740 can be varied. The polar magnetic fields from the magnets 748 on the two linear magnet bars 740 oppose one another, where the combined polar magnetic field between the two rotors is deflected, twisted or focused into the stator cores 730 creating a greater flux field or flow into the stator cores 730 than would be available from the sum of the two magnet bars 740 and their respective magnets 748 acting alone. This field is adjusted by moving the magnet bars 740 closer to each other and the stator center plane or by moving the rotors further away from the stator center plane and each other. In another example, the alternative flux can be adjusted by utilizing more than two linear magnet bars 740 aligned in the same manner as the previous example. If an odd number of linear magnet bars 740 is used, the flux may be adjusted by placing one magnet bar 740 on the center plane and moving the two or more linear magnet bars 740 closer to each other and the center plane or further away from the center plane. If an even number of linear magnet bars 740 is used, the flux may be adjusted by moving the four or more linear magnet bars 740 closer to the center plane and each other or away from the center plane and each other. In another example, the alternative flux can be adjusted by a combination of the three above techniques where one or two of the outer most linear magnet bars 740 are partially engaged, to varying degrees, with the coil end loops and the stator cores 730. Utilizing any of these techniques to adjust the flow of magnetic flux between the stator and linear magnet bar magnets has the same or similar effect to being able to change the size of the permanent magnets of the LMGT system 700 at any time during its operation.

Changing the wiring and number of turns to modify the flux of a stator core 730 and the electricity flowing in a stator coil 732 is not as easy to adjust or vary as the flux flowing from the linear magnet bar permanent magnets. However, this disclosure provides several methods and configurations to achieve distinctly different volt/amp characteristics in the stator coils 732, where each stator core 730 can be configured for an optimized (or nearly optimized) flux flow between the linear magnet bars and the stator by adjusting the polar magnetic flux from the linear magnet bars 740 acting on the stator to improve efficiency. In some implementations, this can be accomplished by separating the multiphase stator wiring and providing multiple non-twisted parallel wires in the core windings for each phase leg (and in some cases with wires of different size) with the ability to switch and connect the multiple wires in all series, all parallel, and combinations of parallel and series configurations (e.g., as described herein with reference to FIGS. 7 through 15). In some implementations, one or more wires may be disconnected to provide additional wiring configurations (e.g. dropping from a six-wire configuration or a four-wire configuration, or the like). In some implementations, the system can provide two separate multi-phase wiring configurations with separate controllers on the same stator, and in some implementations separating the coils in each phase leg (including the multi-wires therein) so that any of the stator phases in either separate multi-phase configuration can be switched (e.g. using electronic switches) to be connected in series, in parallel, or in combinations thereof. In the stator coil wiring system, the coils themselves (including the multiple parallel non-twisted wires in each coil) are connected with switches to connect groups of three or more successive coils in a phase in series with each other and the groups connected within a control block connected in parallel. This can dramatically change the resistance within a group of coils and the amp-turn capacity of the individual coils.

In embodiments, the LMGT system 700 can also be adjusted by combining multiple LMGT carriage units 704 on one vehicle or transportation platform (one in front of the other on the same guideway 706 and stator) each having respective multiple linear magnet bar systems as herein described acting on the same stator in the same guideway 706 to vary the overall system output. For example, the LMGT carriage units 704 can be placed on the same vehicle under common control from a central processor where they may operate together for increased power or one can operate while the other is in neutral with its magnets 748 disengaged from the stator coils 732. The LMGT units may also be configured to shift back and forth between different series, parallel, or combinations thereof wiring configurations acting under the command of one or more controllers to provide smooth transitions between the various wiring combinations. Two or more carriages 704 on one vehicle can be implemented because of the ability to selectively activate the coils engaged with the first stator separately from the coils engaged with the second stator or to completely disengage the magnets 748 in the first or second carriage 704 from the guideway stator.

In embodiments of this disclosure, any single LMGT unit may have any or all of the combinations of multiple wiring and switching described herein, including switching multiple wire windings in series or parallel connected to each other in series. Where the LMGT unit/system is multi-pole, the individual coils of a phase winding may be connected in series or parallel or in sets of two or more coils in parallel connected to each other in series, providing a wide range of volt/amp and torque speed ratios in a single motor/generator that is electronically reconfigurable to meet widely varying conditions. This feature coupled with mechanical shifting of the magnet bars 740 to engage, partially engage (any one or two magnet bars) or disengage individual magnet bars 740 with the stator core 730 and stator coils 732, allows the computer system, by fine tuning the degree of engagement between the magnet bar magnets 748 and the stator coils 732, to adjust (e.g., increase or diminish) the strength of the magnetic field between the magnet bar magnets 748 and the stator to improve the power efficiency of the LMGT unit/system at nearly any speed and pull force. Smooth transition between one wiring configuration and another may be facilitated by employing two inverter/controllers each controlling, through computer input, alternating sets of coils in the stator acting on the magnet bar magnets 748. By making the switch from one wiring configuration to the other, first with the first controller and then with the second controller with corresponding adjustments in voltage, current and pulse width modulation a smooth transition may be had between the two wiring configurations eliminating potential jolts or jerks in the carriage travel.

The inverter/controller in the LMGT unit/system can regulate the incoming voltage which in turn regulates the amperage in the stator coil wires within the capacity of the wires and voltage source. The LMGT unit/system has the ability to switch between different wiring combinations with different resistance in each creating a different range of amperage turns in each wiring combination as the inverter/controller through the computer system increases the voltage in each wiring configuration from low to high. The different wiring configurations are then configured, combined and coordinated with voltage regulation so that the overall range of the amperage flowing in the stator coils can be uniformly regulated (e.g., increased or decreased) over a greater extended range as the computer system switches the wiring from on configuration to the next correspondingly changing the value of the amp turns in the stator coils 732 and resulting magnetic field strength. With the LMGT unit/system's ability to focus or control the magnetic field of the rotor magnets interacting with the stator coils 732 over a much larger range from low to high by the movement of the magnet bars 740 with respect to the stator, the computer system may be configured to make the position of the magnet bars 740 with respect to the stator a function of the amp turns in the stator coils 732 so that the magnet bars 740 are positioned to provide the optimum (or nearly optimum) efficiency or balance between the magnetic fields of the stator coils 732 and the magnet bar permanent magnets 748.

The LMGT system 700 can also be configured to apply magnetic braking and/or slowing of the carriage 704 from high speed to lower speed and the corresponding generation of electricity. The LMGT system 700 can be highly efficient as a generator. Braking may be performed by the LMGT as follows. (1) The computer system stops the flow of electricity into the stator coils 732. (2) The computer system adjusts or focuses the magnetic field acting on the stator cores 730 to produce back EMF (which in turn becomes drag or braking force to the movement of the carriage 704). This is accomplished by causing threaded rod actuator(s) 746 to move successive magnet bars 740 (if they are not already in position) to a position closer to or further from the centerline of the stator increasing, decreasing or focusing the magnetic field acting on the stator core 730 to produce the back EMF necessary to decelerate the carriage travel at a predetermined rate. (3) As the computer system stops the flow of electricity to the stator coils 732, the computer system can switch the connection of the stator coils 732 from the controller to an inverter connected to a DC line. The computer system may be configured to measure the flow of electricity from the stator coils 732 to the inverter with sensors and configured to switch the stator windings from series to parallel or the combinations thereof to handle the flow of electricity now being generated in the stator coils 732 by the passing of the magnetic field of the magnet bar magnets 748 over the stator coils 732 creating (back EMF) resistance or drag (braking force) to the forward movement of the carriage 704 along the guideway 706. (4) As the carriage 704 decelerates, the deceleration rate and the volts and amps of electricity flowing from the stator coils 732 are constantly monitored and magnetic field and coil wiring configurations are adjusted, first to maintain the necessary rate of deceleration and second to improve the flow of electricity from the breaking action of the LMGT. The magnetic field and wiring configuration are adjusted for breaking in the same manner as described herein for the LMGT operation as a Linear Motor. An advantage of this disclosure is the ability to adjust the magnetic field by engaging more or less magnets with the stator and in certain instances have a greater magnet capacity for breaking than would be necessary for motive power and then further adjust the voltage and amperage of the electricity flowing in the coils through the multiple possible parallel and series wiring combinations. If the breaking is an unexpected emergency and more electricity is potentially generated than the coils wires can handle, the magnetic field can be reduced, and standby mechanical brakes applied.

Figure 52:
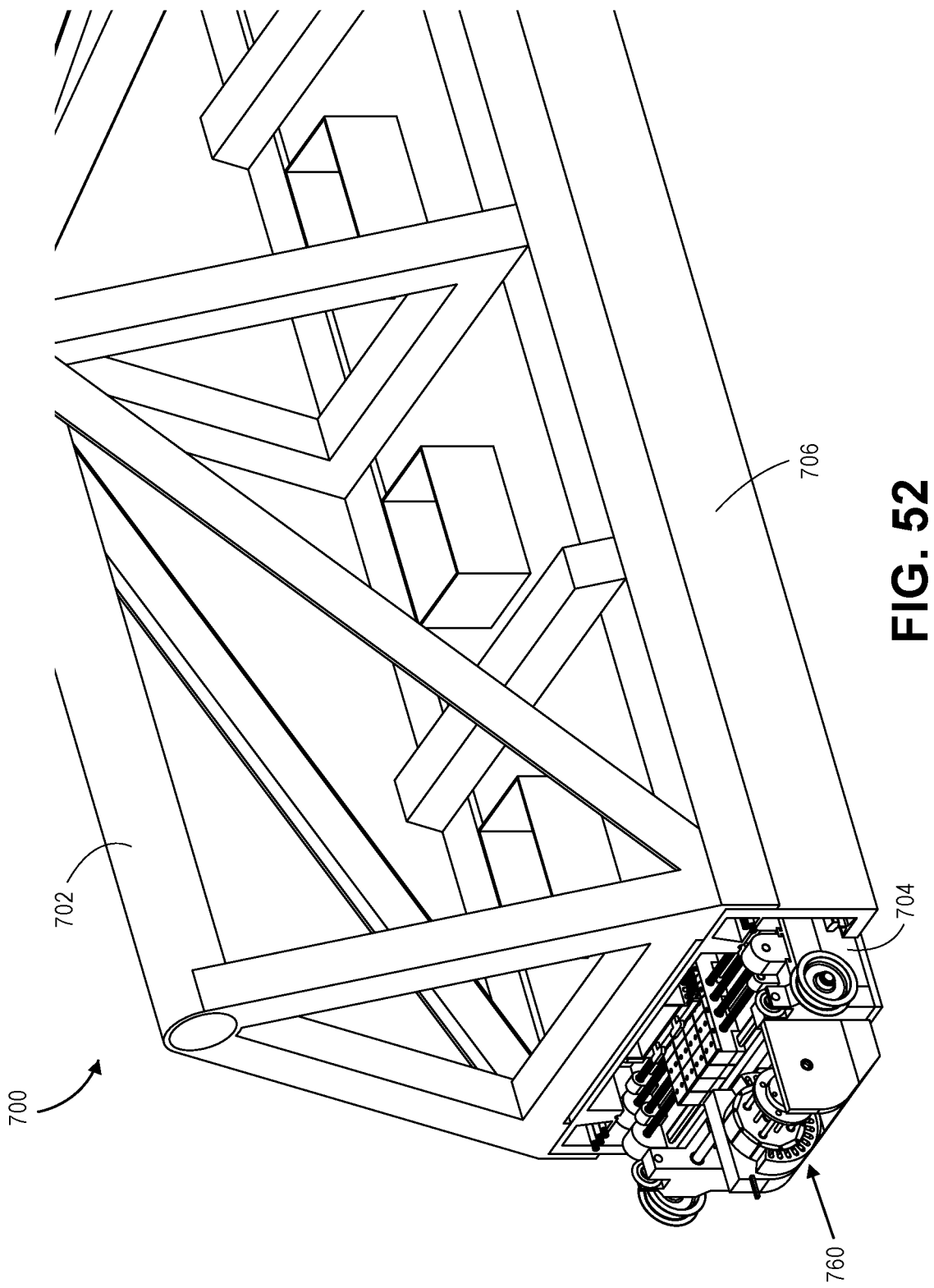
FIG. 52 is a perspective view of an embodiment of a LMGT system having a secondary power unit.
Figure 53:
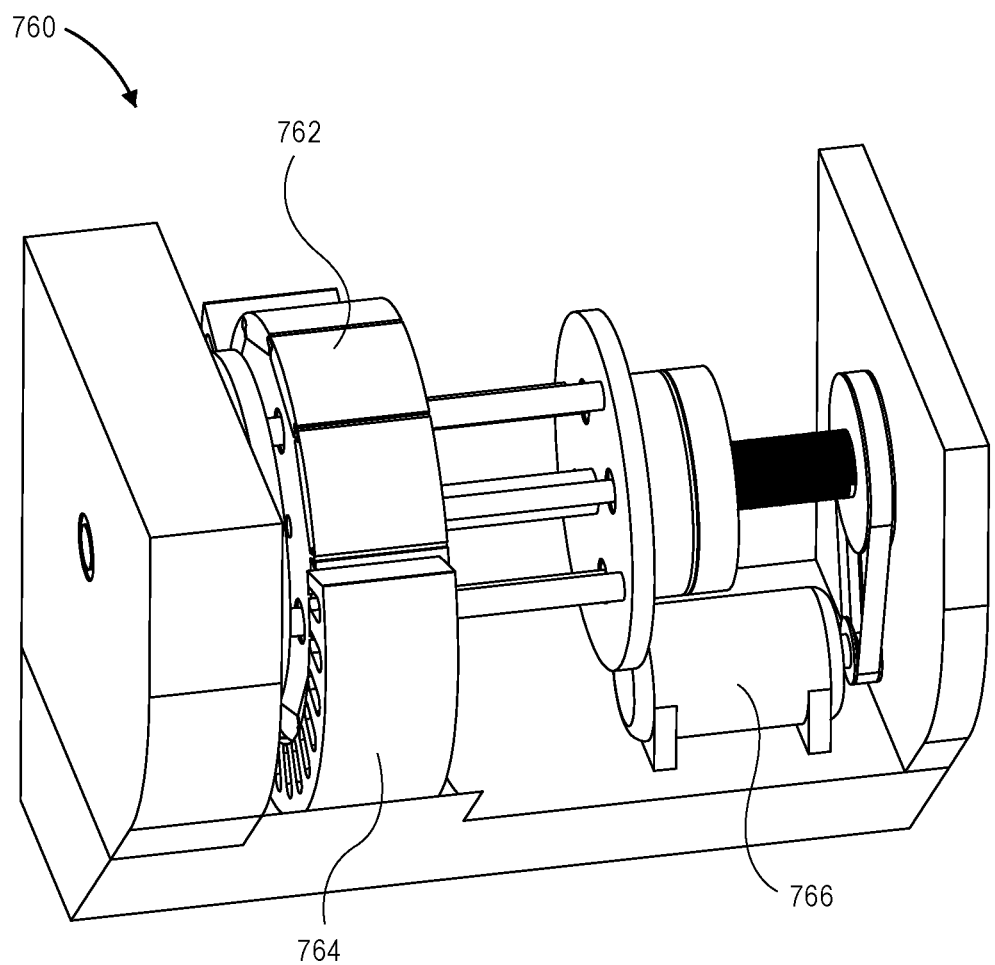
FIG. 53 is a perspective view of an example of a secondary power unit of an embodiment of a LMGT system.
Figure 54:
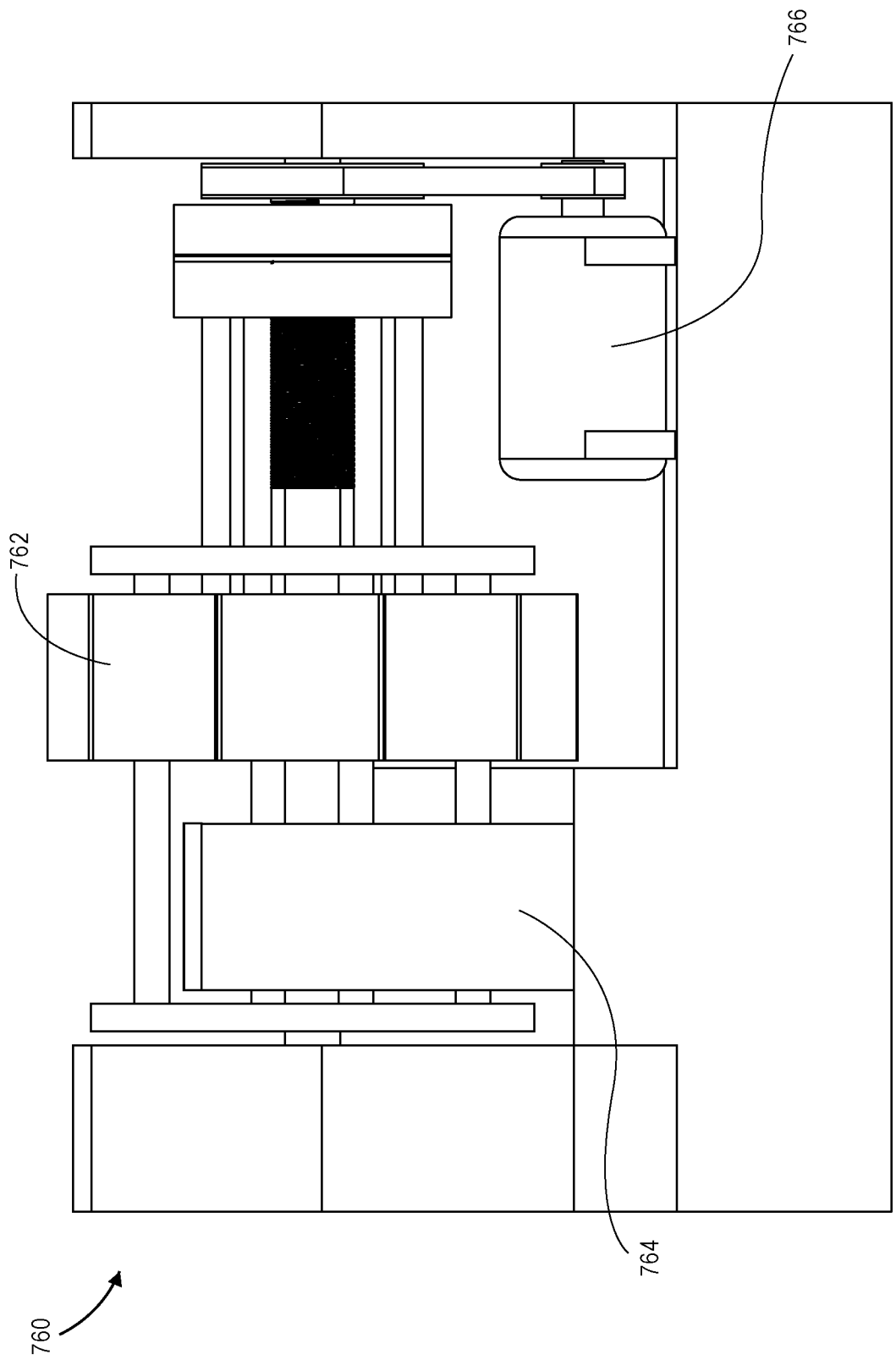
FIG. 54 is a side view of an example of a secondary power unit of an embodiment of a LMGT system.

FIG. 52 illustrates a perspective view of an embodiment of an LMGT system 700 having a secondary power unit 760. FIG. 53 depicts a perspective view of an example of a secondary power unit 760 of the LMGT system 700 illustrated in FIG. 52. FIG. 54 is a side view of the secondary power unit 760 of an LMGT system 700 illustrated in FIG. 52. The secondary power unit 760 includes rotor magnets 762, a linear stator 764, and a stepper motor 766

In an embodiment, the LMGT system 700 comprises an integral power generator (e.g., a secondary power unit 760) for supplying power to the lateral drive units 744 including stepper motors 766 and other devices on the carriage 704. For example, the LMGT system 700 can include or can be at least partially operable as a power generator including a rotor with rotor magnets 762 matched to the stator cores and stator coils of the system's linear stator 764 and positioned such that the outer surface of the rotor magnets 762 are tangent to the plane of the system stator cores separated by a small gap with its axis of rotation perpendicular to the direction of travel and mounted such that the full width of the rotor magnets 762 is completely under the outer edge of the system's linear stator 764. The generator rotor being partially encircled by a conventional rotary stator core and coils system but for only and approximately two thirds of its circumference, where, as the carriage 704 moves along the guideway 706, the generator rotor magnets react with the energized system stator coils causing the generator rotor to turn at a circumferential speed equal to the speed of travel of the carriage 704 in turn causing electricity to be generated in the generator's stator coils which in turn is converted to DC by conventional means and used to charge the batteries supplying electricity to the stepper motors 766 and controls in the carriage 704. The generator rotor is mounted such that it may be translated on its axel away from being fully under the center system core and coils to become partially or fully disengaged from the system stator and the generator stator 764 as necessary to accommodate the power requirements of the carriage 704. The generator, other than its inter-relationship with the system stator and the generator stator 764 at the same time, is consistent with U.S. Pat. Nos. 9,479,037; 9,748,886 and 9,819,296 in whole or in part including wiring and control systems related thereto. U.S. Pat. Nos. 9,479,037; 9,748,886 and 9,819,296 are incorporated herein by reference in their entirety.

This disclosure also provides an ancillary feature for use on high speed long distance transit lines such as may be encountered with a magnetic levitation system. The LMGT system 700 in such cases may be identical or very similar to that described herein where it is operating in areas with short distances between frequent stops except that its magnet bars 740 may not be segmented in the longitudinal direction (as described in some embodiments) and the individual magnets 748 are mounted on each magnet bar 740 so that they can be translated in the longitudinal direction (e.g., using a linear motion device) so as to be in the conventional close contact with one another longitudinally with alternating north and south pole magnets facing towards the stator. Where the guideway 706 extends to areas involving long distances between stops and very high speed is required, the stator magnet coils 732 are gradually increased in length to the point where they are twice as long as in the short distance mode and remain at that length until nearing the next stop point where they are gradually shortened in length back to the short distance mode. The magnet bars 740 with the longitudinally translatable magnets 748 are mounted on the slide table 742 so that they can be moved towards the centerline of the stator and engaged with the stator coils 732 or away from the centerline of the table and partially or totally disengaged with the stator coils 732 in the same manner as previously described herein. The magnets bars 740 with the longitudinally translatable magnets 748 are arranged in pairs. The linear motion device on each magnet bar 740 is such that on command from the computer system the magnets 748 on each magnet bar 748 may be separated from each other in increments up to the length of each magnet 748 so that the north magnets 748 of the center most magnet bar 740 are one magnet length ahead of the north magnets 748 on the outer most magnet bar 740 such that the forward end of the outermost magnets 748 are at equal distance longitudinally in the carriage 704 with the rear end of the center most magnets 748. The south magnets 748 can be arranged in the same manner so that as the carriage 704 moves along the guideway 706 the magnets 748 in the pair of magnet bars 740 cross a transverse line across the guideway 706 in the following order: north center, north outer, south center, south outer, north center, north outer, south center, south outer, etc., for as many magnets 748 as there are mounted on each magnet bar 740. This arrangement effectively lengthens the magnets 748 on the carriage 704 to match the length of the coils in the highspeed portion of the guideway 706 effectively doubling the distance of travel with each alternating current change, doubling the speed of travel. The distance between each coil is determined from the signals from the Hall effect sensors to the computer system which in turn causes the linear motion device on each magnet bar 740 to increase the longitudinal distance between the magnets 748 on the magnet bars 740 to equal the distance between the stator coils 732, increasing the distance between the magnets 748 as the distance between the stator coils 732 increases and decreasing the distance between the magnets 748 as the distance between the stator coils 732 decreases.

Figure 55:
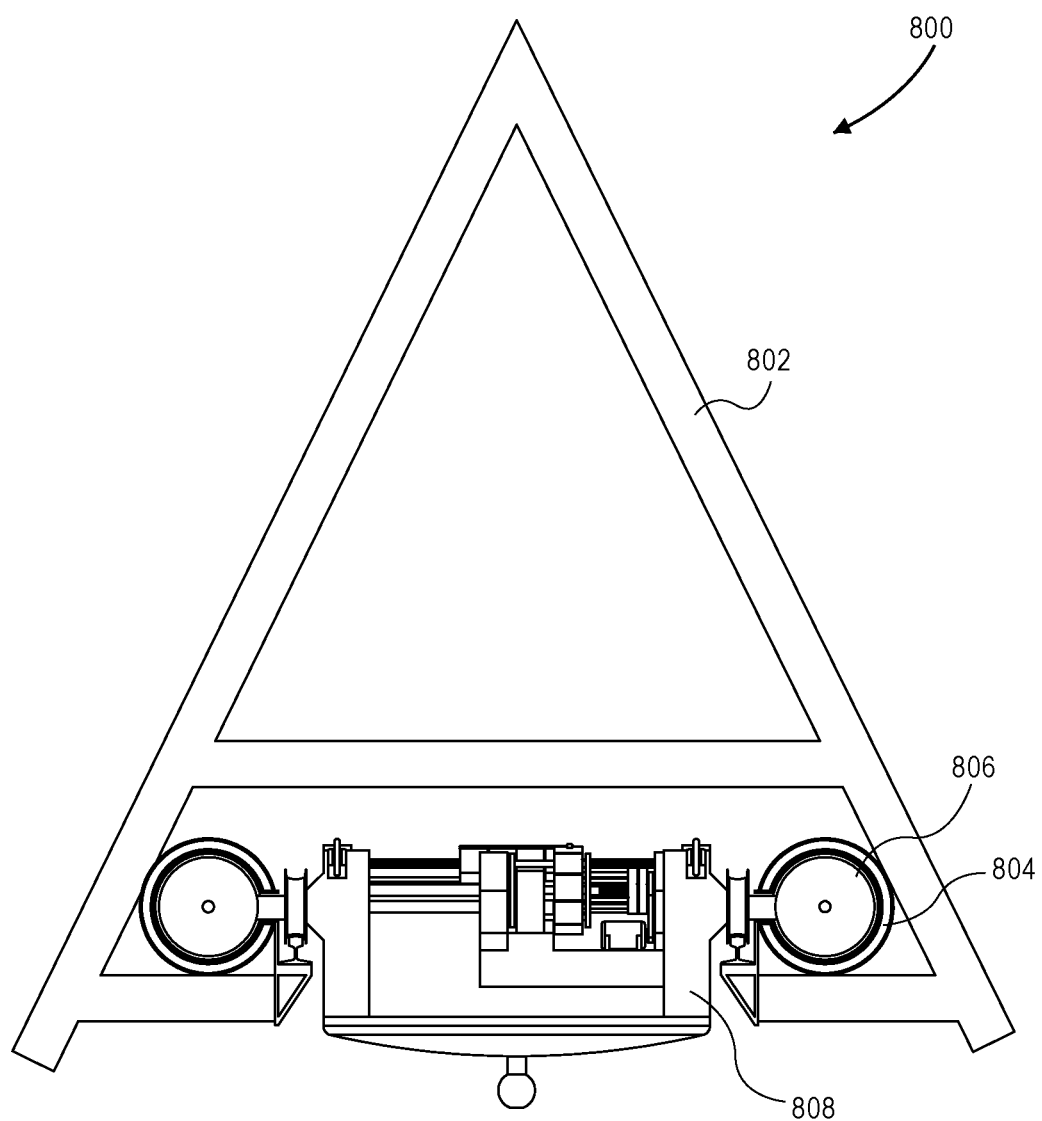
FIG. 55 is an end view of an embodiment of a LMGT system.

FIG. 55 is an end view of an embodiment of a LMGT system 800. The LMGT system 800 includes a support structure 802, induction coils 804 and Halbach ring arrays 806 disposed at sides of the carriage 808.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A linear motor/generator/transmission (LMGT) system, comprising:
   a guideway including guide rails;
   a carriage configured to travel along the guideway in a first direction;
   a plurality of stator cores and coils disposed along the length of the guideway, each phase of the plurality of stator coils including sets of at least three coils;

a respective set of parallel non-twisted wires with electronic switches for connecting the parallel non-twisted wires of each phase of the three or more stator coils all in series, all in parallel, or in a combination of series and parallel;

a plurality of linear slideways disposed on the carriage and extending in a second direction at least substantially perpendicular to the first direction; and at least two magnet bars adjacent to each other in the second direction, each one of the at least two magnet bars with alternating pole magnets, each successive magnet of each magnet bar mounted in front of the other in the first direction, wherein each of the at least two magnet bars have a plurality of linear slide bearings, the plurality of linear slide bearings disposed on a side opposite to the alternating pole magnets and engaged with the plurality of linear slideways, the at least two magnet bars sliding parallel to and on either side of a longitudinal centerline of the carriage guided by the plurality of linear slideways such that, when adjacent to the centerline and each other, the at least two magnet bars are positioned over the stator coils and configured to be slidably translated away from each other and away from the center line of the carriage to a position where the at least two magnet bars are not over the stator coils.

2. The LMGT system of claim 1, where the carriage comprises a carriage frame supported by rail wheels mounted on either side of the carriage frame, and where said rail wheels run on the guide rails of the guideway.

3. The LMGT system of claim 2, wherein the carriage frame supports two or more magnet bars on which two or more magnets are affixed end to end over the length of each magnet bar with their respective North and South Poles alternatively facing away from the bar surface on which they are mounted.

4. The LMGT system of claim 3, wherein the magnet bars are mounted parallel to one another on the surface of the carriage such that their length is in the direction of carriage travel, wherein the North and South Pole surfaces of the magnets face away from the carriage.

5. The LMGT system of claim 1, wherein the stator coils are mounted in stator slots, cut in laminated soft iron, perpendicular to the centerline of the guideway throughout the length of the system directly above the surface of the carriage magnet bar magnets as the carriage moves along the guideway.

6. The LMGT system of claim 1, further comprising safety wheels mounted on the surface of the carriage to prevent contact between stator cores and carriage magnets.

7. The LMGT system of claim 1, wherein guideway sections are prefabricated in fixed length units including stator cores, coil windings, power cables, rails, at least a portion of the stator coil and power switching circuitry, and integral junction boxes, the guideway sections configured for quick connection to a structural support system and to one another.

8. A linear motor/generator/transmission (LMGT) system, comprising:
a guideway with parallel rails;
a plurality of stator cores and stator coils evenly disposed along the length and in the center of the guideway;
a carriage configured to travel along the guideway in a first direction;
a plurality of linear slideways disposed on the carriage and extending in a second direction at least substantially perpendicular to the first direction; and
at least two magnet bars adjacent to each other in the second direction, each one of the at least two magnet bars with alternating pole magnets, each successive magnet of each magnet bar mounted in front of the other in the first direction,
wherein each of the at least two magnet bars have a plurality of linear slide bearings, the plurality of linear slide bearings disposed on a side opposite to the alternating pole magnets and engaged with the plurality of linear slideways,
the at least two magnet bars sliding parallel to and on either side of a longitudinal centerline of the carriage guided by the plurality of linear slideways such that, when adjacent to the centerline and each other, the at least two magnet bars are positioned over the stator coils and configured to be slidably translated away from each other and away from the center line of the carriage to a position where the at least two magnet bars are not over the stator coils.

9. The LMGT system of claim 8, where the carriage comprises a carriage frame supported by rail wheels mounted on either side of the carriage frame, and where said rail wheels run on parallel rails of the guideway.

10. The LMGT system of claim 9, wherein the carriage frame supports two or more magnet bars on which two or more magnets are affixed end to end over the length of each bar with their respective North and South Poles alternatively facing away from the bar surface on which they are mounted.

11. The LMGT system of claim 10, wherein the magnet bars are mounted parallel to one another on the surface of the carriage such that their length is in the direction of carriage travel, wherein the North and South Pole surfaces of the magnets face away from the carriage.

12. The LMGT system of claim 8, wherein the stator coils are mounted in stator slots, cut in laminated soft iron, perpendicular to the centerline of the guideway throughout the length of the system directly above the surface of the carriage magnet bar magnets as the carriage moves along the guideway.

13. The LMGT system of claim 8, further comprising safety wheels mounted on the surface of the carriage to prevent contact between stator cores and carriage magnets.

14. The LMGT system of claim 8, wherein guideway sections are prefabricated in fixed length units including stator cores, stator coil windings, power cables, rails, at least a portion of the coil and power switching circuitry, and integral junction boxes, the guideway sections configured for quick connection to a structural support system and to one another.

15. A linear motor/generator/transmission (LMGT) system, comprising:
a guideway with parallel rails;
a plurality of stator cores and stator coils evenly disposed along the length and in the center of the guideway, wherein each phase of the plurality of stator coils includes, in sets of three or more coils, a respective set of parallel non-twisted wires with electronic switches for connecting the parallel non-twisted wires of each phase of the three or more stator coils all in series, all in parallel, or in a combination of series and parallel;
a carriage configured to travel along the guideway in a first direction;

a plurality of linear slideways disposed on the carriage and extending in a second direction at least substantially perpendicular to the first direction; and at least two magnet bars adjacent to each other in the second direction, each one of the at least two magnet bars with alternating pole magnets, each successive magnet of each magnet bar mounted in front of the other in the first direction, the at least two magnet bars having a plurality of linear slide bearings, the plurality of linear slide bearings disposed on a side opposite to the alternating pole magnets and engaged with the plurality of linear slideways.

16. The LMGT system of claim 15, where the carriage comprises a carriage frame supported by rail wheels mounted on either side of the carriage frame, and where said rail wheels run on parallel rails of the guideway.

17. The LMGT system of claim 16, wherein the carriage frame supports two or more bars (magnet bars) on which two or more magnets are affixed end to end over the length of each bar with their respective North and South Poles alternatively facing away from the bar surface on which they are mounted.

18. The LMGT system of claim 17, wherein the magnet bars are mounted parallel to one another on the surface of the carriage such that their length is in the direction of carriage travel, wherein the North and South Pole surfaces of the magnets face away from the carriage.

19. The LMGT system of claim 15, further comprising safety wheels mounted on the surface of the carriage to prevent contact between stator cores and carriage magnets.

20. The LMGT system of claim 15, wherein guideway sections are prefabricated in fixed length units including stator cores, coil windings, power cables, rails, at least a portion of the coil and power switching circuitry, and integral junction boxes, the guideway sections configured for quick connection to a structural support system and to one another.

* * * * *